(12) United States Patent
    Kusaka

(10) Patent No.: US 9,497,374 B2
(45) Date of Patent: Nov. 15, 2016

(54) FOCUS DETECTION DEVICE

(71) Applicant: NIKON CORPORATION, Tokyo (JP)

(72) Inventor: Yosuke Kusaka, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/398,545

(22) PCT Filed: May 1, 2013

(86) PCT No.: PCT/JP2013/062718
§ 371 (c)(1),
(2) Date: Jan. 6, 2015

(87) PCT Pub. No.: WO2013/168658
PCT Pub. Date: Nov. 14, 2013

(65) Prior Publication Data
US 2015/0215517 A1     Jul. 30, 2015

(30) Foreign Application Priority Data
May 7, 2012   (JP) .................. 2012-105849
May 7, 2012   (JP) .................. 2012-105850
Feb. 27, 2013 (JP) .................. 2013-037614

(51) Int. Cl.
*H04N 5/232*    (2006.01)
*G03B 13/00*    (2006.01)
(Continued)

(52) U.S. Cl.
CPC .......... *H04N 5/23212* (2013.01); *G02B 7/282* (2013.01); *G02B 7/34* (2013.01);
(Continued)

(58) Field of Classification Search
CPC ............... H04N 5/23212; G03B 13/18; G02B 7/36; G02B 7/38
(Continued)

(56) References Cited

U.S. PATENT DOCUMENTS 5,572,011 A     11/1996  Goto
6,661,451 B1 *  12/2003  Kijima .................. H04N 9/045
                                                    348/220.1
(Continued)

FOREIGN PATENT DOCUMENTS

JP    H06-334913 A    12/1994
JP    H07-199052 A     8/1995
(Continued)

OTHER PUBLICATIONS

Jul. 23, 2013 International Search Report issued in International Patent Application No. PCT/JP2013/062718.
(Continued)

*Primary Examiner* — Kelly L Jerabek
(74) *Attorney, Agent, or Firm* — Oliff PLC

(57) ABSTRACT

A focus detection device includes: an image sensor that generates a first image signal string and a second image signal string in correspondence to a pair of images formed with a pair of light fluxes passing through an optical system; an image shift amount detection unit that generates a plurality of synthetic image signals each by adding together a first image signal and a second image signal, the first image signal and the second image signal corresponding to each other, each time the first image signal string and the second image signal string are shifted relative to each other by a predetermined extent, and detects an image shift amount indicating an extent of relative image shift between the pair of images based upon an evaluation value for the plurality of synthetic image signals; and a defocus amount calculation unit that calculates a defocus amount based upon the image shift amount.

29 Claims, 39 Drawing Sheets

(51) Int. Cl.
  *G02B 7/34* (2006.01)
  *G02B 7/28* (2006.01)
  *H04N 5/369* (2011.01)
  *H04N 5/235* (2006.01)
  *G03B 13/36* (2006.01)
  *H04N 9/04* (2006.01)

(52) U.S. Cl.
  CPC .......... *H04N 5/2353* (2013.01); *H04N 5/3696* (2013.01); *G03B 13/36* (2013.01); *H04N 9/045* (2013.01)

(58) Field of Classification Search
  USPC ................................................ 348/345–356
  See application file for complete search history.

(56) References Cited

U.S. PATENT DOCUMENTS

| | | | | |
|---|---|---|---|---|
| 7,154,075 B2* | 12/2006 | Krymski | ................ | H04N 5/347 250/208.1 |
| 7,319,218 B2* | 1/2008 | Krymski | ................ | H04N 5/347 250/208.1 |
| 8,633,992 B2* | 1/2014 | Tsukada | ................... | G02B 7/38 348/208.12 |
| 8,681,261 B2* | 3/2014 | Oikawa | .................. | G03B 13/36 348/273 |
| 8,754,976 B2* | 6/2014 | Oikawa | .................. | G03B 13/36 348/273 |
| 8,754,979 B2* | 6/2014 | Tomita | ..................... | G02B 7/36 348/353 |
| 8,988,585 B2* | 3/2015 | Hamano | .................. | G02B 7/38 348/345 |
| 2005/0231606 A1 | 10/2005 | Suzuki | | |
| 2007/0206937 A1 | 9/2007 | Kusaka | | |
| 2007/0206940 A1 | 9/2007 | Kusaka | | |
| 2007/0242138 A1 | 10/2007 | Manico et al. | | |
| 2007/0269127 A1 | 11/2007 | Kusaka | | |
| 2009/0167927 A1 | 7/2009 | Kusaka | | |
| 2010/0013906 A1 | 1/2010 | Border et al. | | |
| 2010/0150539 A1 | 6/2010 | Kusaka | | |
| 2013/0250149 A1 | 9/2013 | Yamasaki | | |
| 2014/0146221 A1 | 5/2014 | Kimura et al. | | |
| 2015/0185434 A1 | 7/2015 | Kimura et al. | | |

FOREIGN PATENT DOCUMENTS

| | | |
|---|---|---|
| JP | H08-94925 A | 4/1996 |
| JP | H09-130661 A | 5/1997 |
| JP | H09-243903 A | 9/1997 |
| JP | H11-075212 A | 3/1999 |
| JP | 2005-072965 A | 3/2005 |
| JP | 2007-233032 A | 9/2007 |
| JP | 2007-233035 A | 9/2007 |
| JP | 2008-116616 A | 5/2008 |
| JP | 2008-177785 A | 7/2008 |
| JP | 2008-224801 A | 9/2008 |
| JP | 2009-017583 A | 1/2009 |
| JP | 2009-159226 A | 7/2009 |
| JP | 2009162847 A | 7/2009 |
| JP | 2009-251523 A | 10/2009 |
| JP | 2011-004407 A | 1/2011 |
| JP | 2011-097645 A | 5/2011 |
| JP | 2011-128302 A | 6/2011 |
| JP | 2012-123317 A | 6/2012 |
| JP | 2013-025246 A | 2/2013 |
| WO | 2007120456 A1 | 10/2007 |
| WO | 2010008529 A1 | 1/2010 |

OTHER PUBLICATIONS

Jul. 23, 2013 Written Opinion issued in International Patent Application No. PCT/JP2013/062718.
Oct. 27, 2015 Office Action issued in Japanese Patent Application No. 2012-105849.
Oct. 27, 2015 Office Action issued in Japanese Patent Application No. 2012-105850.
Jan. 26, 2016 Office Action issued in Japanese Patent Application No. 2012-105850.
Jan. 26, 2016 Office Action issued in Japanese Patent Application No. 2012-105849.
Jun. 6, 2016 Search Report issued in European Patent Application No. 13786973.1.
Aug. 9, 2016 Office Action issued in Japanese Patent Application No. 2012-105849.
Aug. 30, 2016 Office Action issued in Japanese Patent Application No. 2013-037614.

* cited by examiner

FIG.6

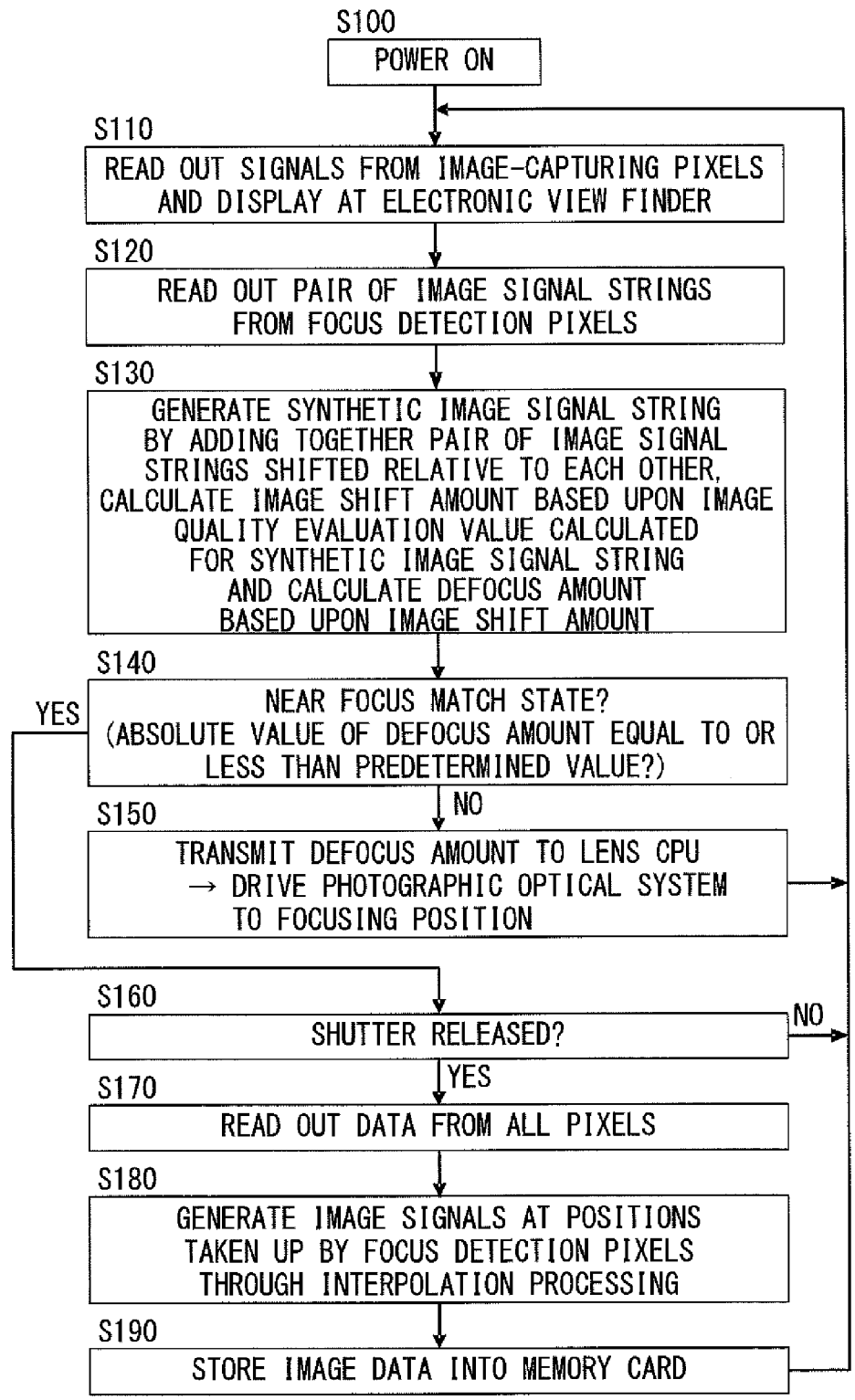

- S100 POWER ON
- S110 READ OUT SIGNALS FROM IMAGE-CAPTURING PIXELS AND DISPLAY AT ELECTRONIC VIEW FINDER
- S120 READ OUT PAIR OF IMAGE SIGNAL STRINGS FROM FOCUS DETECTION PIXELS
- S130 GENERATE SYNTHETIC IMAGE SIGNAL STRING BY ADDING TOGETHER PAIR OF IMAGE SIGNAL STRINGS SHIFTED RELATIVE TO EACH OTHER, CALCULATE IMAGE SHIFT AMOUNT BASED UPON IMAGE QUALITY EVALUATION VALUE CALCULATED FOR SYNTHETIC IMAGE SIGNAL STRING AND CALCULATE DEFOCUS AMOUNT BASED UPON IMAGE SHIFT AMOUNT
- S140 NEAR FOCUS MATCH STATE? (ABSOLUTE VALUE OF DEFOCUS AMOUNT EQUAL TO OR LESS THAN PREDETERMINED VALUE?) — YES → S160; NO ↓
- S150 TRANSMIT DEFOCUS AMOUNT TO LENS CPU → DRIVE PHOTOGRAPHIC OPTICAL SYSTEM TO FOCUSING POSITION
- S160 SHUTTER RELEASED? NO → S110; YES ↓
- S170 READ OUT DATA FROM ALL PIXELS
- S180 GENERATE IMAGE SIGNALS AT POSITIONS TAKEN UP BY FOCUS DETECTION PIXELS THROUGH INTERPOLATION PROCESSING
- S190 STORE IMAGE DATA INTO MEMORY CARD

FOCUS DETECTION DEVICE

TECHNICAL FIELD

The present invention relates to a focus detection device adopting the split-pupil phase detection method and an image shift amount detection device.

BACKGROUND ART

There is a focus detection device known in the related art that adopts the split-pupil phase detection method (see patent literature 1). This focus detection device generates a pair of image signals in correspondence to a pair of images formed with a pair of focus detection light fluxes passing through the exit pupil of an optical system. A correlation operation of the known art is executed by shifting the pair of image signals relative to each other, so as to calculate a correlation value representing a degree of coincidence between a pair of image signal strings resulting from the relative shift. Based upon the correlation value, a shift amount at which the highest agree of coincidence is achieved for the patterns expressed in the pair of image signal strings resulting from the relative shift, is detected as a relative image shift amount representing the extent of relative image shift manifested by the pair of subject images. In addition, the focusing condition of the optical system is detected in correspondence to the image shift amount. The focusing condition of the optical system is indicated by the difference between a predetermined focal plane and a detected image plane, i.e., by a defocus amount.

CITATION LIST

Patent Literature

Patent literature 1: Japanese Laid Open Patent Publication No. 2007-233032

SUMMARY OF INVENTION

Technical Problem

The focus detection device in the related art adopting the split-pupil phase detection method detects an image shift amount based upon the degree of coincidence between a pair of image patterns. This means that if the pair of image patterns are not identical due to, for instance, an aberration in the optical system, i.e., if the image waveforms (image patterns) in an area other than the image forming positions are not identical due to an aberration or the like, an image shift detection error is bound to occur, which, ultimately leads to lowered focus detection accuracy.

According to the 1st aspect of the present invention, a focus detection device comprises: an image sensor that generates a first image signal string and a second image signal string in correspondence to a pair of images formed with a pair of light fluxes passing through an exit pupil of an optical system; an image shift amount detection unit that generates a plurality of synthetic image signals each by adding together a first image signal in the first image signal string and a second image signal in the second image signal string, the first image signal and the second image signal corresponding to each other, each time the first image signal string and the second image signal string are shifted relative to each other by a predetermined extent, and detects an image shift amount indicating an extent of relative image shift between the pair of images based upon an evaluation value for the plurality of synthetic image signals; and a defocus amount calculation unit that calculates a defocus amount based upon the image shift amount.

According to the 2nd aspect of the present invention, in the focus detection device according to the 1st aspect, it is preferred that the image shift amount detection unit detects, as the image shift amount, a shift amount that indicates a shift of the first image signal string and the second image signal string relative to each other, corresponding to a largest value among evaluation values, one of which is calculated each time the first image signal string and the second image signal string are shifted by the predetermined extent.

According to the 3rd aspect of the present invention, in the focus detection device according to the 1st aspect, it is preferred that the evaluation value is calculated based upon a difference value indicating a difference between the plurality of synthetic image signals.

According to the 4th aspect of the present invention, in the focus detection device according to the 3rd aspect, it is preferred that the evaluation value is calculated based upon the difference value obtained as a first-order difference value representing a first-order difference between the plurality of synthetic image signals.

According to the 5th aspect of the present invention, in the focus detection device according to the 4th aspect, it is preferred that the first-order difference value indicates a difference between two synthetic image signals achieving a specific sequential difference therebetween, both included in a synthetic image signal string formed with the plurality of synthetic image signals.

According to the 6th aspect of the present invention, in the focus detection device according to the 3rd aspect, it is preferred that the evaluation value is calculated based upon the difference value obtained as a difference between a largest value and a smallest value among signal values indicated in the plurality of synthetic image signals.

According to the 7th aspect of the present invention, in the focus detection device according to the 3rd aspect, it is preferred that the evaluation value is calculated based upon the difference value obtained as a second-order difference value representing a second-order difference between the plurality of synthetic image signals.

According to the 8th aspect of the present invention, in the focus detection device according to the 7th aspect, it is preferred that the second-order difference value is a sum of a difference between a given synthetic image signal included in a synthetic image signal string formed with the plurality of synthetic image signals and another synthetic image signal, achieving a specific sequential difference relative to the given synthetic image signal along a descending direction, and a difference between the given synthetic image signal and another synthetic image signal, achieving the specific sequential difference relative to the given synthetic image signal along an ascending direction.

According to the 9th aspect of the present invention, in the focus detection device according to the 3rd aspect, it is preferred that the evaluation value is obtained by integrating MTF of the plurality of synthetic image signals over a predetermined frequency band.

According to the 10th aspect of the present invention, in the focus detection device according to the 1st aspect, it is preferred that the focus detection device further comprises: a contrast extraction unit that generates a contrast signal string formed with a plurality of contrast components by extracting the plurality of contrast components from a synthetic image signal string formed with the plurality of synthetic image signals through a linear combination operation executed for the plurality of synthetic image signals, each time the first image signal string and the second image signal string are shifted relative to each other by the predetermined extent. Each time the first image signal string and the second image signal strings are shifted by the predetermined extent, the image shift amount detection unit calculates the evaluation value based upon a nonlinear contrast signal string obtained by converting the contrast signal string through nonlinear conversion executed for the plurality of contrast components based upon a nonlinear function; and the image shift amount detection unit detects, as the image shift amount, a shift amount corresponding to an extreme value among a plurality of contrast evaluation values, one of which is obtained by calculating the evaluation value each time the first image signal string and the second image signal string are shifted by the predetermined extent.

According to the 11th aspect of the present invention, in the focus detection device according to the 10th aspect, it is preferred that the nonlinear function is a monotonic function over a range of values that can be taken for absolute values of the plurality of contrast components.

According to the 12th aspect of the present invention, in the focus detection device according to the 11th aspect, it is preferred that a first derivative function of the nonlinear function is a monotonic function over the range of values that can be taken for the absolute values of the plurality of contrast components.

According to the 13th aspect of the present invention, in the focus detection device according to the 12th aspect, it is preferred that the nonlinear function is a quadratic function.

According to the 14th aspect of the present invention, in the focus detection device according to any one of the 10th through 13th aspects, it is preferred that the linear combination operation is an Nth-order difference operation for a positive integer N.

According to the 15th aspect of the present invention, in the focus detection device according to any one of the 10th through 14th aspects, it is preferred that the image shift amount detection unit calculates the evaluation value by adding up signals making up the nonlinear contrast signal string.

According to the 16th aspect of the present invention, in the focus detection device according to any one of the 10th through 14th aspects, it is preferred that the first image signal string and the second image signal string are each a signal string obtained by discretely sampling one of the pair of images with a predetermined spatial pitch; a plurality of shift amounts, each achieved as the first image signal string and the second image signal string are shifted by the predetermined extent, take discrete values set apart from one another in units equivalent to the predetermined spatial pitch; and the image shift amount detection unit detects the image shift amount with accuracy equal to or smaller than the predetermined spatial pitch, based upon the contrast evaluation value indicating the extreme value among the plurality of contrast evaluation values, the shift amount corresponding to the contrast evaluation value and two contrast evaluation values at two shift amounts determined by incrementing and decrementing the shift amount by an extent equivalent to the predetermined spatial pitch.

According to the 17th aspect of the present invention, in the focus detection device according to any one of the 1st through 16th aspects, it is preferred that the focus detection device further comprises: an other detection unit that calculates, through a correlation operation, a correlation value indicating a degree of coincidence between the first image signal string and the second image signal string each time the first image signal string and the second image signal string are shifted relative to each other by the predetermined extent and detects, as a first image shift amount indicating an extent of relative image shift between the pair of images, a shift amount indicating a relative shift of the first image signal string and the second image signal string at which the degree of coincidence between the first image signal string and the second image signal string is greatest, based upon the correlation value; and a selection unit that selects one of the other detection unit and the image shift amount detection unit. When the other detection unit is selected by the selection unit, the defocus amount calculation unit calculates the defocus amount based upon the first image shift amount detected by the other detection unit, whereas when the image shift amount detection unit is selected by the selection unit, the defocus amount calculation unit calculates the defocus amount based upon a second image shift amount, which is the image shift amount detected by the image shift amount detection unit.

According to the 18th aspect of the present invention, in the focus detection device according to the 17th aspect, it is preferred that the selection unit selects one of the first image shift detection unit and the second image shift amount detection unit in correspondence to a detected focusing condition of the optical system.

According to the 19th aspect of the present invention, in the focus detection device according to the 18th aspect, it is preferred that the detected focusing condition is represented by an absolute value of the defocus amount; and when the absolute value of the defocus amount exceeds a predetermined value, the selection unit selects the other detection unit, and when the absolute value of the defocus amount is equal to or less than the predetermined value, the selection unit selects the image shift amount detection unit.

According to the 20th aspect of the present invention, in the focus detection device according to the 17th aspect, it is preferred that the selection unit selects one of the other detection unit and the image shift amount detection unit in correspondence to an optical characteristic of the optical system.

According to the 21th aspect of the present invention, in the focus detection device according to the 20th aspect, it is preferred that the optical characteristic is indicated by one of; an extent of aberration at the optical system, an aperture F-number at the optical system and an exit pupil distance of the optical system.

According to the 22th aspect of the present invention, in the focus detection device according to the 17th aspect, it is preferred that the selection unit selects one of the other detection unit and the image shift amount detection unit in correspondence to an image height indicating a position at which the first image signal string and the second image signal string are generated relative to an optical axis.

According to the 23th aspect of the present invention, in the focus detection device according to the 17th aspect, it is preferred that the selection unit selects one of the other detection unit and the image shift amount detection unit in correspondence to required detection accuracy with which the defocus amount needs to be detected.

According to the 24th aspect of the present invention, in the focus detection device according to the 17th aspect, it is preferred that the selection unit selects one of the other detection unit and the image shift amount detection unit in correspondence to an image quality of the pair of images determined based upon the first image signal string and the second image signal string.

According to the 25th aspect of the present invention, in the focus detection device according to any one of the 1th through 16th aspects, it is preferred that the focus detection device further comprises: an other detection unit that calculates, through a correlation operation, a correlation value indicating a degree of coincidence between the first image signal string and the second image signal string each time the first image signal string and the second image signal string are shifted relative to each other by the predetermined extent, and detects, as a first image shift amount indicating an extent of a relative image shift between the pair of images, a shift amount indicating a relative shift of the first image signal string and the second image signal string at which the degree of coincidence between the first image signal string and the second image signal string is greatest, based upon the correlation value. The defocus amount calculation unit calculates the defocus amount based upon an average image shift amount obtained through weighted averaging of the first image shift amount detected by the other detection unit and a second image shift amount, which is the image shift amount detected by the image shift amount detection unit.

Advantageous Effect of the Invention

According to the present invention, a highly accurate focus detection device can be provided.

BRIEF DESCRIPTION OF THE DRAWINGS

FIG. 6 presents a flowchart of operations executed by the body control device in the digital camera.

DESCRIPTION OF EMBODIMENTS

First Embodiment

Figure 1:
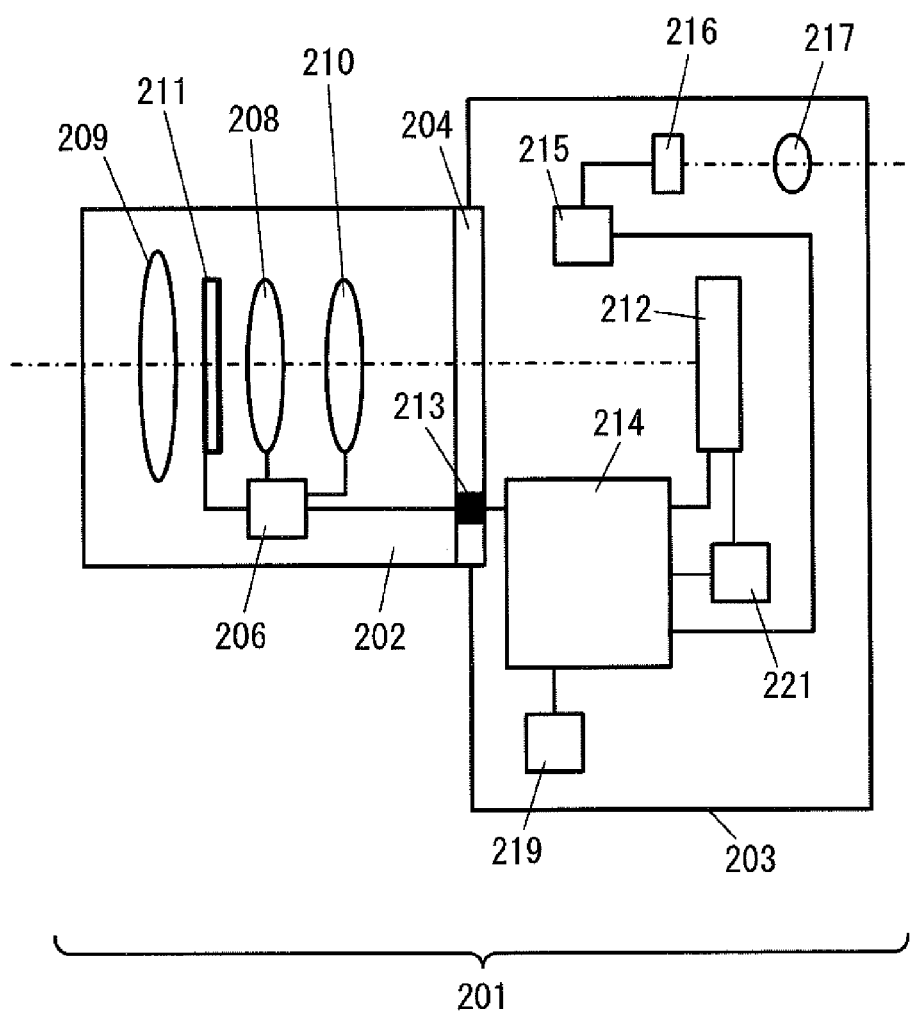
FIG. 1 shows the structure of a digital camera in a lateral sectional view.

A digital still camera used in conjunction with interchangeable lenses, representing an example of an imaging apparatus that includes the focus detection device achieved in the first embodiment of the present invention will be explained. FIG. 1 is a lateral sectional view of the structure adopted in a digital camera 201 in the embodiment. The digital camera 201 achieved in the embodiment includes an interchangeable lens 202 and a camera body 203. The interchangeable lens 202 is mounted at the camera body 203 via a mount unit 204. Any one of various interchangeable lenses 202 each having a photographic optical system can be mounted at the camera body 203 via the mount unit 204.

The interchangeable lens 202 includes a lens 209, a zooming lens 208, a focusing lens 210, an aperture 211, a lens control device 206 and the like. The lens control device 206 includes a microcomputer, a memory, a lens drive control circuit and the like (not shown). The lens control device 206 executes drive control so as to adjust the focusing condition of the focusing lens 210 and adjust the opening diameter of the aperture 211 and detects the states of the zooming lens 208, the focusing lens 210 and the aperture 211. The lens control device 206 also engages in communication with a body control device 214 to be detailed later to transmit lens information to the body control 214 and receive camera information (a defocus amount, an aperture value and the like) from the body control device 214. The aperture 211 forms an opening with a variable opening diameter, centered on the optical axis, so as to adjust the amount of light and adjust the extent of blurring.

An image sensor 212, the body control device 214, a liquid crystal display element drive circuit 215, a liquid crystal display element 216, an eyepiece lens 217, a memory card 219, an A/D conversion device 221 and the like are disposed at the camera body 203. Image-capturing pixels are arrayed at the image sensor 212 in a two-dimensional pattern defined by rows and columns, and focus detection pixels are built into the image sensor over an area corresponding to a focus detection position. The image sensor 212 will be described in detail later.

The body control device 214 includes a microcomputer, a memory, a body drive control circuit and the like. It repeatedly executes exposure control for the image sensor 212, read operations to read out pixel signals from the image sensor 212, focus detection operations based upon pixel signals output from focus detection pixels and focus adjustment for the interchangeable lens 202. It also processes, displays and records image signals and controls camera operations. In addition, the body control device 214 engages in communication with the lens control device 206 via an electrical contact point 213 to receive the lens information and transmit the camera information.

The liquid crystal display element 216 functions as an electronic view finder (EVF). A live-view image brought up on display at the liquid crystal display element 216 by the liquid crystal display element drive circuit 215 based upon image signals read out from the image sensor 212, can be viewed by the photographer via the eyepiece lens 217. The memory card 219 is an image storage medium in which image data generated based upon image signals obtained by capturing image via the image sensor 212 are stored.

The A/D conversion device 221 executes A/D conversion for pixel signals output from the image sensor 212 and provides data resulting from the A/D conversion to the body control device 214. The image sensor 212 may include the A/D conversion device 221 as a built-in unit.

A subject image is formed on the image-capturing plane of the image sensor 212 with a light flux having passed through the interchangeable lens 202. The subject image undergoes photoelectric conversion at the image sensor 212 and subsequently, pixel signals output from image-capturing pixels and focus detection pixels are transmitted to the body control device 214.

The body control device 214 calculates the defocus amount indicating the extent of defocus based upon pixel signals (focus detection signals) output from the focus detection pixels at the image sensor 212 and transmits this defocus amount to the lens control device 206. In addition, the body control device 214 generates image data by processing the pixel signals (image signals) output from the image-capturing pixels at the image sensor 212 and stores the image data into the memory card 219. It also provides live-view signals read out from the image sensor 212 to the liquid crystal display element drive circuit 215 so as to bring up a live-view image on display at the liquid crystal display element 216. Moreover, the body control device 214 provides aperture control information to the lens control device 206 to enable control of the aperture 211.

The lens control device 206 updates the lens information in correspondence to the current focusing state, zooming state and aperture setting state, the F-number for maximum aperture and the like. More specifically, the lens control device 206 detects the positions of the zooming lens 208 and the focusing lens 210 and the aperture value set for the aperture 211, and calculates correct lens information based upon the lens positions and the aperture value. Alternatively, it may select the lens information corresponding to the lens positions and the aperture value from a lookup table prepared in advance.

The lens control device 206 calculates a lens drive amount indicating the extent to which the lens is to be driven based upon the defocus amount having been received and drives the focusing lens 210 to a focusing position based upon the lens drive amount. The lens control device 206 also drives the aperture 211 in correspondence to the aperture value it has received.

Figure 2:
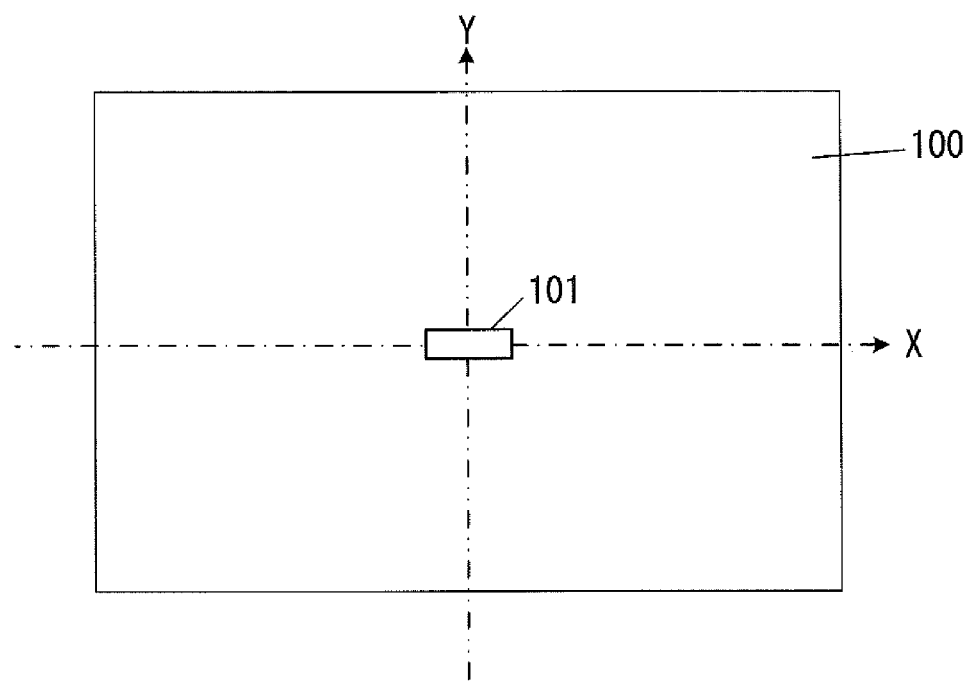
FIG. 2 indicates a focus detection position set on the photographic image plane.

A focus detection position set on the photographic image plane at which an image is sampled on the photographic image plane for the purpose of focus detection via a focus detection pixel row at the image sensor 212 to be detailed later (a focus detection area, a focus detection position), is shown in FIG. 2. In this example, a focus detection area 101 is set at the center of a rectangular photographic image plane 100 (on the optical axis). Focus detection pixels are arrayed along a straight line along the longer side of each of the focus detection area indicated as a rectangular area.

Figure 3:
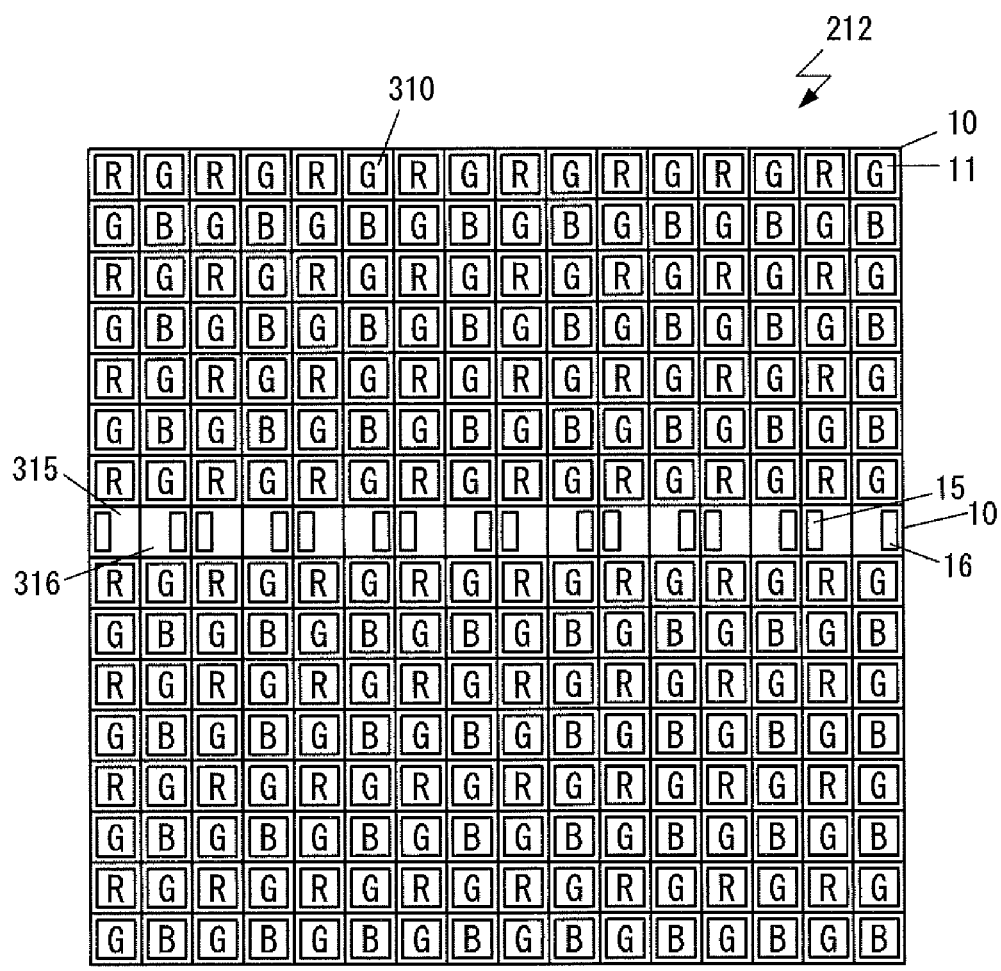
FIG. 3 shows the structure of the image sensor in detail in a front view.

FIG. 3 is a front view showing in detail the structure adopted in the image sensor 212, in a detailed enlargement showing the pixel array at the image sensor 212 in the vicinity of the focus detection area 101 ranging along the horizontal direction in FIG. 2. The image sensor 212 includes image-capturing pixels 310 disposed in a dense two-dimensional square grid array. The image-capturing pixels 310 include red pixels (R), green pixels (G) and blue pixels (B) which are disposed in conformance to the Bayer array rule. FIG. 3 shows focus detection pixels 315 and 316, assuming a pixel size matching that of the image-capturing pixels 310 and used for horizontal focus detection, which are successively disposed at alternate positions along a straight line in the horizontal direction over an area where green pixels and blue pixels would otherwise be disposed consecutively.

The image-capturing pixels 310 and the focus detection pixels 315 and 316 each include a micro lens assuming a shape achieved by cutting out a square-shaped lens piece, the size of which corresponds to the pixel size, from a round micro lens having a size greater than the pixel size.

As shown in FIG. 3, the image-capturing pixels 310 each include a rectangular micro lens 10, a photoelectric conversion unit 11 with a square light-receiving area defined by a light shielding mask, and a color filter. The color filters at the individual image-capturing pixels each assume one of the three colors, red (R), green (G) and blue (B). The red, green and blue color filters assume spectral sensitivity characteristics corresponding to the respective colors. The image-capturing pixels 310, each equipped with a red, green or blue color filter, are arranged in a Bayer array at the image sensor 212.

A white filter that allows all visible light to be transmitted is disposed at each focus detection pixel so as to enable focus detection for all colors. Namely, the spectral sensitivity characteristics of the white filters are similar to the sum of the spectral sensitivity characteristics of the green pixels, the red pixels and the blue pixels, achieving high sensitivity in a light wavelength range that includes the high sensitivity light wavelength ranges corresponding to the sensitivity characteristics of all the color filters at the green pixels, the red pixels and the blue pixels.

As shown in FIG. 3, the focus detection pixels 315 each include a rectangular micro lens 10, a photoelectric conversion unit 15 with a light-receiving area defined by a light-shielding mask so as to range over the left half of a square (left half of the square split into two equal portions by a vertical line), and a white filter (not shown).

As shown in FIG. 3, the focus detection pixels 316 each include a rectangular micro lens 10, a photoelectric conversion unit 16 with a light-receiving area defined by a light-shielding mask so as to range over the right half of a square (right half of the square split into two equal portions by a vertical line), and a white filter (not shown).

When a focus detection pixel 315 and a focus detection pixel 316 are stacked with their micro lenses 10 aligned with each other, the photoelectric conversion unit 15 and the photoelectric conversion unit 16, each having its light-receiving area defined with the light shielding mask so as to range over half of the square shape, are set side-by-side along the horizontal direction.

In addition, when the other half of the square shape is added to each light-receiving area defined so as to range over half of the square shape, a square shape assuming a size matching that of the light-receiving area of an image-capturing pixel 310 is formed.

When light from a standard light source is received at the image-capturing pixels and the focus detection pixels structured as described above, the output level at the green image-capturing pixels substantially matches the output level at the focus detection pixels, whereas the red image-capturing pixels and the blue image-capturing pixels achieve output levels lower than those of the green image-capturing pixels and the focus detection pixels.

Figure 4:
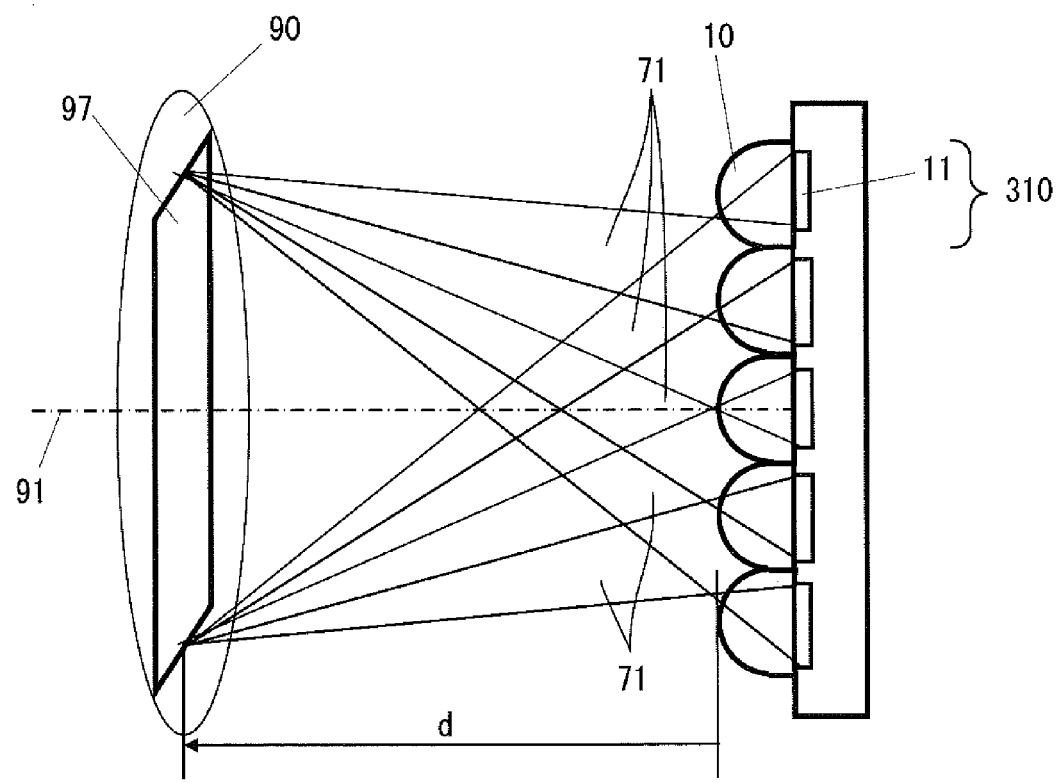
FIG. 4 illustrates how photographic light fluxes are received at image-capturing pixels.

FIG. 4 shows photographic light fluxes received at image-capturing pixels 310 described in reference to FIG. 3 in a sectional view of image-capturing pixels disposed along the horizontal direction. The photoelectric conversion units at all the image-capturing pixels 310 disposed on the image sensor 212 receive light fluxes each having passed through an opening in the light shielding mask disposed in close proximity to a given photoelectric conversion unit 11. The shape of the opening of the light shielding mask is projected onto a common area 97, used in conjunction with all the image-capturing pixels, on an exit pupil 90 of the photographic optical system set apart from the micro lenses 10 by a focus detection pupil distance d, via the micro lens 10 in the corresponding image-capturing pixel 310.

This means that the photoelectric conversion unit 11 in each image-capturing pixel receives a light flux 71 having passed through the area 97 and the micro lens 10 in the particular image-capturing pixel, and outputs a signal corresponding to the intensity of the image formed on the micro lens 10 with the light flux 71.

Figure 5:
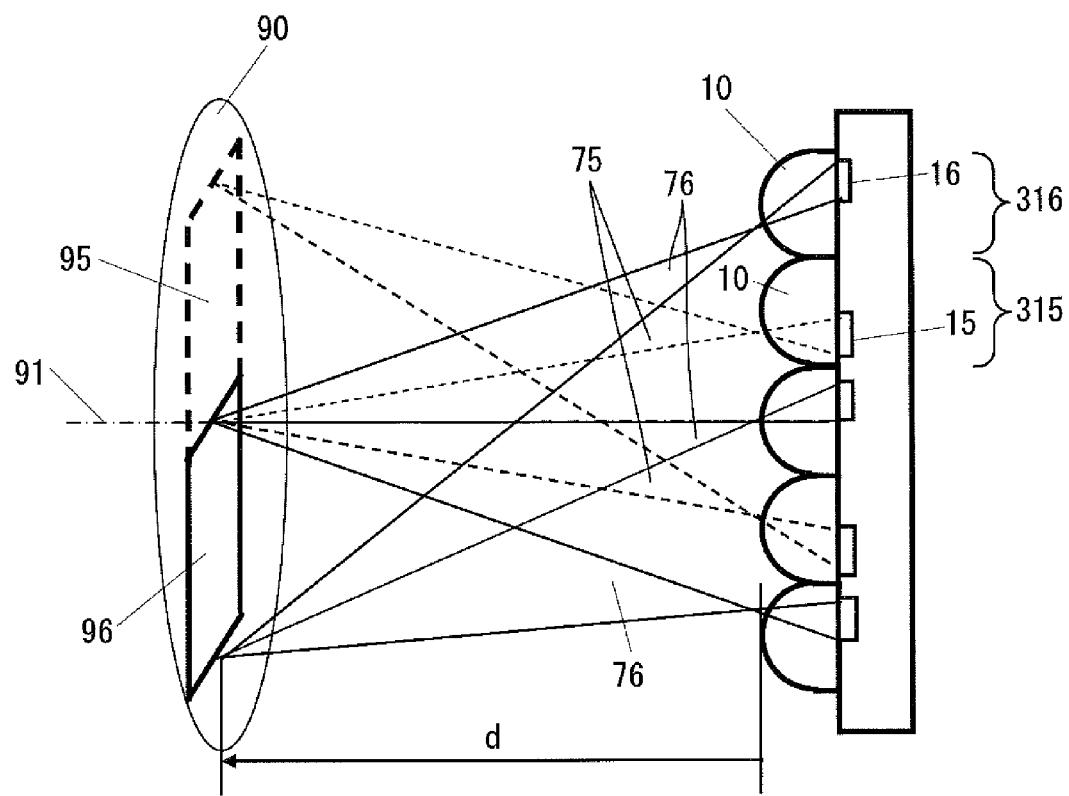
FIG. 5 illustrates how photographic light fluxes are received at focus detection pixels.

FIG. 5 shows focus detection light fluxes received at focus detection pixels 315 and 316 described in reference to FIG. 3, in a sectional view comparable to that presented in FIG. 4, showing focus detection pixels disposed side-by-side along the horizontal direction.

The photoelectric conversion units at all the focus detection pixels 315 and 316 disposed on the image sensor 212 receive light fluxes each having passed through an opening in the light shielding mask disposed in close proximity to a specific photoelectric conversion unit 15 or 16. The shape of the opening of the light shielding mask disposed in close proximity to the photoelectric conversion unit 15 is projected onto a common area 95, used in conjunction with all the focus detection pixels 315, on the exit pupil 90 set apart from the micro lenses 10 by the focus detection pupil distance d, via the micro lens 10 of the corresponding focus detection pixel 315. Likewise, the shape of the opening of the light shielding mask disposed in close proximity to a photoelectric conversion unit 16 is projected onto a common area 96, used in conjunction with all the focus detection pixels 316, on the exit pupil 90 set apart from the micro lenses 10 by the focus detection pupil distance d, via the micro lens 10 of the corresponding focus detection pixel 316. The pair of areas 95 and 96 will be referred to as focus detection pupils.

The photoelectric conversion unit 15 in each focus detection pixel 315 receives a light flux 75 having passed through the focus detection pupil 95 and the micro lens 10 in the focus detection pixel 315, and outputs a signal corresponding to the intensity of the image formed on the micro lens 10 with the light flux 75. In addition, the photoelectric conversion unit 16 in each focus detection pixel 316 receives a light flux 76 having passed through the focus detection pupil 96 and the micro lens 10 in the focus detection pixel 316, and outputs a signal corresponding to the intensity of the image formed on the micro lens 10 with the light flux 76.

The area formed by combining the focus detection pupils 95 and 96 on the exit pupil 90, through which the light fluxes 75 and 76, to be received at a pair of focus detection pixels 315 and 316, pass, matches the area 97 on the exit pupil 90, through which the light flux 71, to be received at an image-capturing pixel 310, passes. The pair of light fluxes 75 and 76 assume a complementary relation to the light flux 71 on the exit pupil 90.

While the light-receiving area of a photoelectric conversion unit is defined by a light shielding mask in the example described above, the photoelectric conversion unit itself may take a shape matching the shape of the opening in the light shielding mask described above. In such a case, the light shielding mask may not be required.

In short, it is critical that the photoelectric conversion units and the focus detection pupils achieve an optically conjugate relation via the micro lenses.

In addition, the positions of the focus detection pupils (the focus detection pupil distance) are normally set so as to substantially match the distance of the exit pupil of the photographic optical system. If a plurality of interchangeable lenses can be mounted at the digital camera, the focus detection distance should be set to the average exit pupil distance among the exit pupil distances corresponding to the plurality of interchangeable lenses.

A large number of the two types of focus detection pixels 315 and 316 structured as described above are disposed linearly at alternate positions and the outputs from the photoelectric conversion units at the individual focus detection pixels are integrated into output groups each corresponding to one of the two focus detection pupils 95 and 96. Information related to the intensity distributions of the pair of images formed on the focus detection pixel row with a pair of focus detection light fluxes passing through the focus detection pupil 95 and the focus detection pupil 96 is thus obtained. Image shift detection operation processing (phase detection processing), to be detailed later, is subsequently executed by using the information thus obtained so as to detect the image shift amount manifested by the pair of images. Furthermore, through a conversion operation on the image shift amount executed by using a conversion coefficient corresponding to the proportional relation of the distance between the gravitational centers of the pair of focus detection pupils to the focus detection pupil distance, the deviation of the imaging plane detected through the split-pupil phase detection method relative to the predetermined imaging plane at the focus detection position, i.e., a defocus amount, is calculated.

It is to be noted that for clarity of illustration, FIG. 5 shows the pair of focus detection pupils 95 and 96 taking on clear shapes, shows the pair of focus detection light fluxes 95 and 96 each taking a conical shape, and shows the light fluxes as if when a given light flux is sliced by a plane perpendicular to the optical axis 91, a uniform ray density is achieved over the section. However, the actual outlines of the pair of focus detection pupils 95 and 96 are likely to be unclear due to, for instance, aberration in the micro lenses at the focus detection pixels. In addition, the ray densities in the pair of focus detection light fluxes 95 and 96 over the section ranging perpendicular to the optical axis 91 are not uniform, and instead, ray distributions corresponding to the optical characteristics of the focus detection optical system and the optical characteristics of the photographic optical system manifest.

FIG. 6 presents a flowchart of operations executed in the body control device 214 of the digital camera 201 achieved in the embodiment. As power to the digital camera 201 is turned on in step S100, the body control device 214 starts operation in step S110. If the aperture needs to be adjusted, the body control device 214 issues an aperture adjustment command in step S110 to the lens control device 206 so as to engage the lens control device 206 in aperture adjustment. In addition, the body control device 214 reads out signals output from the image-capturing pixels 310 at the image sensor 212 by engaging the image sensor 212 in image-capturing operation, and brings up a display at the liquid crystal display element 216. In the following step S120, the body control device 214 reads out a pair of image signal strings corresponding to a pair of subject images from the focus detection pixel row.

In step S130, the body control device 214 calculates an image shift amount indicating the extent of image shift manifested by the pair of image signal strings by executing image shift detection operation processing on the pair of image signal strings having been read out, based upon an image quality evaluation value calculated for synthetic image signals, as will be described later, and converts the image shift amount to a defocus amount before the processing proceeds to step S140.

In step S140, the body control device 214 makes a decision as to whether or not the current focusing condition of the photographic optical system is deemed a focus match state, i.e., whether or not the absolute value of the calculated defocus amount is equal to or less than a predetermined value. The predetermined value set through testing, may be, for instance, 100 µm. If the body control device 214 decides that the focusing condition of the photographic optical system is not deemed a focus match state, the processing proceeds to step S150. In step S150, the body control device 214 transmits the calculated defocus amount to the lens control device 206 so as to drive the focusing lens 210 in the interchangeable lens 202 in FIG. 1 to the focusing position. Subsequently, the processing returns to step S110 to repeatedly execute the operations described above.

It is to be noted that the processing also branches to step S150 if focus detection is not possible. In this case, the body control device 214 transmits a scan drive instruction to the lens control device 206. In response, the lens control device 206 drives the focusing lens 210 at the interchangeable lens 202 to scan between the infinity position and the close-up position. Subsequently, the processing returns to step S110 to repeatedly execute the operations described above.

If, on the other hand, it is decided in step S140 that the current focusing condition of the photographic optical system is deemed a focus match state, the processing proceeds to step S160. In step S160, the body control device 214 makes a decision as to whether or not a shutter release has occurred in response to an operation of the shutter release button (not shown). If it is decided that a shutter release has not yet occurred, the processing returns to step S110 to repeatedly execute the operations described above. If the body control device 214 decides in step S160 that the shutter has been released, it engages the image sensor 212 in image-capturing operation in step S170 and reads out the signals from the image-capturing pixels and all the focus detection pixels at the image sensor 212.

In step S180, image-capturing signals from positions assumed by the individual pixels in the focus detection pixel row are generated through pixel interpolation based upon the signals output from the image-capturing pixels present around the focus detection pixels. In the following step S190, image data constituted with the signals from the image-capturing pixels and the interpolated signals are recorded into the memory card 219, and then the processing returns to step S110 to repeatedly execute the operations described above.

Before describing in detail the image shift detection operation processing executed for the pair of image signal strings in step S130 in FIG. 6 based upon the synthetic image signal quality evaluation value, an issue to be addressed in the related art will be explained. First, the image shift detection operation processing executed in the related art for image shift detection based upon a degree of coincidence between a pair of image signal strings will be described. The image shift detection operation processing executed in the related art based upon the coincidence degree of a pair of image signal strings will be referred to as first image shift detection operation processing. In the first image shift detection operation processing, a correlation operation of the known art (SAD: Sum of Absolute Difference) is executed as expressed in (1) below for a pair of image signal strings $A_1$ through $A_M$ and $B_1$ through $B_M$ read out from a focus detection pixel row (the number of pixels: 2M) so as to calculate a correlation quantity E(k) indicating a degree of coincidence between the patterns expressed with the pair of image signal strings.

$$E(k)=\Sigma |A_n - B_{n+k}| \qquad (1)$$

In expression (1), the Σ operation is cumulatively executed with regard to a variable n. The range assumed for the variable n is limited to the range over which the image signal strings $A_n$ and $B_{n+k}$ exist in correspondence to the image shift amount k. The image shift amount k is an integer which represents a relative shift amount assuming a value taken in units matching the signal pitch with which the data in the pair of image signal strings are sampled. The operation is executed as expressed in (1) by shifting the pair of image signal strings relative to each other by a predetermined extent in steps, i.e., by altering the image shift amount k within a predetermined range, so as to calculate correlation quantities E(k) corresponding to a plurality of shift amounts k. The correlation quantity E(k) calculated as expressed in (1) takes a smaller value as the degree of coincidence between the pair of image signal strings becomes higher. Accordingly, the shift amount at which the correlation quantity E(k) takes the smallest value among the correlation quantity values calculated in correspondence to the plurality of shift amounts k is designated as the image shift amount.

The results of the arithmetic operation executed as expressed in (1) indicate that the correlation quantity E(k) assumes the local minimum value at the image shift amount at which the pair of data strings corresponding to the pair of image signal strings achieve a high level of correlation. This means that the smaller the value calculated for the correlation quantity E(k), the higher the level of correlation between the pair of image signal strings, i.e., the higher the degree of coincidence between the pair of image signals. In the example presented in FIG. 7(a), the correlation quantity E(k) assumes the smallest value, i.e., the degree of coincidence between the pair of image signals is the highest, when the image shift amount k=kj=2.

Since the image shift amount k is always an integer, the correlation quantity E(k) is calculated as discrete values. Accordingly, the shift amount x, which gives the local minimum value E(x) in the continuous correlation quantity graph, is determined by adopting a three-point interpolation method expressed in (2) to (5) below. This shift amount x is converted to a first image shift amount shft1 representing an extent of image shift manifested by the pair of subject images relative to each other, as will be described later.

$$x=kj+D/SLOP \quad (2)$$

$$E(x)=E(kj)-|D| \quad (3)$$

$$D=\{E(kj-1)-E(kj+1)\}/2 \quad (4)$$

$$SLOP=MAX\{E(kj+1)-E(kj),E(kj-1)-E(kj)\} \quad (5)$$

Figure 7:
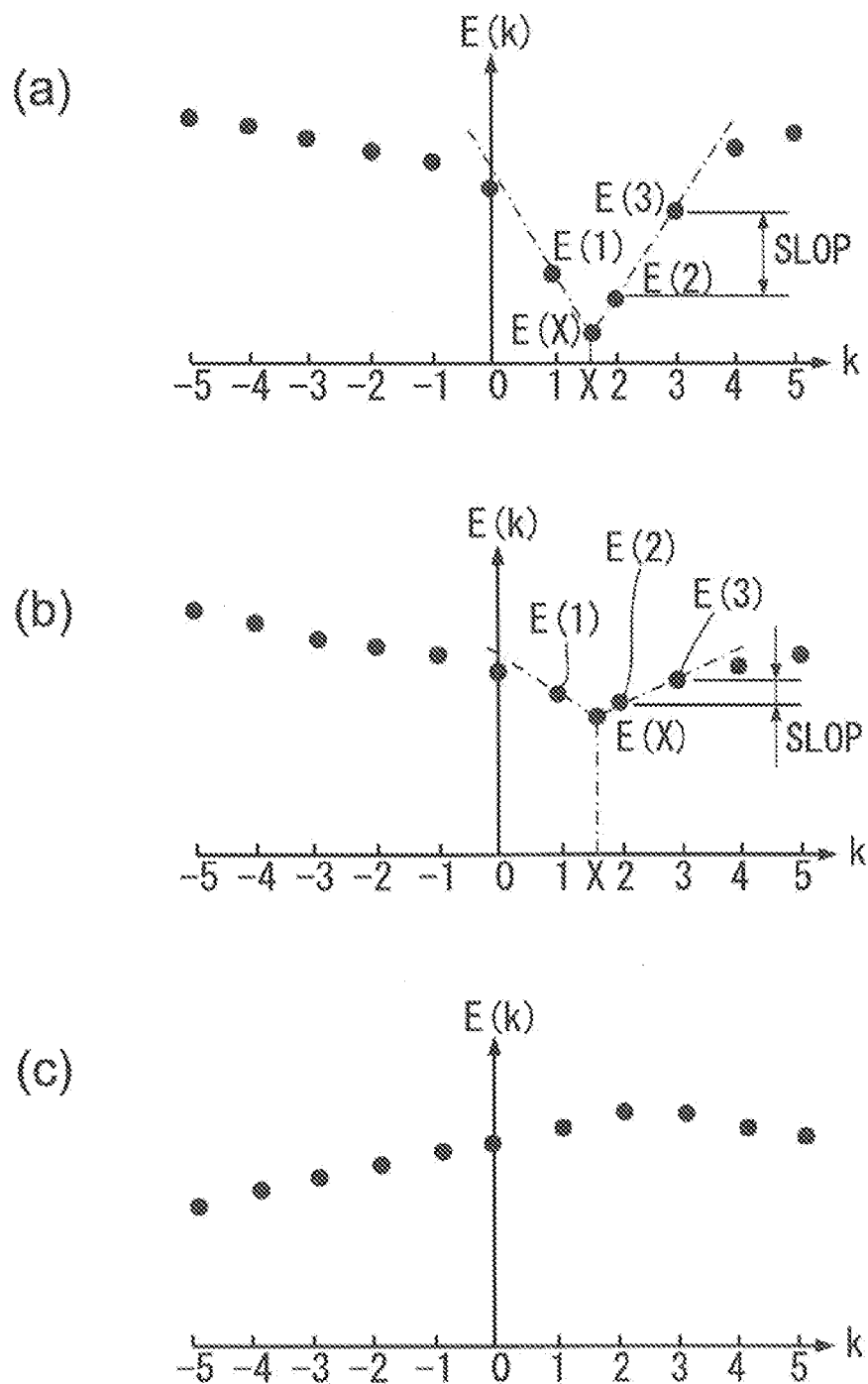
FIG. 7 illustrates image shift detection operation processing.

The judgment as to whether or not the shift amount x calculated as expressed in (2) is reliable is made as follows. As shown in FIG. 7(b), the interpolated local minimum value E(x) of the correlation quantity increases when the level of correlation between the pair of data strings corresponding to the pair of image signal strings is low. Accordingly, if E(x) is equal to or greater than a predetermined threshold value, the calculated shift amount is judged to be less reliable and the calculated shift amount x is canceled. Alternatively, E(x) may be standardized with regard to the data contrast, and in such a case, if the value obtained by dividing E(x) by SLOP assuming a value in proportion to the contrast is equal to or greater than a predetermined value, the calculated shift amount should be judged to be not reliable and accordingly, the calculated shift amount x should be canceled. As a further alternative, if SLOP taking on the value in proportion to the contrast is equal to or less than a predetermined value, the subject should be judged to be a low-contrast subject and, accordingly, the reliability of the calculated shift amount should be judged to be low and the calculated shift amount x should be canceled.

If the level of correlation between the pair of data strings corresponding to the pair of image signal strings is low and the correlation quantity E(k) does not dip at all over the shift range $k_{min}$ to $k_{max}$, as shown in FIG. 7(c), the local minimum value E(x) cannot be determined. In this case, it is decided that focus detection cannot be executed.

If the shift amount x is determined to be reliable, the shift amount x is converted to the first image shift amount shft1 as expressed in (6). The detection pitch PY in expression (6) is the sampling pitch with which data are sampled from a given type of focus detection pixels, i.e., the detection pitch PY is twice the image-capturing pixel pitch.

$$shft1=PY \cdot x \quad (6)$$

The first image shift detection operation processing is executed as described above.

The first image shift amount calculated through the first image shift detection operation is converted to a defocus amount def by multiplying the first image shift amount shft1, calculated as expressed in (6), by a predetermined conversion coefficient Kd.

$$def=Kd \cdot shft1 \quad (7)$$

The conversion coefficient Kd in (7) is determined in correspondence to the proportional relation of the distance between the gravitational centers of the pair of focus detection pupils 95 and 96 to the focus detection pupil distance, and the value taken for the conversion coefficient changes in correspondence to the F-number at the aperture in the optical system.

It is to be noted that the degree of coincidence between the pair of image signal strings may be calculated through a correlation operation other than that expressed in (1). In other words, the degree of coincidence between the pair of image signal strings may be calculated by using any correlation operation expression.

The principle of coincidence detection for a pair of image signal strings through the first image shift detection operation of the known art described above is based upon the following concept. Under the assumption that patterns in a pair of image signals, such as their shapes or their waveforms, generated with a pair of focus detection light fluxes, are identical, i.e., they are coincident to each other, the patterns expressed with a pair of image signal strings are bound to be in complete alignment in a focus match state. This means that if this assumption that the patterns of the pair of image signal strings formed with a pair of focus detection light fluxes are coincident to each other cannot be supported, there is bound to be an error in the focusing condition detected in correspondence to the first image shift amount calculated through the first image shift detection operation.

Figure 8:
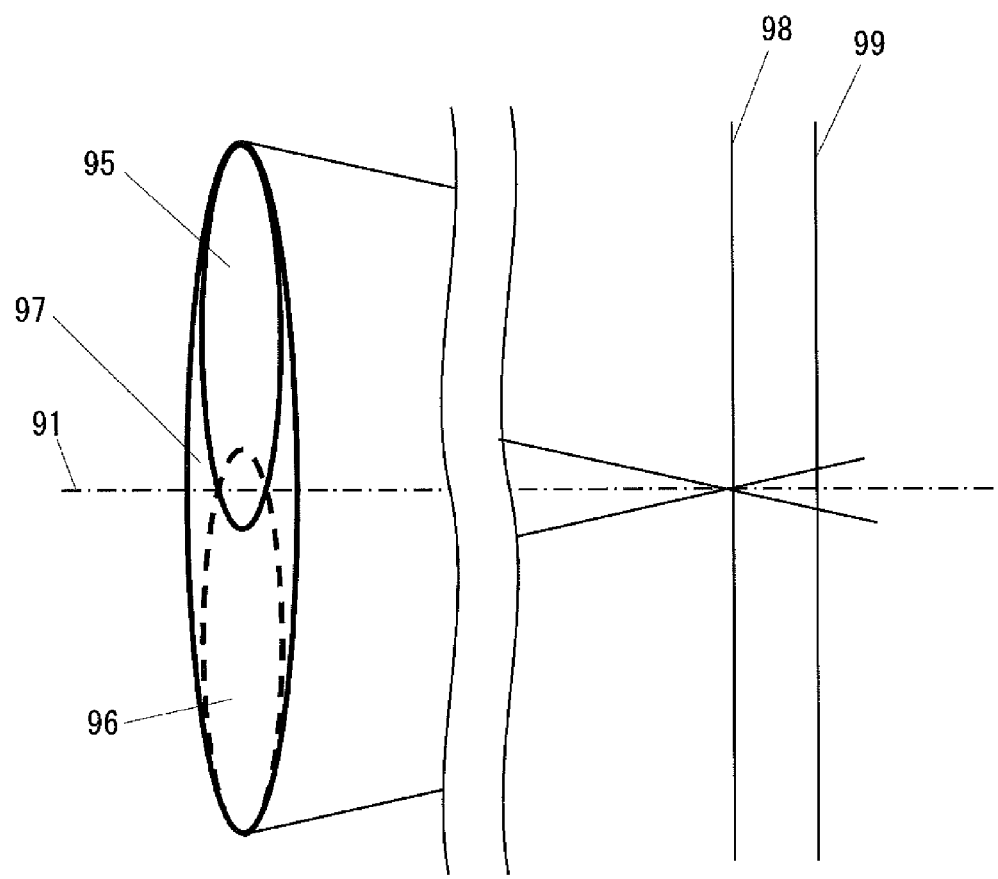
FIG. 8 is a schematic illustration showing how a photographic light flux and a pair of focus detection light fluxes converge at a point near a predetermined focal plane.

FIG. 8 is a schematic illustration showing how a photographic light flux having passed through the area 97 of the exit pupil and a pair of focus detection light fluxes having passed through the pair of areas 95 and 96 in the exit pupil, as shown in FIG. 4 and FIG. 5, converge at a point near a predetermined focal plane 98 when an optimal image plane is formed on the predetermined focal plane 98. The term "optimal image plane" refers to an imaging plane at which the maximum image quality with respect to the sharpness, the resolution, the contrast or the frequency characteristics (MTF), is achieved for a subject image formed with the photographic light flux and a pair of subject images formed with the pair of focus detection light fluxes. For instance, assuming that a point light source is present on the optical axis 91 in FIG. 8, point images will be formed on the predetermined focal plane 98 on the optical axis 91 in correspondence to the position of the point light source.

When an ideal photographic optical system with no aberration is used, the point image formed by the photographic light flux having passed through the area 97 in the exit pupil and the pair of point images formed with the pair of focus detection light fluxes having passed through the pair of areas 95 and 96 in the exit pupil will each be a perfect point with no spatial spread on the predetermined focal plane 98. In addition, the spatial positions assumed by the pair of point images, formed with the pair of focus detection light fluxes having passed through the pair of areas 95 and 96 in the exit pupil, on the predetermined focal plane 98 will match. When a normal subject is captured by using such a photographic optical system with no aberration, the shapes of the pair of subject images formed on the optimal image plane with a pair of focus detection light fluxes will match each other perfectly and the positions of the pair of subject images will also match. Accordingly, it can be assured that when the image shift amount calculated for the pair of subject images through the first image shift detection operation processing of the known art based upon the degree of coincidence between the pair of image signal string is 0, a focus match is achieved.

However, if the photographic optical system manifests an optical aberration, the point image formed with the photographic light flux having passed through the area 97 in the exit pupil and the pair of point images formed with the pair of focus detection light fluxes having passed through the pair of areas 95 and 96 in the exit pupil will each be a point image having a spatial range over the predetermined focal plane 98.

Figure 9:
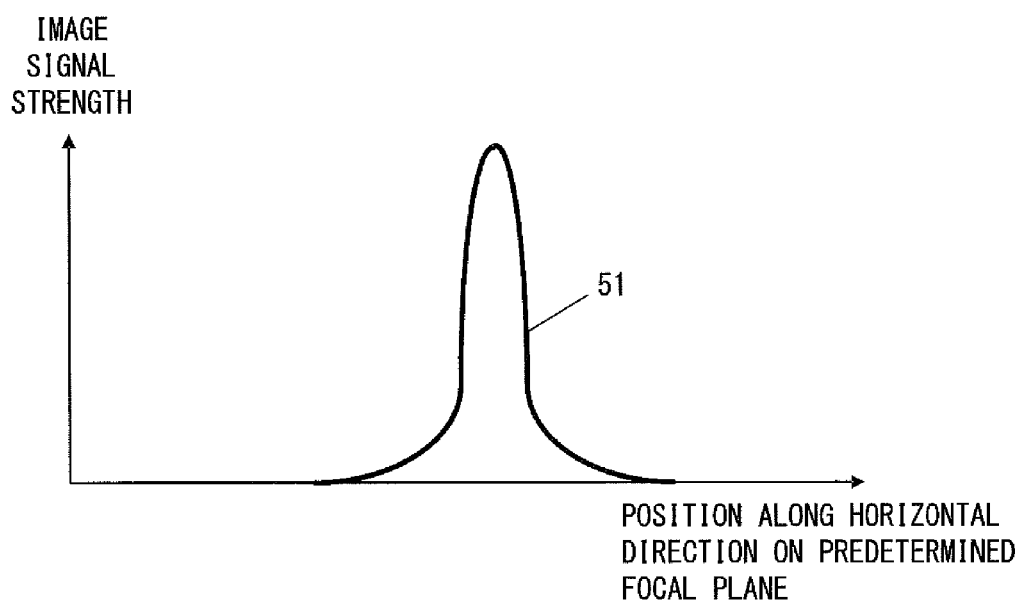
FIG. 9 presents an example of a point image distribution (point image distribution function) of a point image formed with a photographic light flux on the predetermined focal plane.
Figure 10:
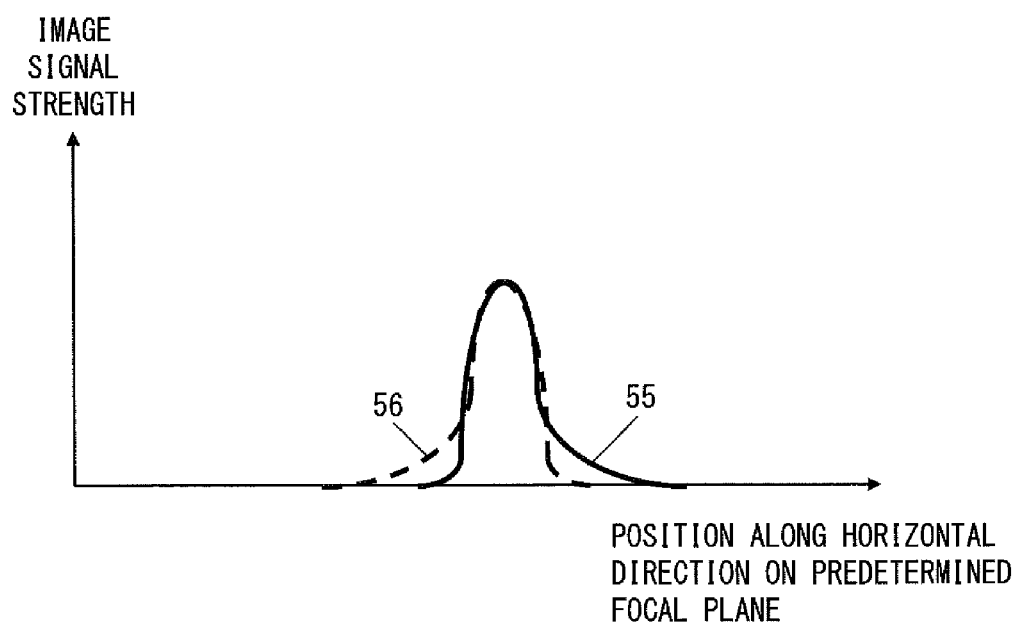
FIG. 10 presents an example of a pair of point image distributions (point image distribution functions) with regard to point images formed with a pair of focus detection light fluxes on the predetermined focal plane.

FIG. 9 presents an example of a point image distribution 51 (point image distribution function) of a point image formed with a photographic light flux on the predetermined focal plane 98 in the state shown in FIG. 8, i.e., when the optimal image plane is formed on the predetermined focal plane 98. The distribution curve has a marked peak at the center thereof with the two sides of the peak forming symmetrical foot portions. FIG. 10 presents an example of a pair of point image distributions (point image distribution functions) of point images formed with a pair of focus detection light fluxes on the predetermined focal plane 98 in the same state, i.e., when the optimal image plane is formed on the predetermined focal plane 98. The solid line indicates a point image distribution 55 of the point image formed with the focus detection light flux having passed through the area 95, whereas the dotted line indicates a point image distribution 56 of the point image formed with the focus detection light flux having passed through the area 96. It is to be noted that in FIG. 9 and FIG. 10, the position taken on the predetermined focal plane 98 along the horizontal direction is indicated along the horizontal axis and the image intensity is indicated along the vertical axis. In addition, the peak positions in the point image distributions 51, 55 and 56 are all at the center of the image plane, i.e., at the position at which the optical axis 91 intersects the predetermined focal plane 98.

While the point image distributions 55 and 56 are similar to the point image distribution 51 in that they each have a significant peak at the center thereof with the two sides of the peak forming foot portions, the foot portions in both point image distributions 55 and 56 are asymmetrical. While the right-side foot portion in the point image distribution 55 extends over a significant range, its left-side foot portion has hardly any range. The left-side foot portion in the point image distribution 56 extends over a significant range, its right-side foot portion has hardly any range. In addition, since the pair of focus detection light fluxes have a complementary relation to the photographic light flux and the pair of focus detection light fluxes combined are equivalent to the photographic light flux, the pair of image signals expressed with the point image distribution 55 and the point image distribution 56 may be added together to synthesize the point image distribution 51. As FIG. 9 and FIG. 10 indicate, the point image distribution 51 of the point image formed on the optical axis achieves left/right symmetry, whereas the point image distribution 55 and the point image distribution 56 of the point images formed on the optical axis achieve matching shapes if one of them is flipped along the left/right direction. When the point images are formed away from the center of the image plane, i.e., off the optical axis, the shapes of the point image distributions 51, 55 and 56 become further altered from those shown in FIG. 9 and FIG. 10 in correspondence to the positions at which the point images are formed relative to the optical axis, i.e., in correspondence to the image heights. As a result, the point image distribution 51 no longer achieves left/right symmetry and the shapes of the point image distribution 55 and the point image distribution 56 no longer match each other even if one of them is inverted along the left/right direction.

Generally speaking, as long as the extent of aberration at the photographic optical system is small or harmless, the point image distributions 51, 55 and 56 of point images formed on the optimal image plane each achieves a shape with its foot portions widening to a small extent relative to the size of the peak portion. Under such conditions, the pair of point image distributions 55 and 56 achieve shapes substantially identical to each other and the positions of the pair of point images substantially match each other, as well.

Normally, the distribution function of an image signal expressing a subject image formed via a photographic optical system manifesting some aberration is equivalent to the results of a convolution operation executed by convolving the distribution function of an image signal expressing a point image formed through the photographic optical system manifesting aberration with the distribution function of an image signal of a subject image formed when no aberration manifests.

This means that when the extent of aberration is not significant or when a regular subject is photographed through a good photographic optical system, the shapes of a pair of subject images formed on the optimal image plane with a pair of focus detection light fluxes will substantially match and the positions of the pair of subject images will also match. Thus, no significant error will occur as a result of focus detection executed in correspondence to the first image shift amount calculated through the first image shift detection operation processing based upon the premise that a focus match is achieved when the image shift amount is 0, at which the degree of coincidence between the pair of subject images is at its highest.

However, when a regular subject is photographed via a photographic optical system manifesting a large extent of aberration, the shapes of the pair of subject images formed on the optimal image plane with a pair of focus detection light fluxes will not match. Thus, a significant error will occur in focus detection executed based upon the first image shift amount calculated through the first image shift detection operation processing on the premise that a focus match is achieved when the image shift amount is 0, at which the degree of coincidence between the pair of subject images is at its highest.

Figure 11:
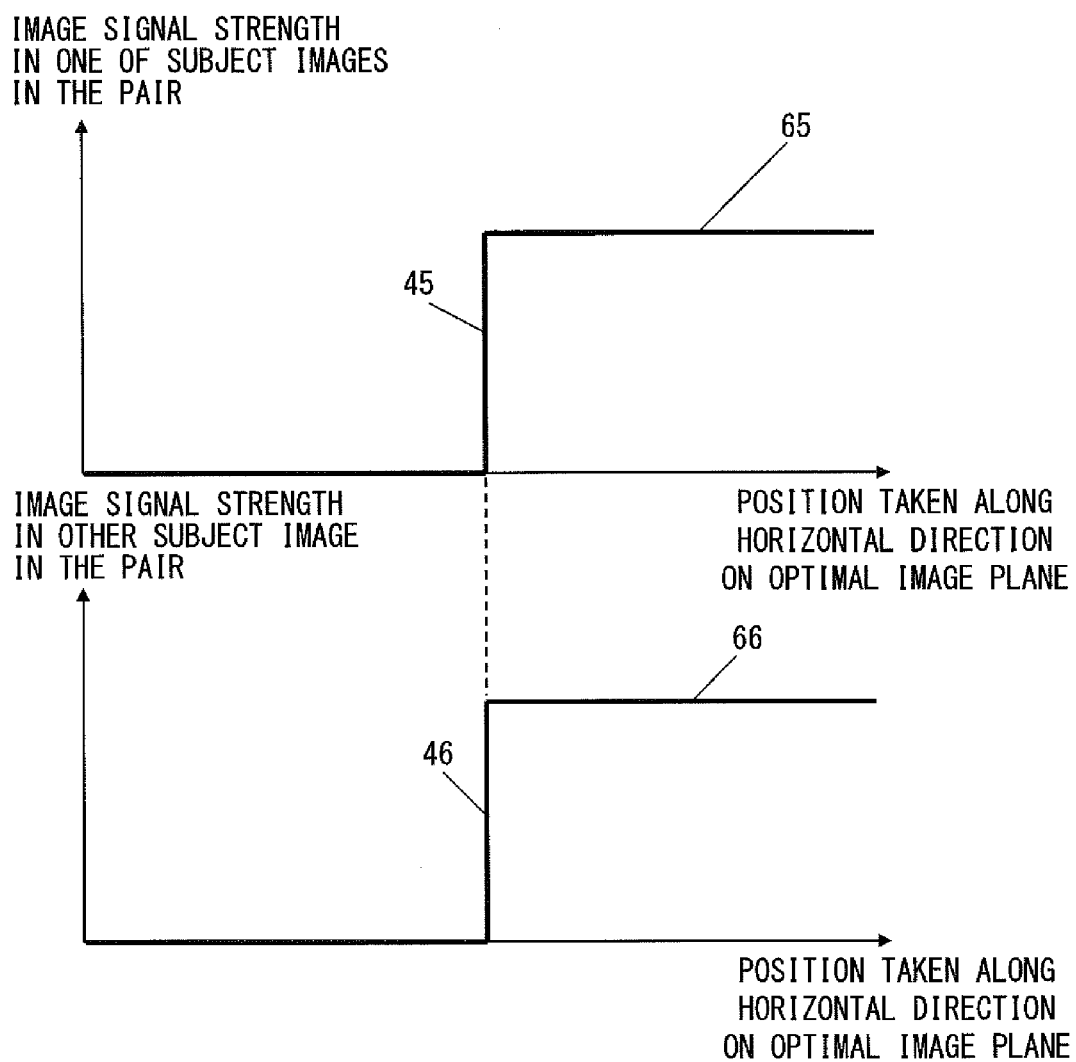
FIG. 11 shows subject images of a subject having a monochromatic edge formed on an optimal image plane with a pair of focus detection light fluxes through a photographic optical system with no aberration.

FIG. 11 shows subject images of a subject with a monochromatic edge, formed on the optimal image plane with a pair of focus detection light fluxes through a photographic optical system with no aberration. A subject image 65 is formed with a focus detection light flux having passed through the area 95 in FIG. 8, whereas a subject image 66 is formed with a focus detection light flux having passed through the area 96 in FIG. 8. The position of an edge portion 45 in the subject image 65 and the position of an edge portion 65 in the subject image 66 match, and in this case, the first image shift amount is calculated to be 0 through the first image shift detection operation executed based upon the degree of coincidence between the pair of image signals.

Figure 12:
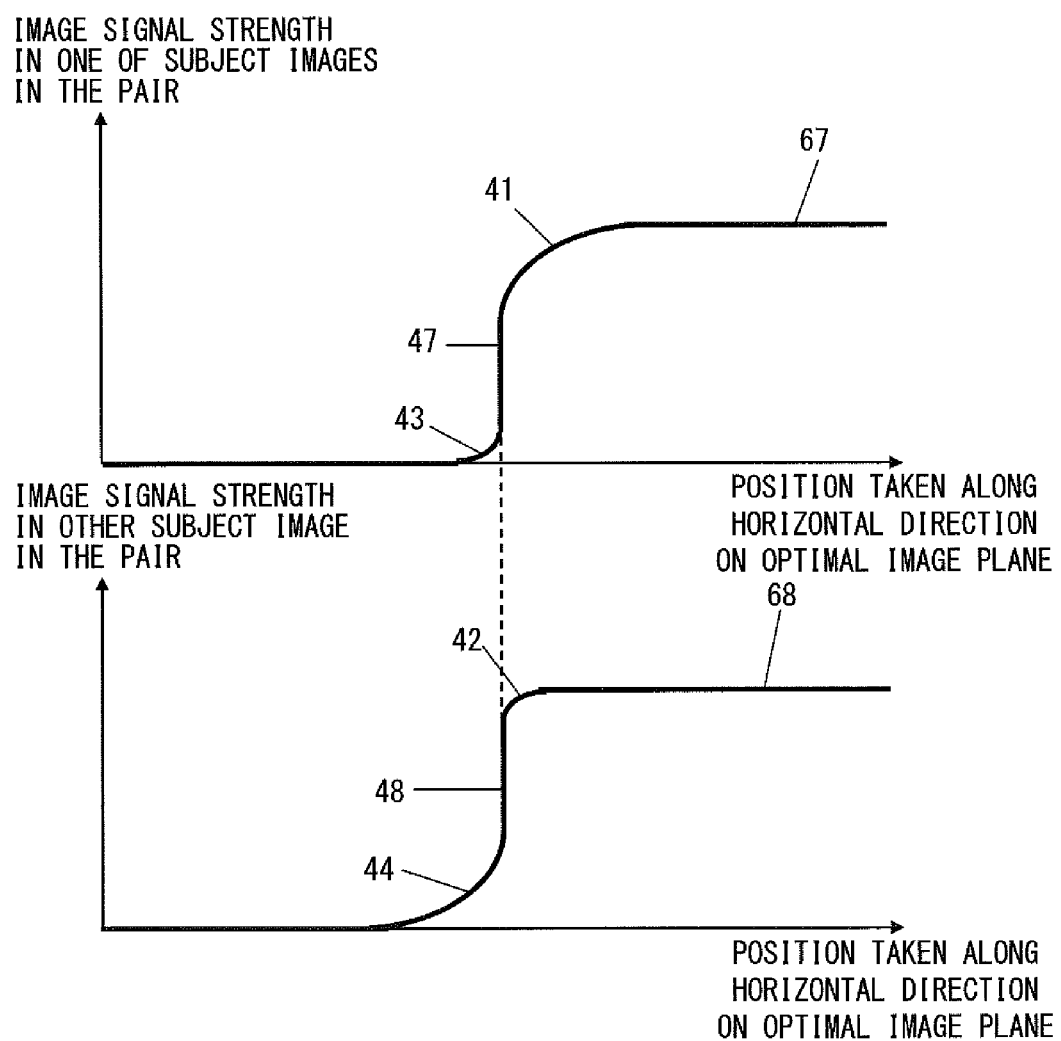
FIG. 12 shows subject images formed on an optimal image plane with a pair of focus detection light fluxes through a photographic optical system manifesting a significant aberration.

FIG. 12 shows subject images of a subject with a monochromatic edge identical to the subject of the images in FIG. 11, formed on the optimal image plane with a pair of focus detection light fluxes through a photographic optical system with significant aberration. It is assumed that the distributions of the pair of point images formed on the optimal image plane with the pair of focus detection light fluxes having passed through this photographic optical system are represented by the point image distribution functions 55 and 56 shown in FIG. 10. A subject image 67 is an edge image formed with the focus detection light flux having passed through the area 95. This edge image is equivalent to an image obtained by convolving the point image distribution function 55 with the subject image 65 formed through the photographic optical system with no aberration. A subject image 68 is an edge image formed with the focus detection light flux having passed through the area 96. This edge image is equivalent to an image obtained by convolving the point image distribution function 56 with the subject image 66 formed through the aberration-free photographic optical system.

While the pair of subject images 67 and 68 are images of the same subject, the shapes of these two subject images, i.e., the patterns expressed with the pair of image signals, greatly differ, since the distributions of the pair of point images formed with the pair of focus detection light fluxes are not the same. For instance, the shape of an upper portion 41 of an edge 47 in the subject image 67 greatly differs from the shape of an upper portion 42 of an edge 48 in the subject image 68. In addition, the shape of a lower portion 43 of the edge 47 in the subject image 67 greatly differs from the shape of a lower portion 44 of the edge 48 in the subject image 68. When the optimal image plane and the predetermined focal plane are in alignment, the image shift amount, detected through image shift detection executed for the pair of subject images 67 and 68 with different appearances, will not be 0. For instance, the image plane corresponding to a first image shift amount $\Delta$ ($\Delta \neq 0$), calculated through the first image shift detection operation executed based upon the degree of coincidence in the pair of image signal strings in this condition, will be, for instance, a plane 99 in FIG. 8.

Figure 13:
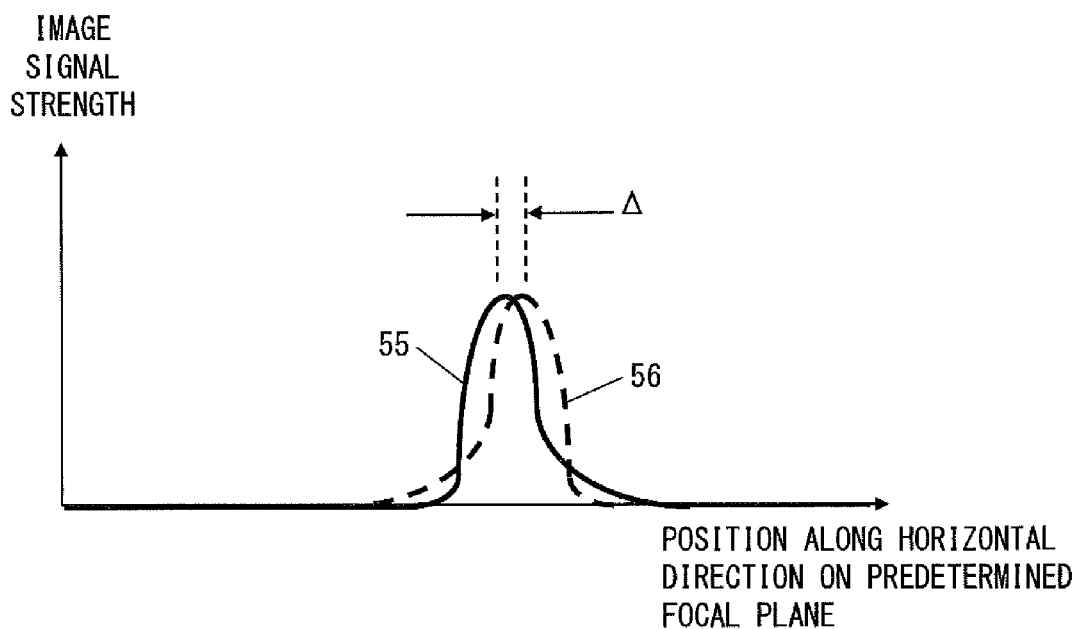
FIG. 13 shows a pair of point image distributions offset relative to each other by an extent matching the image shift amount superimposed upon each other.

Such an error (image shift amount $\Delta$) occurs since the distributions of the pair of point images formed with the pair of focus detection light fluxes at the optimal image plane do not match, as described earlier. While the peak positions of the point image distributions 55 and 56 in FIG. 10 match at the optimal image plane, the first image shift amount $\Delta$ determined through the first image shift detection operation processing executed based upon the degree of coincidence between the pair of image signal strings in conjunction with the point image distributions 55 and 56 will not be 0. FIG. 13 shows the point image distributions 55 and 56 overlaid by displacing them relative to each other by an extent matching the first image shift amount $\Delta$. Namely, in the first image shift amount detection operation executed based upon the degree of coincidence between the pair of image signal strings, the condition shown in FIG. 13 will be judged to be a state in which the degree of coincidence between the point image distributions 55 and 56 is at its highest.

As explained above, when a photographic optical system with significant aberration is used, the identicalness of the pair of the subject images cannot be kept intact and thus, an error is bound to occur in the image shift amount detection through the first image shift amount detection operation executed based upon the degree of coincidence between the pair of image signal strings.

Second image shift amount detection operation processing executed based upon an image quality evaluation value, which enables highly accurate image shift amount detection even when the identicalness of the pair of image signal patterns is compromised as described above, will be described next. The second image shift amount detection operation processing is executed in step S130 in FIG. 6. In the second image shift amount detection operation processing according to the present invention, a second image shift amount is detected based upon an image quality evaluation value used to evaluate an image quality such as the sharpness, the resolution, the contrast or the frequency characteristics (MTF) of a synthetic subject image obtained by adding together the pair of image signals.

Figure 14:
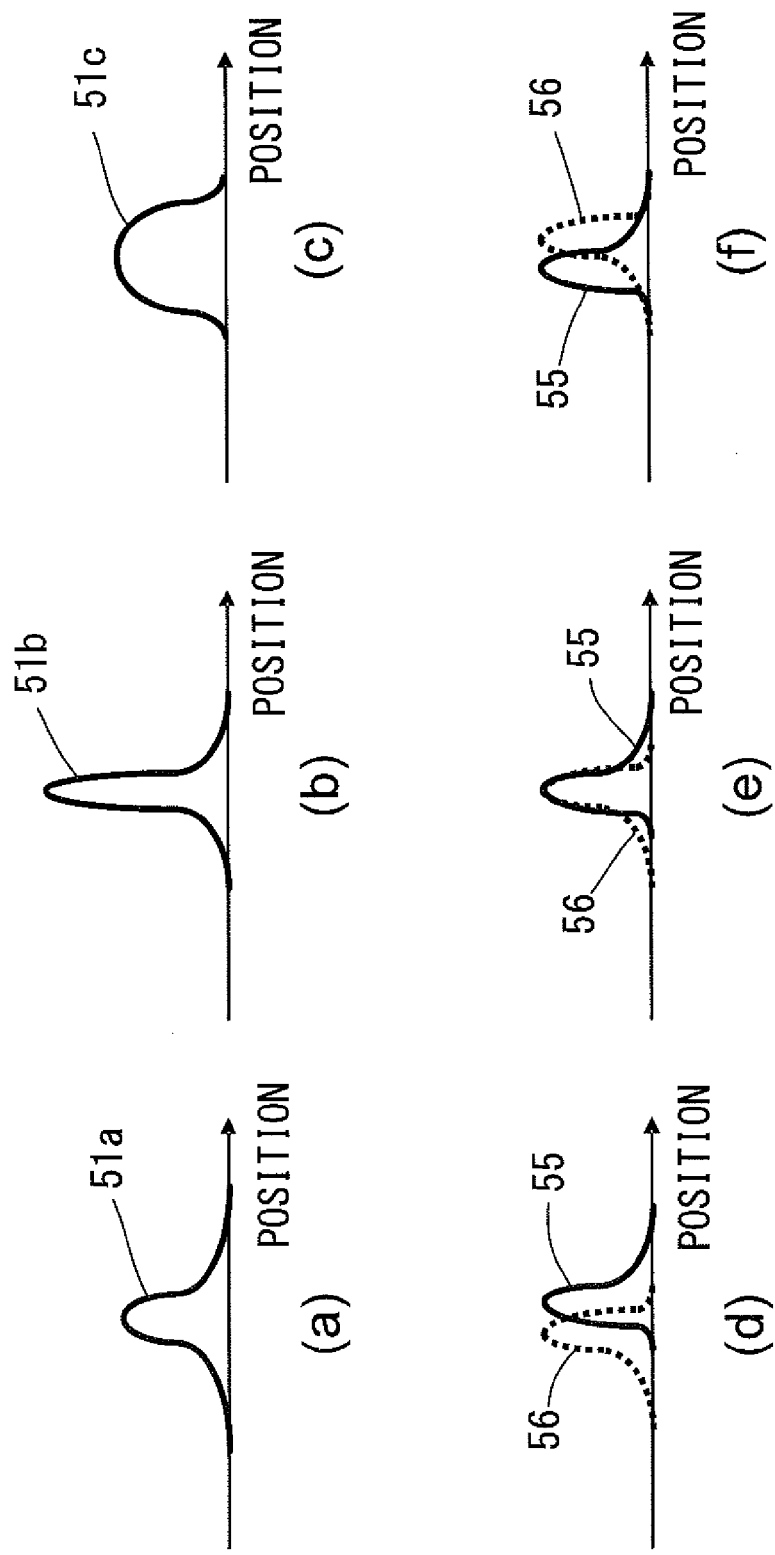
FIG. 14 provides illustrations in reference to which the principle of the image shift amount detection achieved based upon contrast evaluation will be described.

FIG. 14 provides illustrations in reference to which the principle of the second image shift amount detection based upon the image quality evaluation value will be explained. FIGS. 14(d), 14(e) and 14(f) each show the pair of point image distributions 55 and 56 of the pair of point images formed with a pair of focus detection light fluxes on the predetermined focal plane, overlaid one on the other by adjusting their positions relative to each other. The point image distribution 55 indicated by the solid line is achieved with the focus detection light flux having passed through the area 95, whereas the point image distribution 56 indicated by the dotted line is achieved with the focus detection light flux having passed through the area 96. FIGS. 14(a), 14(b) and 14(c) respectively show point image distributions 51a, 51b and 51c each achieved by overlaying a pair of point image restrictions with their positions shifted relative to each other and combining the distribution through addition. A relative position Pa of the pair of point image distributions in FIG. 14(a) and FIG. 14(d), a relative position Pb of the pair of point image distributions in FIG. 14(b) and FIG. 14(e), and a relative position Pc of the pair of point image distributions in FIG. 14(c) and FIG. 14(f) are different from one another. In the second image shift amount detection operation processing executed based upon the image quality evaluation value, the relative position of the pair of point image distributions is altered in an order of, for instance, the relative position Pa of the pair of point image distributions in FIGS. 14(a) and 14(d), the relative position Pb of the pair of point image distributions in FIGS. 14(b) and 14(e), the relative position Pc of the pair of point image distributions in FIGS. 14(c) and 14(f). Namely, the point image distributions 51a, 51b and 51c are intensity distributions of a plurality of synthetic image signals each corresponding to one of a plurality of different shift amounts k.

At the relative position Pb of the pair of point image distributions shown in FIGS. 14(b) and 14(e), a highest peak value is achieved in the point image distribution 51b of the synthetic image signal. This means that the highest image quality is achieved and a point image distribution best approximating the point image distribution (see FIG. 9) of the point image formed with the photographic light flux when the optimal image plane and the predetermined focal plane are in alignment with each other is achieved. In addition, as the relative position of the pair of point image distributions shifts further away from Pb toward the position Pa or Pc, the peak value becomes lower as indicated in the point image distributions 51*a* and 51*c* for the corresponding synthetic image signals, and thus, the image quality becomes lower.

Namely, accurate image shift amount detection is enabled in conjunction with point images by generating a synthetic subject image based upon a pair of point image distributions, the relative position of which is sequentially shifted and designating the relative position at which the image signal expressing the synthetic subject image takes on the highest peak value and thus the image quality is at its highest, even when the similarity between the pair of point image distributions is low.

This image shift detection principle can likewise be extended to image shift detection for standard subject images. A pair of subject images formed with a pair of focus detection light fluxes are equivalent to the results obtained by convolving point image distributions such as those described above with a subject image formed through a photographic optical system with no aberration. Accordingly, accurate image shift amount detection for a standard subject image is enabled by generating a synthetic image based upon a pair of subject images with the positions thereof relative to each other sequentially altered and designating the relative position at which the highest image quality with regard to the sharpness, the resolution, the contrast or the MTF of the synthetic image is achieved as an image shift amount (second image shift amount).

In the second image shift amount detection executed based upon the image quality evaluation value, as described above, the complementary relation of the pair of focus detection light fluxes to a photographic light flux, i.e., the pair of focus detection light fluxes integrated together is equivalent to a photographic light flux, is used to advantage, a synthetic subject image equivalent to a subject image formed with a photographic light flux is generated by adding together the pair of subject images formed with the pair of focus detection light fluxes as the image positions are shifted relative to each other, and the shift amount at which the image quality evaluation value for indicating the quality of the synthetic subject image takes on the highest value is designated as the second image shift amount.

While evaluation of the image quality of the subject image in the second image shift amount detection executed based upon the image quality evaluation value is similar to contrast-based focus detection in that the image quality evaluation in the second image shift amount detection is equivalent to that in contrast-based focus detection, it is still distinguishable in the following aspect. In contrast-based focus detection, the photographic optical system needs to be driven along a scanning direction running along the optical axis in order to detect the peak in the image quality by altering the image quality. In contrast, the image quality can be varied without having to drive the photographic optical system in the scanning direction running along the optical axis in the image quality evaluation value-based second image shift amount detection. The second image shift amount detection can be executed based upon the image quality evaluation value simply by displacing the pair of image signal string relative to each other. In the image quality evaluation value-based second image shift amount detection, this relative displacement of the pair of image signal strings achieves a purpose equivalent to that of the scanning drive of the photographic optical system along the optical axis in contrast-based focus detection. In other words, the image quality evaluation value-based second image shift amount detection is advantageous in that it does not require the scanning drive of the photographic optical system along the optical axis each time focus detection needs to be executed.

Figure 15:
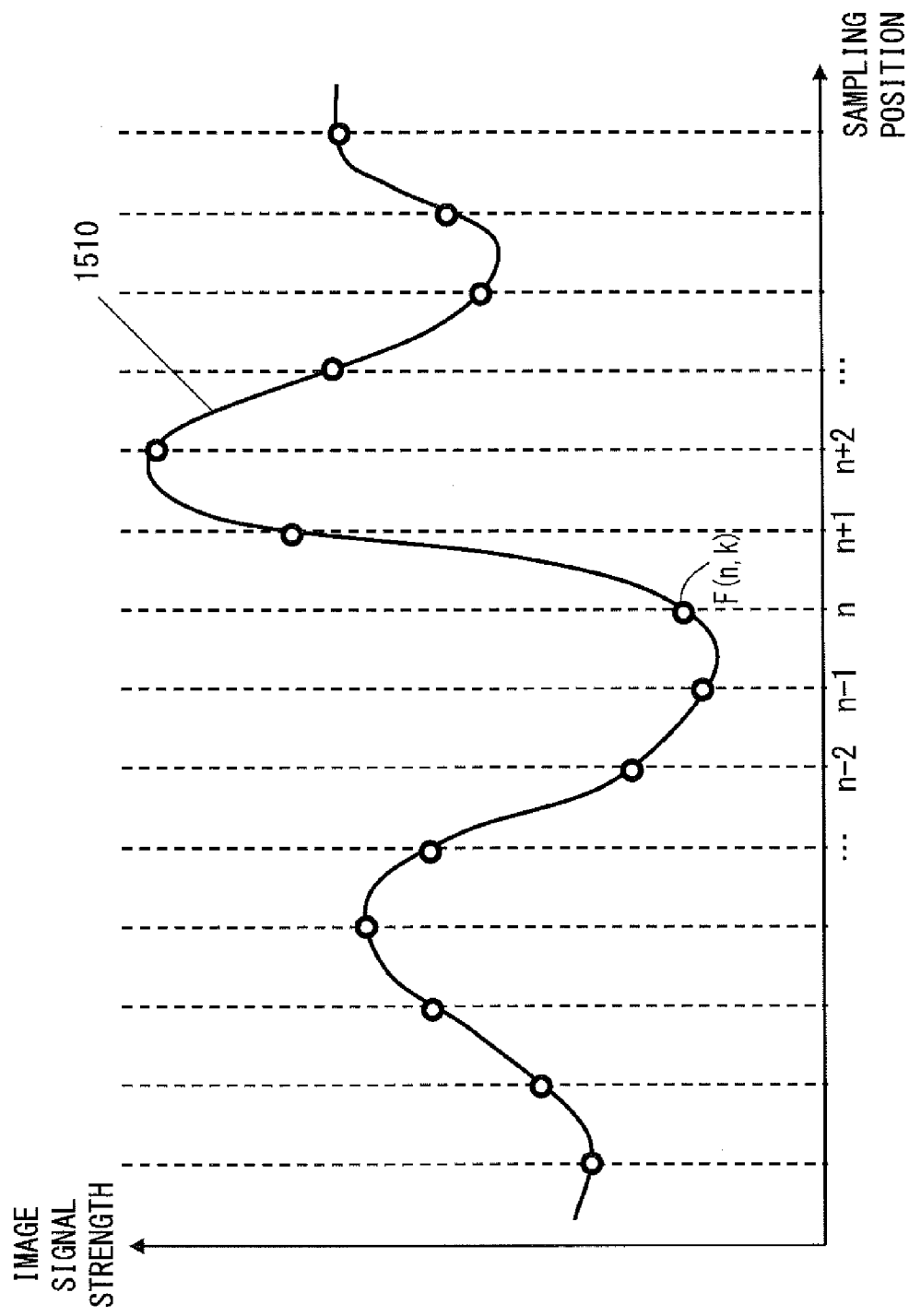
FIG. 15 indicates the relationship between the sampling position determined based upon the focus detection pixel pitch and the synthetic image signal strength (synthetic image signal string).

Next, evaluation for the image quality of the synthetic subject image with regard to a factor such as the sharpness, the resolution, the contrast or the MTF of the synthetic subject image, will be explained in specific terms. The synthetic image signal string F(n, k) shown in FIG. 15 is generated through an image-shifting addition operation executed as expressed in (8) below on a pair of data strings $A_1$ through $A_M$ and $B_1$ through $B_M$ each made up with M sets of data, which correspond to a pair of image signal strings read out from the focus detection pixel row (n=|k|, |k|+1, . . . , M−1−|k|, M−|k|). The image shift amount k in expression (8) is an integer, which indicates a relative shift amount set in units matching the signal pitch in the data strings.

$$F(n,k)=A_n+B_{n+k} \quad (8)$$

In FIG. 15, sampling positions set based upon the focus detection pixel pitch are indicated along the horizontal axis and varying synthetic image signal strengths (in the synthetic image signal string) are indicated along the vertical axis. By sampling the synthetic image signal strength, represented by the solid line 1510, through spatially discrete sampling at sampling positions incremented/decremented by an extent matching the focus detection pixel pitch, the synthetic image signal string F(n, k) made up with sets of sampled data each marked with an unfilled circle ○ is obtained.

A sharpness evaluation operation is executed for the synthetic image signal string F(n, k) obtained as described above, as expressed in (9) below so as to calculate a sharpness evaluation value for the synthetic image signal at an image shift amount k. The sharpness evaluation value thus calculated is then used as an image quality evaluation value P(k).

$$P(k)=\Sigma|F(n,k)-F(n+v,k)| \quad (9)$$

The Σ operation in expression (9) is executed over the range taken for the variable it Expression (9) represents an operation executed to calculate the sum total of the absolute values each corresponding to a first-order difference at an integer v indicating a specific signal pitch in the synthetic image signal string F(n, k). When a higher level of sharpness is achieved in the synthetic image signal string F(n, k), the individual differences are greater and thus the sharpness evaluation value P(k), too, takes on a greater value. A given first-order difference between the synthetic image signal corresponds to the extent of inclination of an edge in the synthetic subject image, and the image appears more sharply defined when the inclination is steeper. In this sense, expression (9) may be regarded as an operation expression for evaluation of the sharpness in the synthetic image signals. When the value of the integer v indicating the signal pitch is smaller, a higher spatial frequency component is extracted. The integer v representing the signal pitch takes a value determined through testing based upon the MTF characteristics of the subject, the focus detection pixel pitch, the extraction-target spatial frequency and the like.

Figure 16:
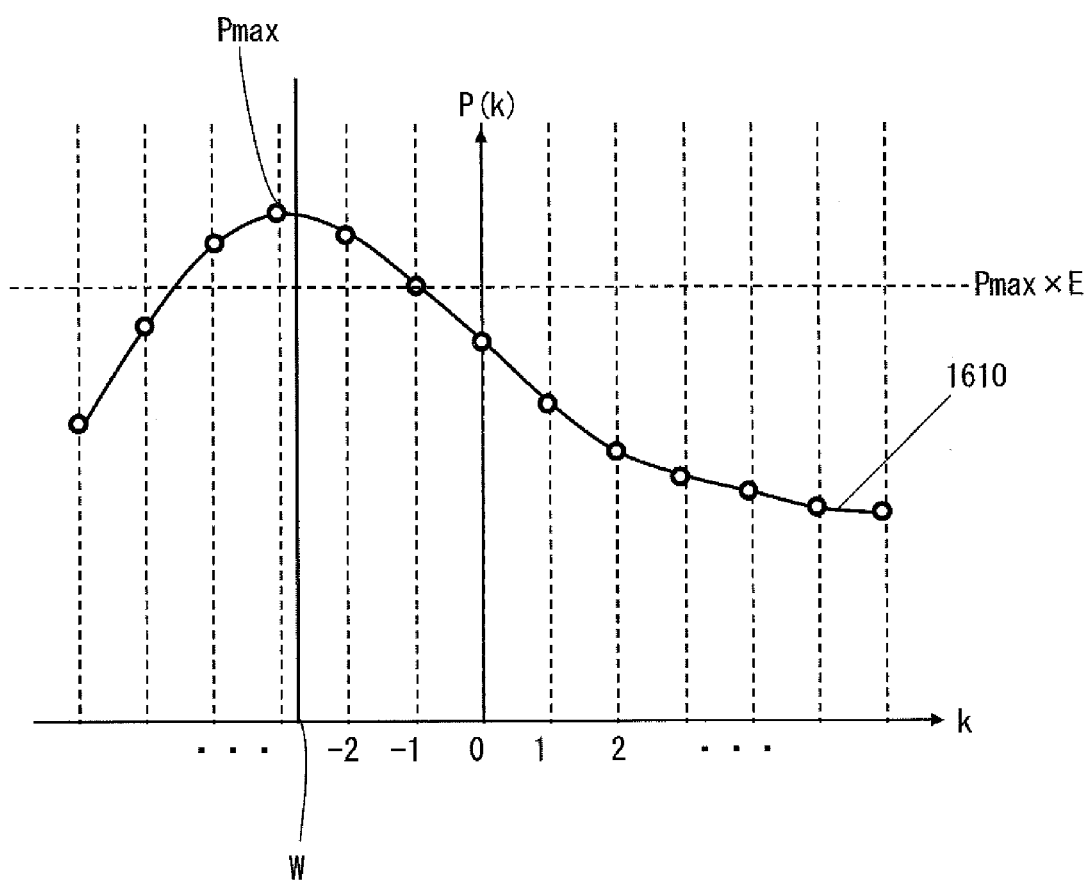
FIG. 16 indicates how the sharpness in synthetic subject image signal data changes in correspondence to the image shift amount.

Through the arithmetic operation executed as expressed in (9) by sequentially altering the image shift amount k, a graph such as that shown in FIG. 16, with the sharpness evaluation value P(k) taking on a local maximum value Pmax, i.e., the greatest value, at an image shift amount at which a high degree of sharpness is achieved in the synthetic image signal string F(n, k) is obtained. The image shift amount at which the local maximum value Pmax is achieved may be directly designated as the second image shift amount, i.e., the results of the second image shift detection operation. As an alternative, the sharpness evaluation value P(k), which is calculated discretely, may be rendered into a continuous function as indicated by the solid line 1610 in FIG. 16 through curve fitting or the like of the known art and the second image shift amount may thus be calculated in units equal to or smaller than the sampling pitch unit. For instance, the second image shift amount may be detected at a middle point W of a specific range above an evaluation value obtained by multiplying the local maximum value Pmax by a predetermined value E(0<E<1), i.e., a specific range into which the local maximum value Pmax falls. The predetermined value E, which is determined through testing based upon the tightness of the curve in the graph of the sharpness evaluation value P(k) in FIG. 16, may be approximately 90% if the curve is tight and approximately 70% if the curve is wide.

In addition, the second image shift amount may be calculated in units equal to or smaller than the sampling pitch unit in the following manner First, instead of generating a synthetic image by adding together the data corresponding to the pair of image signals obtained over the focus detection pixel pitches, a pair of sets of image signal data, with smaller sampling intervals than those matching the focus detection pixel pitch are generated through data interpolation. The pair of sets of image signal data are shifted relative to each other in the smaller sampling pitch unit. The shifted image signal data are then added together to generate synthetic image signals. Values for the sharpness evaluation value are calculated in conjunction with the synthetic image signals, and the displacement amount (shift amount) at which the sharpness evaluation value takes on the local maximum value is designated as the second image shift amount determined in units equal to or smaller than the sampling pitch.

The sharpness evaluation operation does not need to be executed as expressed in (9), as long as the image quality evaluation value P(k) pertaining to the sharpness in the synthetic image signals at the image shift amount k can be calculated through the operation. The operation may instead be executed as expressed in, for instance, (10) below.

$$P(k)=\text{Max}(|F(n,k)-F(n+v,k)|) \qquad (10)$$

The function Max(z) in expression (10) is a function for extracting the maximum value taken for a variable z, and calculation is executed for the function over the range of the variable n. Through the operation executed as expressed in (10), the maximum value, among the absolute values each representing a first-order difference at the integer v indicating the predetermined signal pitch in the synthetic image signal string F(n, k), is obtained. When the level of sharpness in the synthetic image signal string F(n, k) is higher, the inclination of an edge in the synthetic subject image becomes steeper and when the sharpness evaluation value P(k) calculated as expressed in (10), too, takes on a greater value. At the image shift amount at which the highest level of sharpness is achieved in the synthetic image signal string F(n, k), the greatest value is taken for the sharpness evaluation value P(k).

The image quality evaluation operation is not limited to the sharpness evaluation operation executed as expressed in (9) or (10), and instead, an image quality evaluation value P(k) pertaining to characteristics other than the sharpness in the synthetic image signals at the image shift amount k may be calculated. For instance, an operation may be executed as expressed in (11) below so as to evaluate the resolution in the synthetic image signals.

$$P(k)=\Sigma|-F(n-v,k)+2\times F(n,k)-F(n+v,k)| \qquad (11)$$

The Σ operation in expression (11) is executed over the range taken for the variable n. Expression (11) represents an operation executed to calculate the sum total of the absolute values each corresponding to a second-order difference at an integer v indicating a specific signal pitch in the synthetic image signal string F(n, k). When higher resolution is achieved in the synthetic image signal string F(n, k), the individual differences are greater and thus the resolution evaluation value P(k), too, takes on a greater value. The second-order differences in expression (11) assume band pass filter characteristics, and when the value of the integer v indicating the signal pitch is smaller, a higher spatial frequency component is extracted. Accordingly, expression (11) can be regarded as an operation expression used for evaluation of the resolution in the synthetic image signals. The maximum value is taken for the resolution evaluation value P(k) at the image shift amount at which the highest level of resolution is achieved in the synthetic image signal string F(n, k).

The resolution evaluation operation does not need to be executed as expressed in (11), as long as the image quality evaluation value P(k) pertaining to the resolution in the synthetic image signals at the image shift amount k can be calculated through the operation. The operation may instead be executed as expressed in, for instance, (12) below.

$$P(k)=\text{Max}(|-F(n-v,k)+2\times F(n,k)-F(n+v,k)|) \qquad (12)$$

The function Max(z) in expression (12) is a function for extracting the maximum value for a variable z, and calculation is executed for the function over the range of the variable n. Through the operation executed as expressed in (12), the maximum value among the absolute values each representing a second-order difference at the integer v indicating the predetermined signal pitch in the synthetic image signal string F(n, k), is obtained. When the higher resolution in achieved in the synthetic image signal string F(n, k), the high-frequency component in the synthetic image signals increases, and thus, the resolution evaluation value P(k) calculated as expressed in (12), too, takes on a greater value. At the image shift amount at which the highest level of resolution is achieved in the synthetic image signal string F(n, k), the greatest value is taken for the resolution evaluation value P(k).

The image quality evaluation operation may be executed to calculate an image quality evaluation value P(k) pertaining to the contrast in correspondence to the image shift amount k. For instance, an operation may be executed as expressed in (13) below so as to evaluate the contrast in the synthetic image signals.

$$P(k)=\{\text{Max}(F(n,k))-\text{Min}(F(n,k))\}/\{\text{Max}(F(n,k))+\text{Min}(F(n,k))\} \qquad (13)$$

The function Max(z) in expression (13) is a function for extracting the maximum value for a variable z, and calculation is executed for the function over the range of the variable n. The function Min(z) is a function for extracting the minimum value for the variable z, and calculation is executed for the function over the range of the variable n. Expression (13) is an operation expression for calculating the contrast in the synthetic image signal string F(n, k), and as the contrast in the synthetic signals is higher, a greater value is calculated through expression (13) for the contrast evaluation value P(k). At the image shift amount at which the highest level of contrast is achieved in the synthetic image signal string F(n, k), the greatest value is taken for the contrast evaluation value P(k).

The image quality evaluation operation may be executed to calculate an image quality evaluation value P(k) pertaining to the frequency characteristics, i.e., the MTF (modulation transfer function) characteristics, in correspondence to the image shift amount k. An image quality evaluation value P(k) pertaining to the MTF may be calculated as described below.

Figure 17:
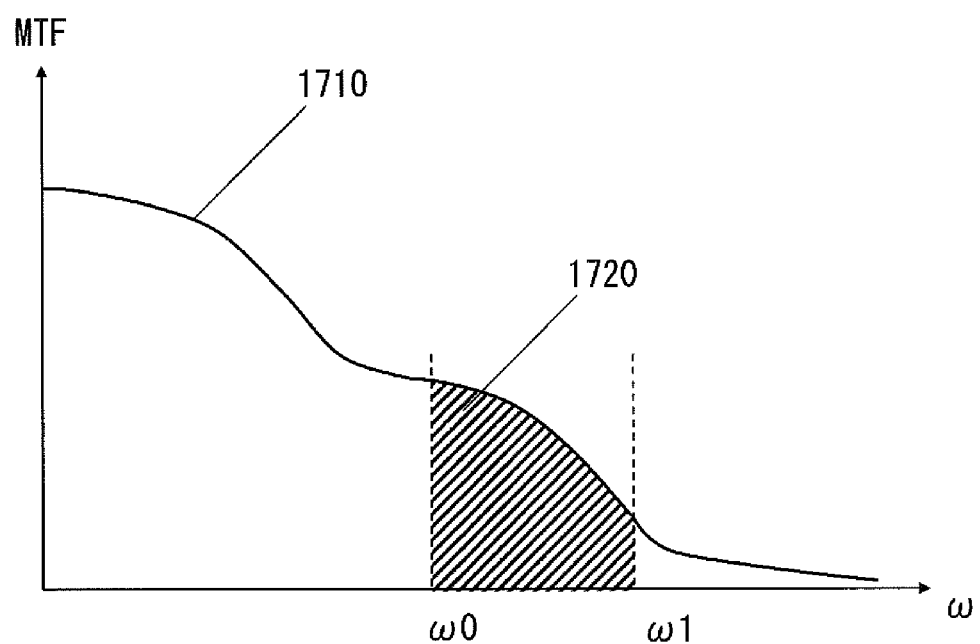
FIG. 17 indicates the MTF of the synthetic subject image signal.

The solid line 1710 in FIG. 17 represents the MTF of the synthetic image signals, obtained through a Fourier transform of the synthetic image signal string F(n, k) shown in FIG. 15, with the spatial frequency ω indicated along the horizontal axis and the MTF value indicated along the vertical axis. The image quality evaluation value P(k) pertaining to the MTF of the synthetic image signals is obtained by integrating the MTF of the synthetic image signals over a high-frequency band (ω0 through ω1) in this graph, over which the MTF contributes to image qualities such as sharpness, resolution and contrast in the synthetic image signals. This image quality evaluation value P(k) matches the areal size of the shaded area 1720 in FIG. 17. The MTF evaluation value P(k) takes the maximum value at the image shift amount at which the highest MTF is achieved in the synthetic image signal string F(n, k).

In the second image shift detection operation described above, synthetic image signals each equivalent to an image signal generated in the contrast-based focus detection, expressing an image formed with a photographic light flux when the photographic optical system is scanned along the optical axis, are synthetically generated by adding together a pair of signal image strings as they are shifted relative to each other. Since the image quality with respect to the sharpness, the resolution, the contrast, the MTF or the like is evaluated in conjunction with the synthetic image signals, error-free, accurate image shift amount detection is enabled even when the identicalness of the patterns of the pair of image signals formed with the pair of focus detection light fluxes is compromised.

Second Embodiment

A focus detection device adopting the split-pupil phase detection method of the known art assures a relatively high level of image shift detection accuracy and is able to complete focus detection within a relatively short processing time, even when a large extent of defocus manifests, as long as it is free of adverse factors such as aberration at an optical system. In a digital camera 201 equipped with the focus detection device achieved in the second embodiment, the second image shift detection operation processing is executed only in a near focus match state in which highly accurate image shift detection operation is required.

Figure 18:
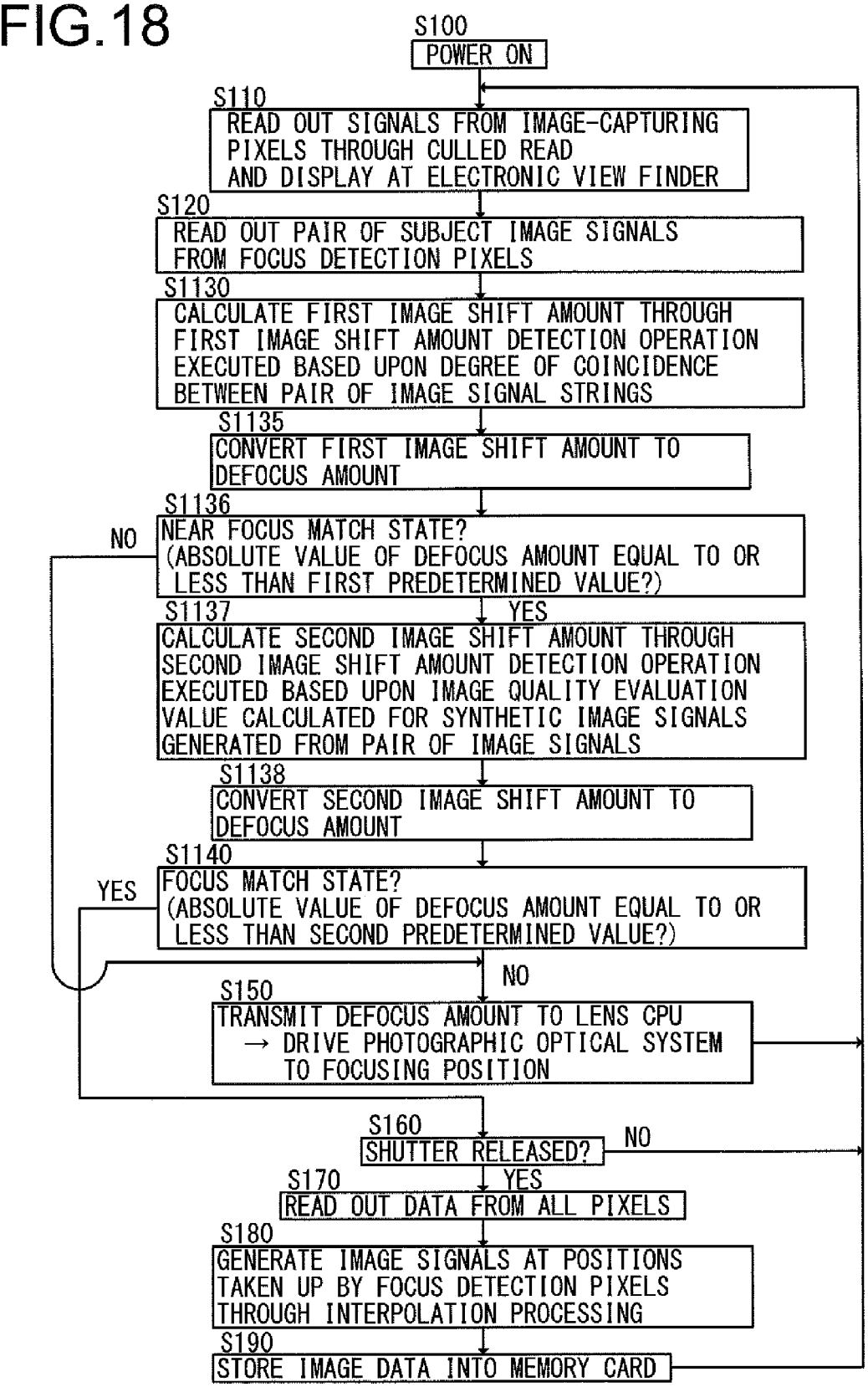
FIG. 18 presents a flowchart of operations executed in the body control device in the digital camera.

FIG. 18 presents a flowchart of operations executed in the body control device 214 in the digital camera 201 in the embodiment. The flowchart in FIG. 18 includes steps S1130, S1135, S1136, S1137, S1138 and S1140, executed instead of step S130 and step S140 in the flowchart presented in FIG. 6. The second image shift amount detection operation processing is executed in step S1137 in FIG. 18.

In step S1130, the body control device 214 calculates the first image shift amount by executing the first image shift detection operation processing as described earlier based upon the data in the pair of image signal strings having been read out. As explained earlier, the first image shift detection operation processing is the image shift detection operation processing of the known art executed based upon the degree of coincidence between the pair of image signal strings.

In step S1135, the body control device 214 converts the first image shift amount calculated in step S1130, to a defocus amount.

In step S1136, the body control device 214 makes a decision as to whether or not the current focusing condition of the photographic optical system is deemed a near focus match state, i.e., whether or not the absolute value of the calculated defocus amount is equal to or less than a first predetermined value. The first predetermined value set through experimental testing, may be, for instance, 200 μm. If it is decided that the focusing condition is not deemed a near focus match state, the processing proceeds to step S150. If, on the other hand, it is decided that the current focusing condition is a near focus match state, the processing proceeds to step S1137. It is to be noted that if it is decided in step S1136 that the results of the first image shift detection operation processing indicate that focus detection is not possible, i.e., if the defocus amount calculation cannot be executed or the reliability of the calculated defocus amount is low, the body control device 214 determines that the current focusing condition of the photographic optical system is not a near focus match state and accordingly, the processing proceeds to step S150.

In step S1137, the body control device 214 calculates the second image shift amount by executing the second image shift detection operation processing as described earlier based upon the data in the pair of image signals read out in step S120. As explained earlier, the second image shift detection operation processing is the image shift detection operation processing executed based upon the image quality evaluation value calculated for the synthetic image signals.

In step S1138, the body control device 214 converts the second image shift amount calculated in step S1137 to a defocus amount and then the processing proceeds to step S1140.

In step S1140, the body control device 214 makes a decision as to whether or not the current focusing condition of the photographic optical system is deemed a focus match state, i.e., whether or not the absolute value of the calculated defocus amount is equal to or less than a second predetermined value less than the first predetermined value. The second predetermined value set through experimental testing, may be, for instance, 100 μm. If the body control device 214 decides that the focusing condition of the photographic optical system is not deemed a focus match state, the processing proceeds to step S150.

Once an affirmative decision is made in step S1136, based upon the defocus amount calculated for, for instance, a completely still subject, the second image shift detection operation processing may be executed repeatedly up to several times by returning to step S1136, after executing steps S1137, S1138, S1140 and S150, instead of returning to step S110 after executing steps S1137, S1138, S1140 and S150.

Upon deciding in step S1140 that the current focusing condition of the photographic optical system is a focus match state, the processing proceeds to step S160.

During the first image shift detection operation processing executed in step S1130 in FIG. 18 for purposes of image shift detection based upon the degree of coincidence in the pair of image signals, expression (1) is used in the correlation operation, as in the first embodiment, in order to detect the degree of coincidence between the pair of image signal strings.

It is to be noted that an expression other than expression (1) may be used in the correlation operation executed in order to detect the degree of coincidence between the pair of image signal strings. In other words, any correlation operation expression may be used as long as it enables calculation of the degree of coincidence between the pair of image signal strings.

For instance, the correlation operation may be executed as expressed in (14) by adopting a square operation method (SSD: Sum of Squared Difference), instead of the absolute value operation in expression (1).

$$E(k)=\Sigma(A_n-B_{n+k})^2 \qquad (14)$$

In addition, a correlation operation expressions such as (15), which enables detection of the degree of coincidence between the pair of image signal strings even when the amplitudes in the pair of image signal strings do not match, may be used.

$$E(k)=\Sigma|A_n \cdot B_{n+s+k}-B_{n+k} \cdot A_{n+s}| \qquad (15)$$

It is to be noted that the range of values assumed for the variable n in expression (15) is limited to the range over which data $A_n$, $A_{n+s}$, $B_{n+s}$, $B_{n+s+k}$ are present in correspondence to the image shift amount k. In addition, an optimal integer 1, 2, . . . is selected for the variable s. Any correlation operation expression other than expression (1), (14) or (15) may be used, as long as the degree of coincidence between the pair of image signal strings can be calculated.

In the flowchart presented in FIG. 18, showing the operations executed by the body control device 214 in the digital camera 201, the first image shift detection operation processing or the second image shift detection operation processing is selectively executed in correspondence to the focusing condition of the optical system, which is represented by the absolute value of the defocus amount. The second image shift detection operation processing is executed only in a near focus match state requiring highly accurate image shift detection operation, i.e., only when the absolute value of the defocus amount is equal to or less than the first predetermined value. If the focusing condition is not a near focus match state, i.e., when the absolute value of the defocus amount exceeds the first predetermined value, the second image shift detection operation processing is not executed. The rationale for the selective execution of the second image shift detection operation processing is that when the defocus amount is large, the high-frequency component in the spatial frequency decreases, resulting in a lower image quality evaluation value, and the change in the image quality evaluation value relative to the defocus amount becomes less significant, which is bound to lower the accuracy of the image shift detection operation through the second image shift detection operation processing. In contrast, the low-frequency component in the spatial frequency is also used in the image shift detection in the first image shift detection operation processing, and thus, the accuracy of the image shift detection through the first image shift detection operation processing is not readily lowered even when the defocus amount is more significant.

A focus detection device capable of selectively executing the first image shift detection operation processing or the second image shift detection operation processing assures high accuracy and high efficiency.

The manner in which the first image shift detection operation processing and the second image shift detection operation processing are executed selectively is not limited to that described in reference to the flowchart presented in FIG. 18, in which one of the two types of processing is executed in correspondence to the focusing condition, i.e., the absolute value of the defocus amount. Namely, the first image shift detection operation processing and the second image shift detection operation processing may be selectively executed in any other manner as long as the unique characteristics of the two different types of processing are used to advantage.

Figure 19:
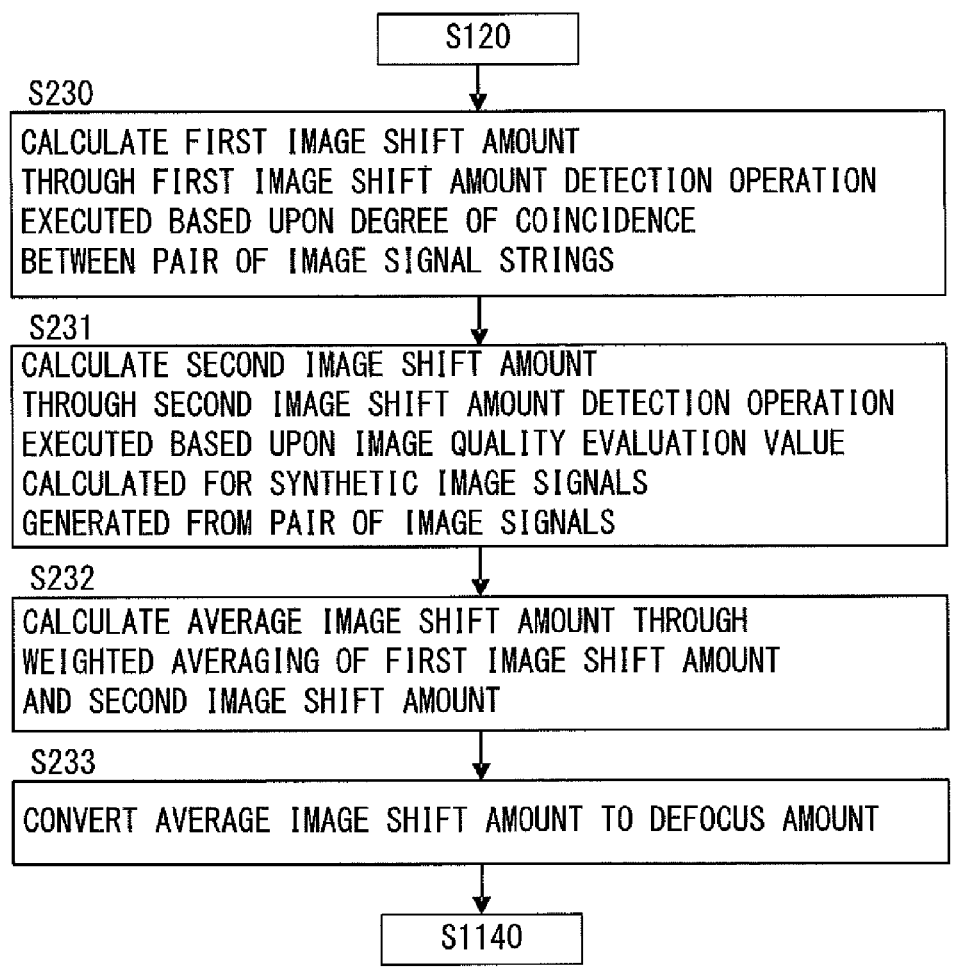
FIG. 19 presents a flowchart of operations executed in the body control device in the digital camera.

Joint Execution of First Image Shift Detection Operation Processing and Second Image Shift Detection Operation Processing FIG. 19 presents a flowchart of operations through which the first image shift detection operation processing and the second image shift detection operation processing are jointly executed and a weighted averaging operation is executed by using the first image shift amount and the second image shift amount resulting from the first image shift detection operation processing and the second image shift detection operation processing respectively. This flowchart shows processing to replace that executed in step S1130 through step S1138 in FIG. 18.

In step S230, the body control device 214 executes the first image shift detection operation processing based upon the pair of image signal strings read out in step S120 and calculates the first image shift amount shft1. The first image shift detection operation processing is image shift detection operation processing executed based upon the degree of coincidence between the pair of image signal strings, as has been explained earlier.

In step S231, the body control device S214 executes the second image shift detection operation processing based upon the pair of image signal strings read out in step S120 and calculates the second image shift amount shft2. The second image shift detection operation processing is image shift detection operation processing executed based upon the image quality evaluation value calculated for the synthetic image signals, as has been explained earlier.

In step S232, the body control device 214 calculates an average image shift amount shftA through a weighted averaging operation by applying weighting coefficients k1 and k2 to the first image shift amount shft1 and the second image shift amount shft2, as expressed in (16) below.

$$shftA=k1 \cdot shft1 \, k2 \cdot shft2, \text{ when } k1+k2=1 \qquad (16)$$

The weighting coefficients k1 and k2 in expression (16) may be adjusted in correspondence to the focusing condition. For instance, the greater value may be assumed for the weighting coefficient k2 relative to the weighting coefficient k1 in a near focus match state. The weighting coefficients k1 and k2 in expression (16) may be adjusted in correspondence to a reliability evaluation value calculated for the first image shift amount shft1 and a reliability evaluation value calculated for the second image shift amount shft2. In this case, the weighting coefficient for the shift amount with the higher reliability should take a value greater than that assumed for the weighting coefficient for the shift amount with the lower reliability. The reliability evaluation value r1 for the first image shift amount shft1 may be calculated by using SLOP in expression (5). The reliability evaluation value r2 for the second image shift amount shft2 may be calculated by using the maximum value Pmax for the sharpness evaluation value in FIG. 17. In this situation, the weighting coefficient k1=r1/(r1+r2) and the weighting coefficient k2=r2/(r1+r2).

In step S233, the body control device 214 converts the average image shift amount shftA having been calculated in step S232 to a defocus amount.

Through these measures, a sudden change in the image shift amount or the defocus amount attributable to a switchover from the first image shift detection operation processing to the second image shift detection operation processing, or vice versa, is prevented and as a result, a smooth focus adjustment operation is enabled.

Figure 20:
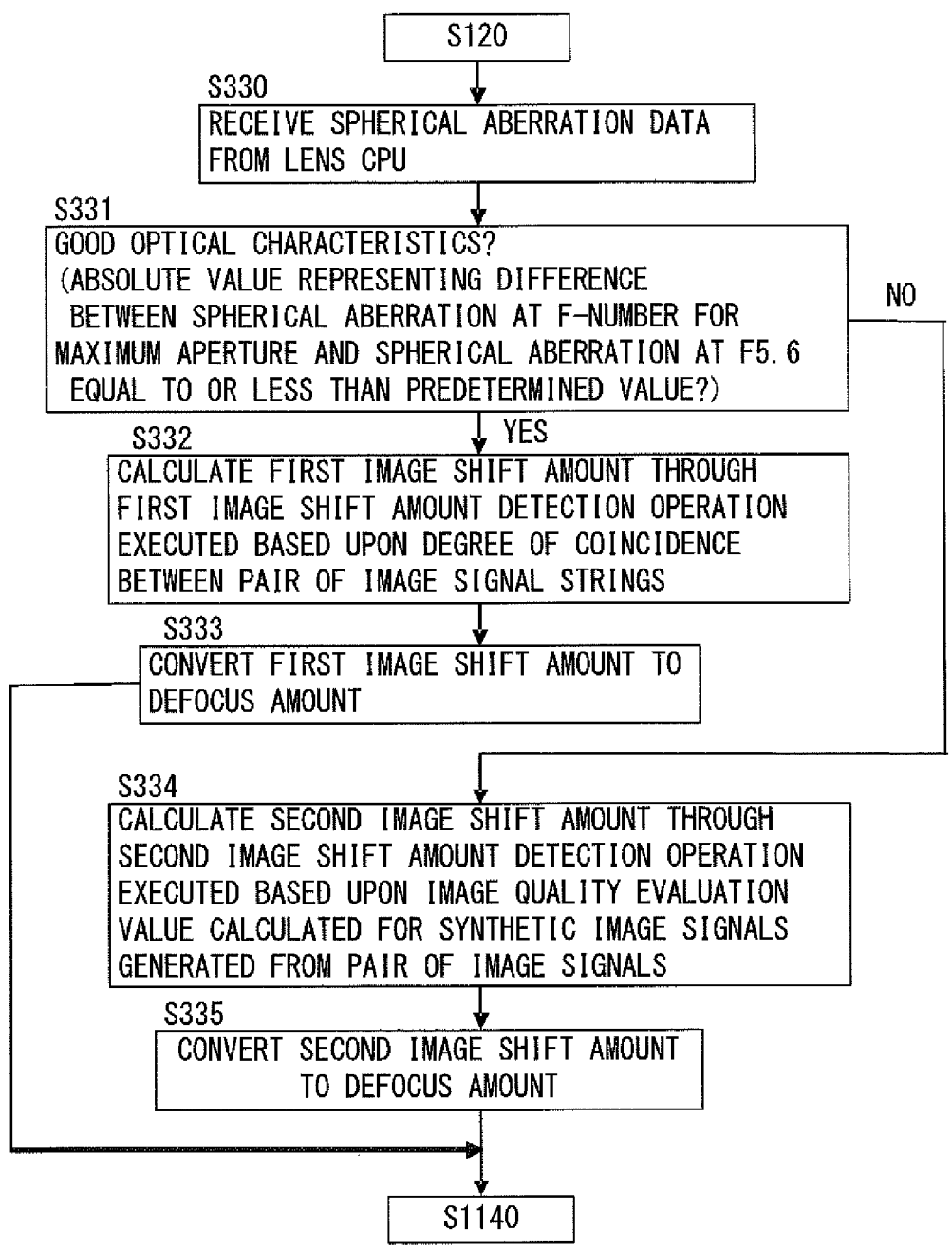
FIG. 20 presents a flowchart of operations executed in the body control device in the digital camera.

Selective Execution of First Image Shift Detection Operation Processing or Second Image Shift Detection Operation Processing in Correspondence to Aberration FIG. 20 presents a flowchart of operations executed by the body control device 214 when the first image shift detection operation processing or the second image shift detection operation processing is selectively executed in correspondence to an optical characteristic, such as an aberration in the photographic optical system. The processing shown in this flowchart replaces the processing executed in step S1130 through step S1138 in FIG. 18.

In step S330, the body control device 214 receives spherical aberration information, which is to be used as optical characteristic information, from the lens control device 206. In the lens control device 206 or a storage device (not shown) in the interchangeable lens 202, information indicating spherical aberration design values, measured spherical aberration values or the like, is stored in advance as the spherical aberration information.

In step S331, the body control device 214 makes a decision as to whether or not good optical characteristic is assured based upon the received optical characteristic information, i.e., the spherical aberration information. In more specific terms, the body control device 214 decides that good optical characteristic is assured if the absolute value of the difference between the spherical aberration (extent of longitudinal aberration) at the F-number for maximum aperture and the spherical aberration (extent of longitudinal aberration) at F5.6 is equal to or less than a predetermined value. Generally speaking, the degree of coincidence between the patterns of the pair of point image signals described in reference to FIG. 10, generated through a photographic optical system with a greater difference in the longitudinal aberration is lower.

In step S332, the body control device 214, having decided in step S331 that good optical characteristic is assured, executes the first image shift detection operation processing based upon the pair of image signal strings read out in step S120, and calculates the first image shift amount shft1. As explained earlier, the first image shift detection operation processing is image shift detection operation processing executed based upon the degree of coincidence between the pair of image signal strings.

In step S333, the body control device 214 converts the first image shift amount shft1 calculated in step S332 to a defocus amount, and then the processing proceeds to step S1140 in FIG. 18.

If, on the other hand, it is decided in step S331 that the optical characteristic is no-good, the processing proceeds to step S334, in which the body control device 214 calculates the second image shift amount shft2 by executing the second image shift detection operation processing as described earlier based upon the data in the pair of image signal strings read in step S120. As explained earlier, the second image shift detection operation processing is image shift detection operation processing executed based upon the image quality evaluation value calculated for the synthetic image signals.

In step S335, the body control device 214 converts the second image shift amount shft2 calculated in step S334 to a defocus amount, and then the processing proceeds to step S1140 in FIG. 18.

In this processing sequence, if the photographic optical system assures good optical characteristic and thus no error occurs in the first image shift detection operation processing even in a near focus match state, the first image shift detection operation processing executed on a relatively small operational scale and thus completed in a shorter time, is executed. As a result, better response in the focus adjustment is achieved. In addition, if the photographic optical system does not have good optical characteristic and an error is likely to occur in the first image shift detection operation processing in a near focus match state, the high-accuracy second image shift detection operation processing is executed so as to achieve accurate focus adjustment.

The decision as to whether or not good optical characteristic is assured does not need to be made based upon the spherical aberration information pertaining to the photographic optical system and instead, the decision may be made by using information on values indicating another type of aberration, such as chromatic aberration, comatic aberration or astigmatism. Displacement information, indicating how the position of the optimal image plane changes in correspondence to the spatial frequency, which is closely related to the identicalness of the patterns in the pair of image signal strings, is particularly important. For instance, the difference between an optimal image plane position taken at a low spatial frequency, which includes a predetermined value ωL, and an optimal image plane position taken at a high spatial frequency, which includes a predetermined value ωH, greater than the predetermined value ωL, may be calculated in advance based upon optical design information or obtained through experimental test measurement, and this difference may be stored at the interchangeable lens 202. The body control device 214 may then read out the difference between the optimal image plane positions corresponding to the two different spatial frequencies to the camera body 203, and may execute the first image shift detection operation processing upon deciding that good optical characteristic is assured if the absolute value of the difference between the optimal image plane positions having been read out is equal to or less than a predetermined value. If, on the other hand, the absolute value of the difference between the optimal image plane positions having been read out exceeds the predetermined value, the body control device 214 and may decide that the optical characteristic is not good enough and execute the second image shift detection operation processing instead.

In addition, instead of making a decision with regard to the quality of the optical characteristic at the camera body 203, the lens control device 206 may transmit good/no-good information corresponding to the optical characteristic being good/no-good from the interchangeable lens 202 to the camera body 203 and the body control device 214 at the camera body 203 may switch between the first image shift detection operation processing and the second image shift detection operation processing based upon the good/no-good information.

Furthermore, a table providing identification information for lenses with relatively no-good optical characteristic may be installed in advance at the camera body 203 and if the lens identification information for the interchangeable lens 202 currently mounted at the camera body 203 matches lens identification information listed in the table, the body control device 214 may decide that the lens optical characteristic in the current interchangeable lens 204 is not good.

Figure 21:
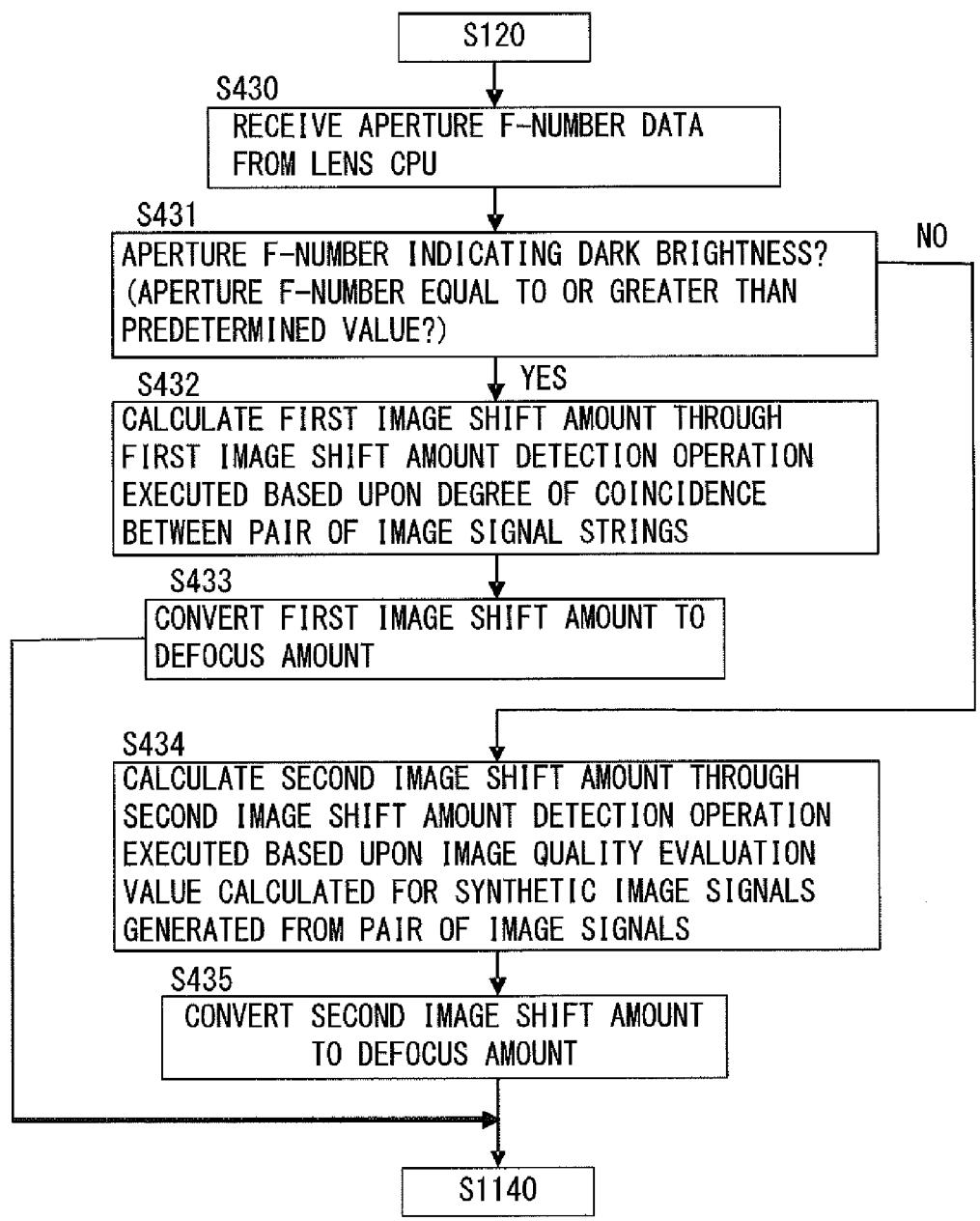
FIG. 21 presents a flowchart of operations executed in the body control device in the digital camera.

Selective Execution of First Image Shift Detection Operation Processing or Second Image Shift Detection Operation Processing in Correspondence to Aperture F-Number FIG. 21 presents a flowchart of operations executed by the body control device 214 when the first image shift detection operation processing or the second image shift detection operation processing is selectively executed in correspondence to optical characteristic, such as aperture F-number in the photographic optical system. The processing shown in this flowchart replaces the processing executed in step S1130 through step S1138 in FIG. 18.

In step S430, the body control device 214 receives aperture F-number information, i.e., information indicating the current control F-number, which is to be used as optical characteristic information, from the lens control device 206.

In step S431, the bloody control device 214 makes a decision, based upon the optical characteristic information having been received, i.e., the aperture F-number information, as to whether or not an error tends to occur readily in the first image shift detection operation processing in the current condition, i.e., whether or not good identicalness is achieved for the pair of subject images formed with a pair of focus detection light fluxes. In more specific terms, when the aperture F-number is set at a value equal to or greater than a predetermined value corresponding to light quantity which is dark, the ranges of the foot portions in the pair of point image distributions shown in FIG. 10 are small in comparison to the size of the peaks, and accordingly, the body control device 214 decides that an error is not likely to occur in the first image shift detection operation processing. In this case, the processing proceeds to step S432, in which the body control device 214 executes the first image shift detection operation processing based upon the pair of image signal strings read out in step S120, and calculates the first image shift amount shft1. As explained earlier, the first image shift detection operation processing is image shift detection operation processing executed based upon the degree of coincidence between the pair of image signal strings.

In step S433, the body control device 214 converts the first image shift amount shft1 calculated in step S432 to a defocus amount, and then the processing proceeds to step S1140 in FIG. 18.

If, on the other hand, the aperture F-number is set to a value less than the predetermined value and thus the F-number corresponds to light quantity which is bright, the body control device 214 decides in step S431 that an error tends to occur readily in the first image shift detection operation processing, since the ranges of the foot portions in the pair of point image distributions shown in FIG. 10 are large relative to the size of the peaks in this condition. In this case, the processing proceeds to step S434, in which the body control device 214 calculates the second image shift amount shft2 by executing the second image shift detection operation processing as described earlier based upon the data in the pair of image signal strings read out in step S120. As explained earlier, the second image shift detection operation processing is image shift detection operation processing executed based upon the image quality evaluation value calculated for the synthetic image signals.

In step S435, the body control device 214 converts the second image shift amount shft2 calculated in step S434 to a defocus amount, and then the processing proceeds to step S1140 in FIG. 18.

In this processing sequence, if the aperture F-number, which is part of the optical characteristics of the photographic optical system, assumes a large value and thus an error does not occur readily in the first image shift detection operation processing, the first image shift detection operation processing, executed on a relatively small operational scale and thus completed in relatively short time, is executed. As a result, better response in focus adjustment is achieved. However, if the aperture F-number at the photographic optical system is set to a small value and thus, an error tends to occur readily in the first image shift detection operation processing, the high-accuracy second image shift detection operation processing is executed so as to assure accuracy in the focus adjustment.

Selective Execution of First Image Shift Detection Operation Processing or Second Image Shift Detection Operation Processing in Correspondence to Image Height and Exit Pupil Distance Focus detection areas may be set at positions away from the center of the image plane, as well as at the image plane center. In such a case, the first image shift detection operation processing or the second image shift detection operation processing may be executed selectively in correspondence to the position of the focus detection area selected for focus detection, i.e., the image height indicating the distance between the particular focus detection area and the image plane center and an optical characteristic of the photographic optical system such as the exit pupil distance. A pair of focus detection pixels, via which the pair of image signals are generated, are disposed in the focus detection area used for the focus detection, and accordingly, the image height may be otherwise referred to as the position at which a pair of image signals are generated relative to the optical axis.

Figure 22:
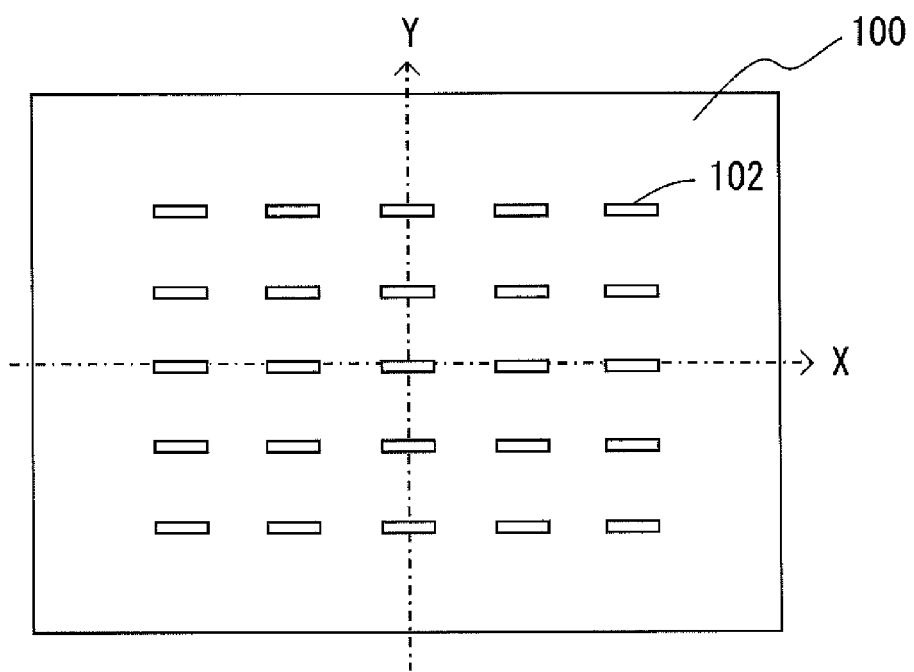
FIG. 22 shows focus detection areas set on the photographic image plane.

FIG. 22 indicates positions assumed by focus detection areas on the photographic image plane. The figure shows focus detection areas 102 set at a total of 25 positions including the center (on the optical axis) of a rectangular photographic image plane 100 and positions surrounding the center along the horizontal and vertical directions. Along the longer sides of each rectangular focus detection area 102, i.e., along the horizontal direction, focus detection pixels are disposed along a straight line.

Figure 23:
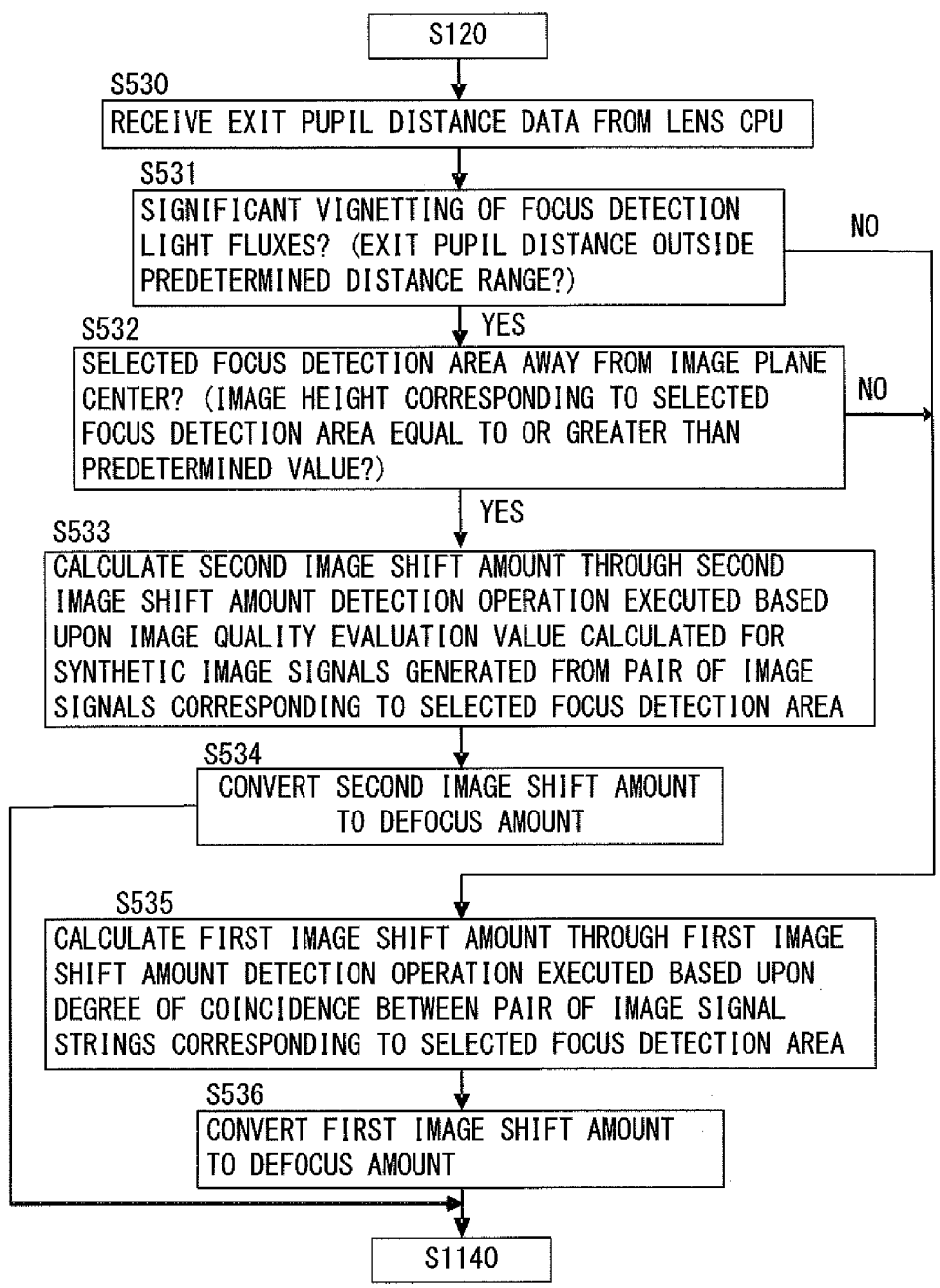
FIG. 23 presents a flowchart of operations executed in the body control device in the digital camera.

FIG. 23 presents a flowchart of operations executed by the body control device 214 when the first image shift detection operation processing or the second image shift detection operation processing is selectively executed in correspondence to the portion of the focus detection area, i.e., the image height indicating the distance between the focus detection area and the image plane center, and optical characteristic of the photographic optical system such as the exit pupil distance. The processing shown in this flowchart replaces the processing executed in step S1130 through step S1138 in FIG. 18. It is to be noted that the user manually selects a focus detection area set at a specific position and the focus detection is executed in conjunction with the selected focus detection area.

In step S530, the body control device 214 receives exit pupil distance data, which are to be used as optical characteristic information, from the lens control device 206.

In step S531, the bloody control device 214 makes a decision, based upon the optical characteristic information having been received, i.e., the exit pupil distance data, as to whether or not an error tends to occur readily in the first image shift detection operation processing in the current condition, i.e., whether or not good identicalness is achieved for the pair of subject images formed with a pair of focus detection light fluxes. More specifically, if the exit pupil distance is within a predetermined distance range, vignetting of the pair of focus detection light fluxes at the aperture opening occurs substantially evenly and, accordingly, the body control device 214 decides that a high level of identicalness is achieved in the pair of point image distributions. In this case, the processing proceeds to execute the first image shift detection operation processing in step S535. When the exit pupil distance is close to the focus detection pupil distance d shown in FIG. 5, i.e., when the exit pupil distance is within a range expressed as "d±predetermined distance", the exit pupil distance is determined to be within the predetermined distance range. If the exit pupil distance is outside the predetermined distance range, vignetting of the pair of focus detection light fluxes at the aperture opening occurs unevenly and thus, the body control device 214 decides that the identicalness of the pair of point image distributions is likely to be compromised. In this case, the processing proceeds to step S532. When the exit pupil distance clearly differs from the focus detection pupil distance d shown in FIG. 5, i.e., when the exit pupil distance is outside the range expressed as "d±predetermined distance", the exit pupil distance is determined to be outside the predetermined distance range.

In step S532, the body control device 214 makes a decision as to whether or not the focus detection area, having been selected by the user, assumes a position away from the center of the image plane. When the image height indicating the distance between the selected focus detection area and the image plane center is equal to or greater than a predetermined value, the selected focus detection area is determined to be at a position away from the image plane center. If the selected focus detection area takes a position away from the image plane center, the body control device 214 decides that the identicalness of the pair of point image distributions is likely to be compromised, since the non-uniformity in the vignetting of the pair of focus detection light fluxes occurring at the aperture opening becomes more pronounced. In order to ensure that image shift detection is carried out without readily inducing error even in this state, the body control device 214 proceeds to execute the second image shift detection operation processing in step S533. If, on the other hand, the selected focus detection area takes a position near the image plane center, the body control device 214 decides that a high degree of identicalness between the pair of point image distributions is assured, since vignetting of the pair of focus detection light fluxes at the aperture opening occurs more uniformly, and accordingly, the processing proceeds to execute the first image shift detection operation processing in step S535.

In step S533, the body control device 214 calculates the second image shift amount shft2 by executing the second image shift detection operation processing as described earlier based upon the data in the pair of image signal strings read out in step S120. As explained earlier, the second image shift detection operation processing is image shift detection operation processing executed based upon the image quality evaluation value calculated for the synthetic image signals.

In step S534, the body control device 214 converts the second image shift amount shft2 calculated in step S533, to a defocus amount, and then the processing proceeds to step S1140 in FIG. 18.

In step S535, the body control device 214 executes the first image shift detection operation processing based upon the pair of image signal strings read out in step S120, and calculates the first image shift amount shft1. As explained earlier, the first image shift detection operation processing is image shift detection operation processing executed based upon the degree of coincidence between the pair of image signal strings.

In step S536, the body control device 214 converts the first image shift amount shft1 calculated in step S535 to a defocus amount, and then the processing proceeds to step S1140 in FIG. 18.

When the exit pupil distance of the photographic optical system is close to the focus detection pupil distance d or when the focus detection area is near the image plane center, uneven vignetting of the pair of focus detection light fluxes does not occur readily at the aperture. In the processing sequence described above, when vignetting of the pair of focus detection light fluxes at the aperture is not likely to be uneven and thus, an error in the first image shift detection operation processing is unlikely, the first image shift detection operation processing executed on a relatively small operational scale and thus completed in a relatively short time is executed so as to improve the response in focus adjustment. When the exit pupil distance of the photographic optical system greatly differs from the focus detection pupil distance d or the focus detection area is away from the image plane center, vignetting of the pair of focus detection light fluxes occurring at the aperture is likely to be uneven. In the processing sequence described above, when uneven vignetting of the pair of focus detection light fluxes tends to occur readily at the aperture and thus an error is likely to occur in the first image shift detection operation processing, the high-accuracy second image shift detection operation processing is executed so as to assure accurate focus adjustment.

It is to be noted that the first image shift detection operation processing or the second image shift detection operation processing may be selectively executed in correspondence to only either the image height or the exit pupil distance. Namely, only either the decision-making processing in step S531 or the decision-making processing in step S532 in the flowchart presented in FIG. 23 may be executed.

Figure 24:
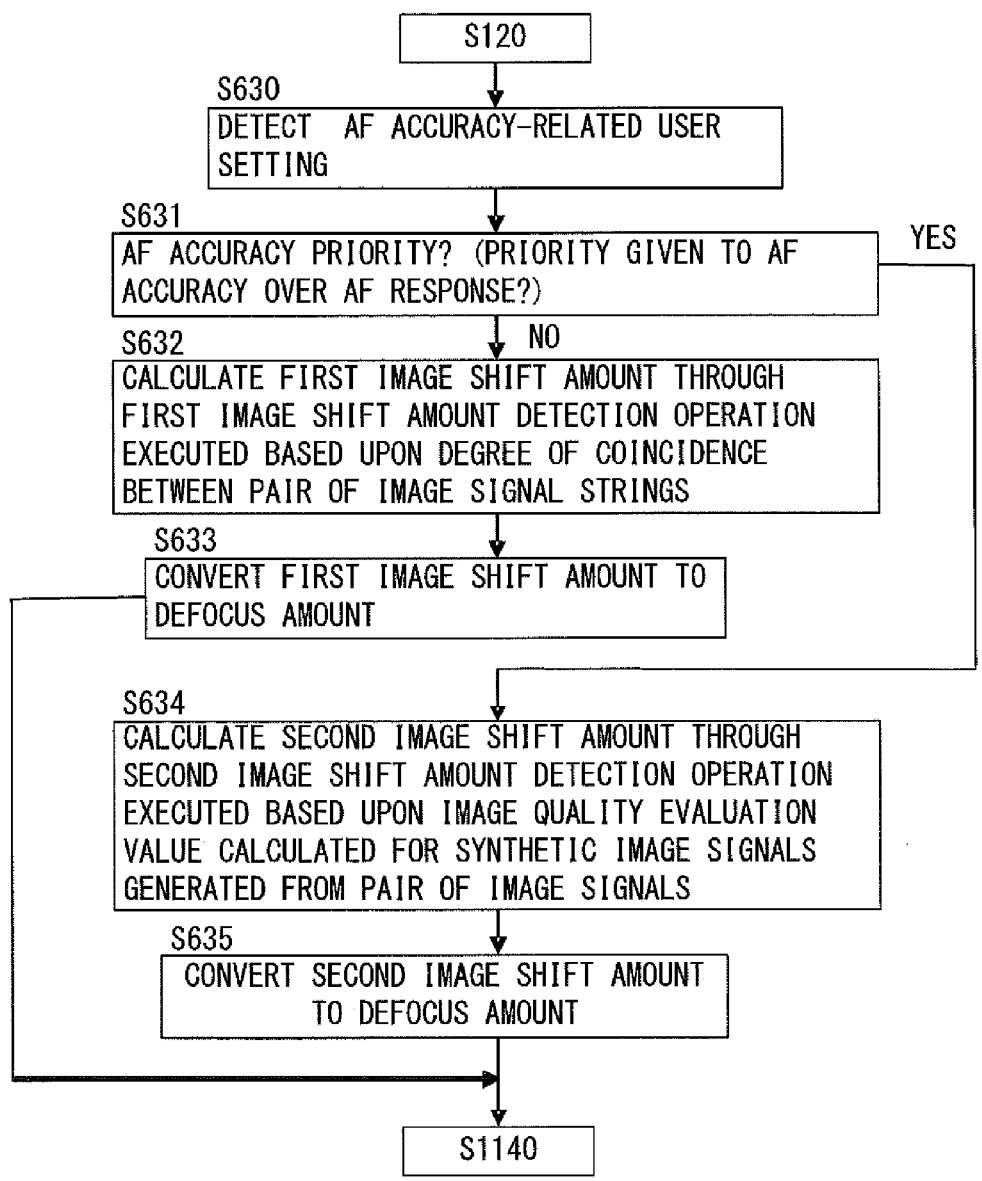
FIG. 24 presents a flowchart of operations executed in the body control device in the digital camera.

Selective Execution of First Image Shift Detection Operation Processing or Second Image Shift Detection Operation Processing in Correspondence to Required AF Detection Accuracy FIG. 24 presents a flowchart of operations executed by the body control device 214 when the first image shift detection operation processing or the second image shift detection operation processing is selectively executed in correspondence to the required defocus amount detection accuracy, i.e., an AF accuracy-related setting selected by the user. The processing shown in this flowchart replaces the processing executed in step S1130 through step S1138 in FIG. 18.

In step S630, the body control device 214 detects the status of the AF accuracy-related setting selected by the user. The AF accuracy-related setting may be, for instance, a setting directly indicating a preference giving priority to AF accuracy or to AF response or a setting that indirectly results in a switchover to AF accuracy priority or AF response priority. The setting that indirectly results in a switchover to the AF accuracy priority or the AF response priority may be selected by, for instance, switching to a one-shot AF mode or to a continuous AF mode. As the user selects either mode, either the AF accuracy priority or the AF response priority is selected by interlocking with the user's choice. In the one-shot AF mode, lens drive is disallowed once a focus match state is achieved, and thus, a high level of AF accuracy is required. Accordingly, in the one-shot AF mode, the AF accuracy priority is selected. In the continuous AF mode, the lens needs to be driven constantly to shoot images continuously in correspondence to the detected focusing condition, and thus immediate response is required. Accordingly, the AF response priority is selected in the continuous AF mode.

In step S631, the body control device 214 makes a decision based upon the detected AF accuracy-related setting, as to whether or not priority is given to AF accuracy. If it is decided that priority is given to AF accuracy, the processing proceeds to step S634, whereas if it is decided that priority is not given to AF accuracy, i.e., priority is given to AF characteristics other than AF accuracy, such as AF response, the processing proceeds to step S632.

In step S632, the body control device 214 executes the first image shift detection operation processing based upon the pair of image signal strings read out in step S120, and calculates the first image shift amount shft1. As explained earlier, the first image shift detection operation processing is image shift detection operation processing executed based upon the degree of coincidence between the pair of image signal strings.

In step S633, the body control device 214 converts the first image shift amount shft1 calculated in step S632 to a defocus amount, and then the processing proceeds to step S1140 in FIG. 18.

In step S634, the body control device 214 calculates the second image shift amount shft2 by executing the second image shift detection operation processing as described earlier based upon the data in the pair of image signal strings read out in step S120. As explained earlier, the second image shift detection operation processing is image shift detection operation processing executed based upon the image quality evaluation value calculated for the synthetic image signals.

In step S635, the body control device 214 converts the second image shift amount shft2 calculated in step S634, to a defocus amount, and then the processing proceeds to step S1140 in FIG. 18.

In this processing sequence, if the required level of image shift detection accuracy is relatively low, the first image shift detection operation processing, executed on a relatively small operational scale and thus completed in a relatively short time, is executed. As a result, improved response in focus adjustment is achieved. If, on the other hand, a relatively high level of accuracy is required in image shift detection executed for the photographic optical system, the high-accuracy second image shift detection operation processing is executed so as to assure accurate focus adjustment.

While the AF accuracy-related setting may be manually selected by the user as explained above, it may instead be automatically set by the body control device 214 at the camera body 203. For instance, the body control device 214 at the camera body 203 may detect luminance based upon image data having been read out and may automatically select the AF accuracy priority if high luminance is detected but may automatically select the AF response priority if low luminance is detected. In addition, the body control device 214 at the camera body 203 may determine, based upon image data having been read out, whether the subject is a moving subject or a still subject, and may automatically select the AF accuracy priority if the detected subject is still subject but automatically select the AF response priority if the detected subject is a moving subject. Moreover, the body control device 214 at the camera body 203 may detect, based upon image data having been read out or an output from an acceleration sensor (not shown), the extent of blurring, indicating motion at the camera body 203. In this case, if the extent of blurring is small, i.e., if the extent of blurring is equal to or less than a predetermined value, the AF accuracy priority may be selected automatically, whereas if the extent of blurring is significant, i.e., if the extent of blurring is equal to or greater than the predetermined value, the AF response priority may be automatically selected.

Figure 25:
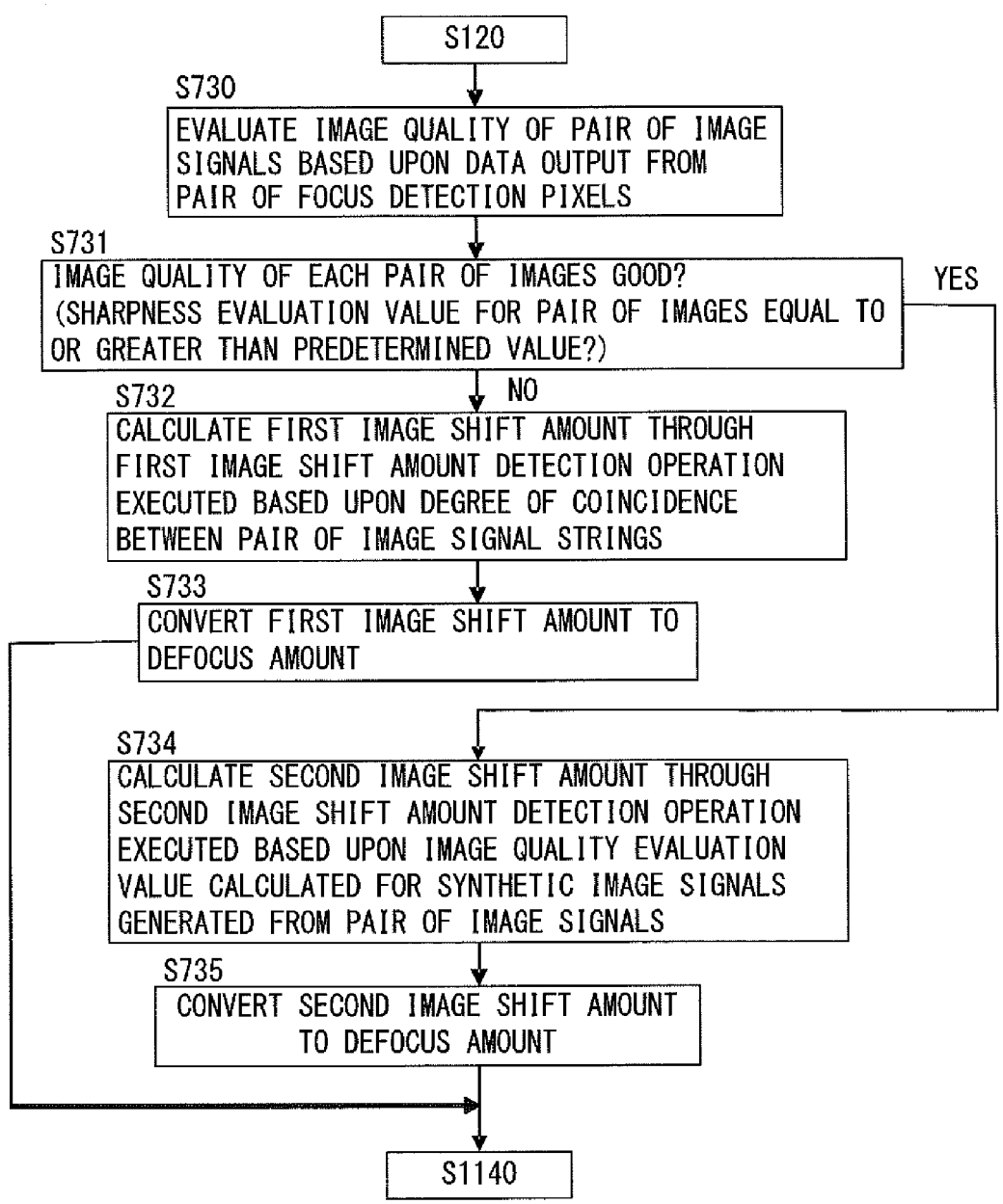
FIG. 25 presents a flowchart of operations executed in the body control device in the digital camera.

Selective Execution of First Image Shift Detection Operation Processing or Second Image Shift Detection Operation Processing in Correspondence to Quality of Pair of Images FIG. 25 presents a flowchart of operations executed by the body control device 214 when the first image shift detection operation processing or the second image shift detection operation processing is selectively executed in correspondence to an image quality of a pair of images evaluated based upon data output from a pair of focus detection pixels used in image shift detection. The processing shown in this flowchart replaces the processing executed in step S1130 through step S1138 in FIG. 18.

In step S730, the body control device 214 calculates an evaluation value indicating the image quality of a pair of images based upon data output from a pair of focus detection pixels used in the image shift detection. More specifically, an image quality evaluation value Q for the pair of image signals can be calculated through an arithmetic operation similar to that executed to calculate the image quality evaluation value P(k) for the synthetic image signals explained earlier. Based upon a pair of sets of image signal data A(n) and B(n) output from a pair of focus detection pixels, the image quality evaluation value Q may be calculated as expressed in (17) similar to the sharpness evaluation operation executed as expressed in (9).

$$Q = \Sigma(|A(n)-A(n+v)|+|B(n)-B(n+v)|) \quad (17)$$

The $\Sigma$ operation in expression (17) is executed over the range taken for the variable n. Expression (17) represents an operation executed to calculate the sum total of the absolute values each corresponding to a first-order difference at an integer v indicating a specific signal pitch in the pair of sets of image signal data A(n) and B(n) output from the pair of focus detection pixels. When higher sharpness is achieved in the pair of sets of image signal data A(n) and B(n) output from the pair of focus detection pixels, the individual differences are greater and thus the image quality evaluation value Q, too, takes on a greater value. A given first-order difference corresponds to the extent of inclination of an edge in the pair of images, and the image appears more sharply defined when the inclination is steeper. In this sense, expression (17) may be regarded as an operation expression for evaluation of the image quality of the pair of image signals, i.e., the sharpness in the pair of image signals. It is to be noted that while the arithmetic operation is executed for both the image signal data A(n) and for the image signal data B(n) in the pair of the sets of image signal data output from the pair of focus detection pixels as expressed in (17) in the example described above, the arithmetic operation may instead be executed for either set of data.

In step S731, a decision is made, based upon the image quality evaluation value calculated for the pair of image signals, as to whether or not the quality of the pair of images is good. If the image quality of the pair of images is determined to be good, i.e., if the image quality evaluation value is equal to or greater than a predetermined value, the processing proceeds to step S734, whereas if it is decided that the image quality of the pair of images is not good, i.e., if the image quality evaluation value is less than the predetermined value, the processing proceeds to step S732.

In step S732, the body control device 214 executes the first image shift detection operation processing based upon the pair of image signal strings read out in step S120, and calculates the first image shift amount shft1. As explained earlier, the first image shift detection operation processing is image shift detection operation processing executed based upon the degree of coincidence between the pair of image signal strings.

In step S733, the body control device 214 converts the first image shift amount shft1 calculated in step S732 to a defocus amount, and then the processing proceeds to step S1140 in FIG. 18.

In step S734, the body control device 214 calculates the second image shift amount shft2 by executing the second image shift detection operation processing as described earlier based upon the data in the pair of image signal strings read out in step S120. As explained earlier, the second image shift detection operation processing is image shift detection operation processing executed based upon the image quality evaluation value calculated for the synthetic image signals.

In step S735, the body control device 214 converts the second image shift amount shft2 calculated in step S734, to a defocus amount, and then the processing proceeds to step S1140 in FIG. 18.

The accuracy of the second image shift detection operation may be lowered when the quality of the pair of subject images is poor. This may occur when, for instance, the high-frequency component is lost due to an image blur attributable to a large extent of defocus. Even when such loss of high-frequency component occurs, relatively accurate image shift detection is enabled through the first image shift detection operation processing. If it is decided in step S731 that the image quality of the pair of images is not good, the first image shift detection operation processing is executed in step S732 and thus, a sufficient level of focus detection accuracy is assured. If, on the other hand, it is decided in step S731 that the image quality of the pair of images is good and thus highly accurate image shift detection can be executed through the second image shift detection operation, e.g., when a significant high-frequency component is available in a near focus match state, the second image shift detection operation processing assuring high accuracy is executed in step S734 and, as a result, accurate focus adjustment is enabled.

In step S730 described above, a sharpness evaluation value is calculated, based upon the pair of sets of image signal data A(n) and B(n) output from the pair of focus detection pixels, as expressed in (17), and this sharpness evaluation value is used as the image quality evaluation value Q for the pair of image signals. As an alternative, a resolution evaluation value calculated for the pair of image signals, instead of the sharpness evaluation value, may be used as the image quality evaluation value. Such a resolution evaluation value may be calculated as expressed in, for instance, (18) below, instead of (17).

$$Q=\Sigma(|A(n-v)+2\times A(n)-A(n+v)|+|-B(n-v)+2\times B(n)-B(n+v)|) \quad (18)$$

A frequency characteristics (MTF) value indicating the frequency characteristics (MTF) of the pair of image signals may be used as the image quality evaluation value instead of the sharpness evaluation value. For instance, a value obtained by integrating the MTF of the synthetic image signals over a high-frequency range through which the MTF significantly affects the image quality of the pair of subject images, calculated in much the same way as the image quality evaluation value P(k) pertaining to the MTF of the synthetic image signal, as has been described in reference to FIG. 17, may be used as the image quality evaluation value Q.

The different manners with which the first image shift detection operation processing and the second image shift detection operation processing are executed selectively in correspondence to various conditions as described above may be adopted in combination.

Figure 26:
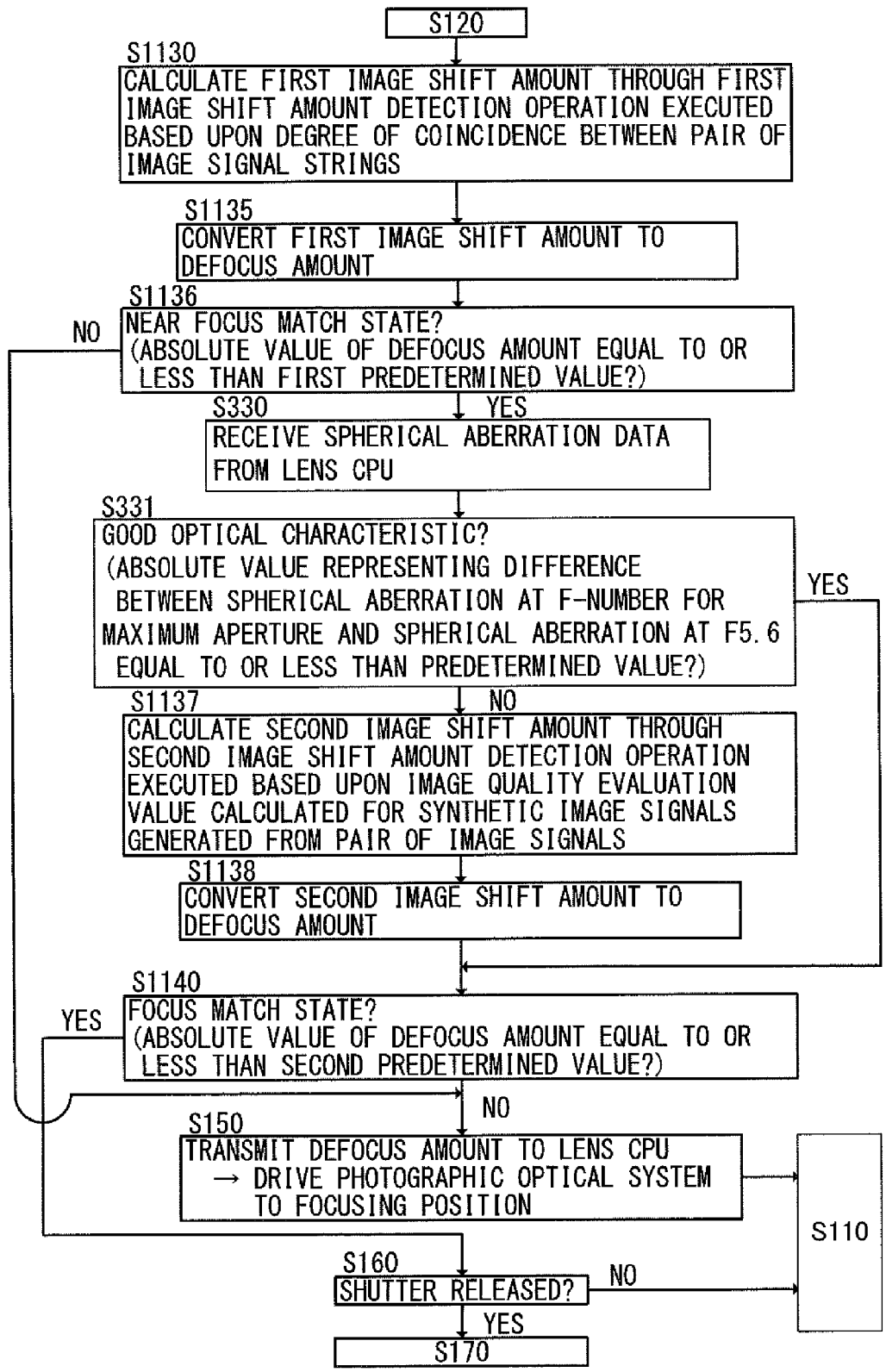
FIG. 26 presents a flowchart of operations that may be executed by combining the first image shift detection operation processing and the second image shift detection processing and selecting the first image shift detection operation processing or the second image shift detection operation processing in a plurality of different manners in correspondence to various conditions.

For instance, the processing in step S330 and step S331 in FIG. 20 may be executed between step S1136 and step S1137 in the flowchart presented in FIG. 18. FIG. 26 shows the flow of this processing sequence. If it is decided in step S331 that good optical characteristic is assured, the processing proceeds to step S1140, whereas if it is decided in step S331 that the optical characteristic is not good, the processing proceeds to step S1137.

By combining a plurality of conditions as described above, the selective execution of the first image shift detection operation processing and the second image shift detection operation processing can be further optimized.

Variations (1) In the first and second embodiments described above, the second image shift amount is detected through the second image shift detection operation processing based upon the image quality evaluation value pertaining to an image quality such as the sharpness, the resolution, the contrast or the frequency characteristics (MTF) of the synthetic subject image generated by adding a pair of image signals. As an alternative, the body control device 214 in the digital camera 201 equipped with the focus detection device may calculate a second image shift amount for a pair of image signal strings through image shift detection operation processing executed based upon contrast evaluation that uses a contrast evaluation value, to be described later, as the image quality evaluation value, on the pair of image signal strings the focus detection read out from the focus detection pixels 315 and 316 and then convert the second image shift amount thus calculated to a defocus amount.

Namely, the body control device 214 in the digital camera 201 in this variation calculates an image shift amount (second image shift amount) for a pair of image signal strings having been read out by executing image shift detection operation processing based upon contrast evaluation as will be explained later and then converts the image shift amount to a defocus amount. In the image shift detection operation processing executed based upon contrast evaluation, a synthetic image signal string is generated by adding together the pair of image signal strings, which are shifted relative to each other, and the image shift amount at which the maximum contrast is achieved in the synthetic image signal string is calculated. When the highest level of contrast is achieved in the synthetic image signal string, the image quality of the synthetic image signal is at its highest.

Next, in reference to the flowchart presented in FIG. 27, the image shift detection operation processing executed in step S130 in FIG. 6 by the body control device 214 based upon the contrast evaluation of the pair of image signal strings will be explained in detail.

In step S2200, the initial value for the shift amount k, representing the extent of shift of the pair of image signal strings $A_1$ through $A_M$ and $B_1$ through $B_M$, read out from the focus detection pixel row (made up with 2M pixels), relative to each other, is set to −5.

In step S2210, the pair of image signal strings $A_1$ through $A_M$ and $B_1$ through $B_M$ are shifted relative to each other by the shift amount k. Namely, by shifting the image signal strings relative to each other by the shift amount k, a signal $A_N$ in the image signal string A is made to correspond to a signal $B_{N+k}$ in the image signal string B.

In step S2220, the pair of image signal strings $A_1$ through $A_M$ and $B_1$ through $B_M$, having been shifted relative to each other by the shift amount k, undergo an addition operation as expressed in (8), so as to generate a synthetic image signal string F(n, k) made up with M+1−2|k| synthetic image signals, as shown in FIG. 15 (n=|k|, |k|+1, . . . , M−1−|k|, M−|k|).

$$F(n,k)=A_n+B_{n+k} \quad (8)$$

In step S2230, the synthetic image signal string F(n, k) undergoes first-order difference processing, which is a linear combination operation executed as expressed in (19), and a high-frequency contrast component is extracted from the synthetic image signal string F(n, k). Then, a contrast signal string P(n, k), made up with M−2|k| contrast components obtained as described above, is generated.

$$P(n,k)=F(n,k)-F(n-1,k) \quad (19)$$

In step S2240, the contrast signal string P(n, k) undergoes nonlinear conversion which is achieved based upon a quadratic function (a square function: $y=H(x)=x^2$), i.e., a nonlinear function H(x), as expressed in (20), and as a result, a nonlinear contrast signal string Q(n, k) is generated.

$$Q(n,k)=H(P(n,k))=(P(n,k))^2 \quad (20)$$

The rationale for generation of a nonlinear contrast signal string Q(n, k) through nonlinear function-based nonlinear conversion executed for the contrast signal string P(n, k) as expressed in (20) will be explained next.

Figure 28:
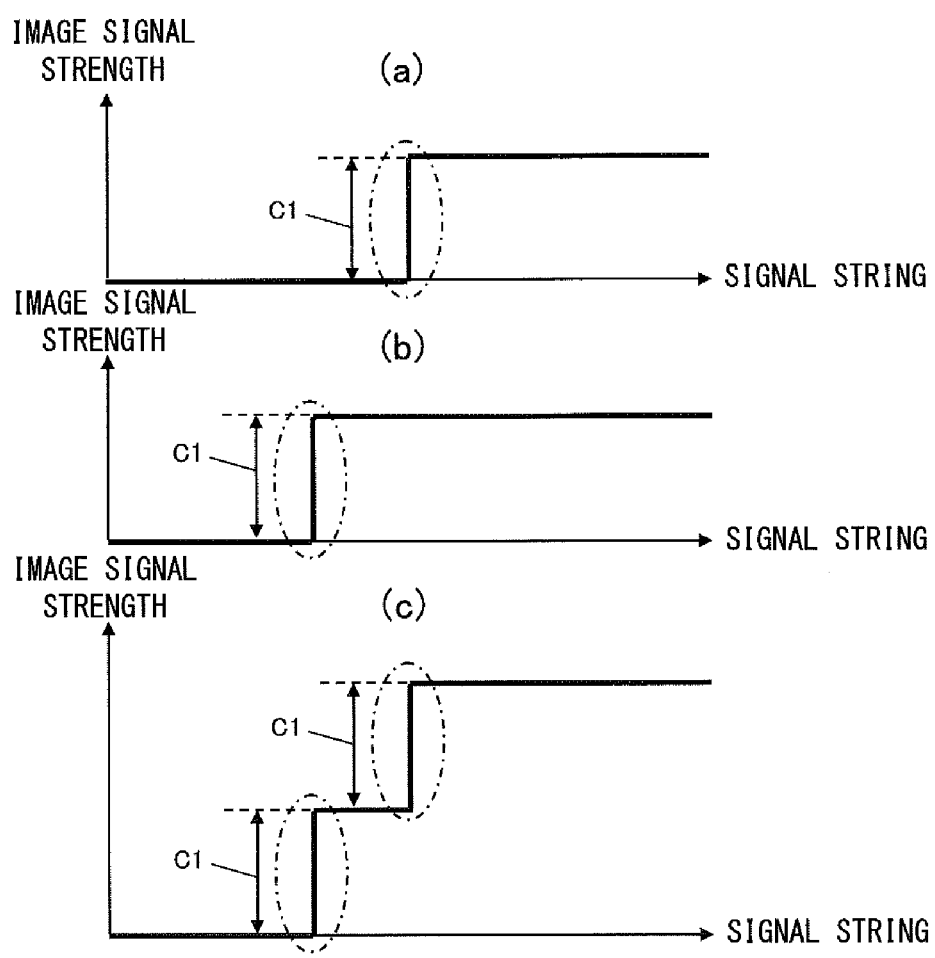
FIG. 28 indicates the image signal strengths of a pair of image signal strings generated by forming a pair of images of a step pattern with a step height C1 and the image signal strength of a synthetic image signal string.
Figure 29:
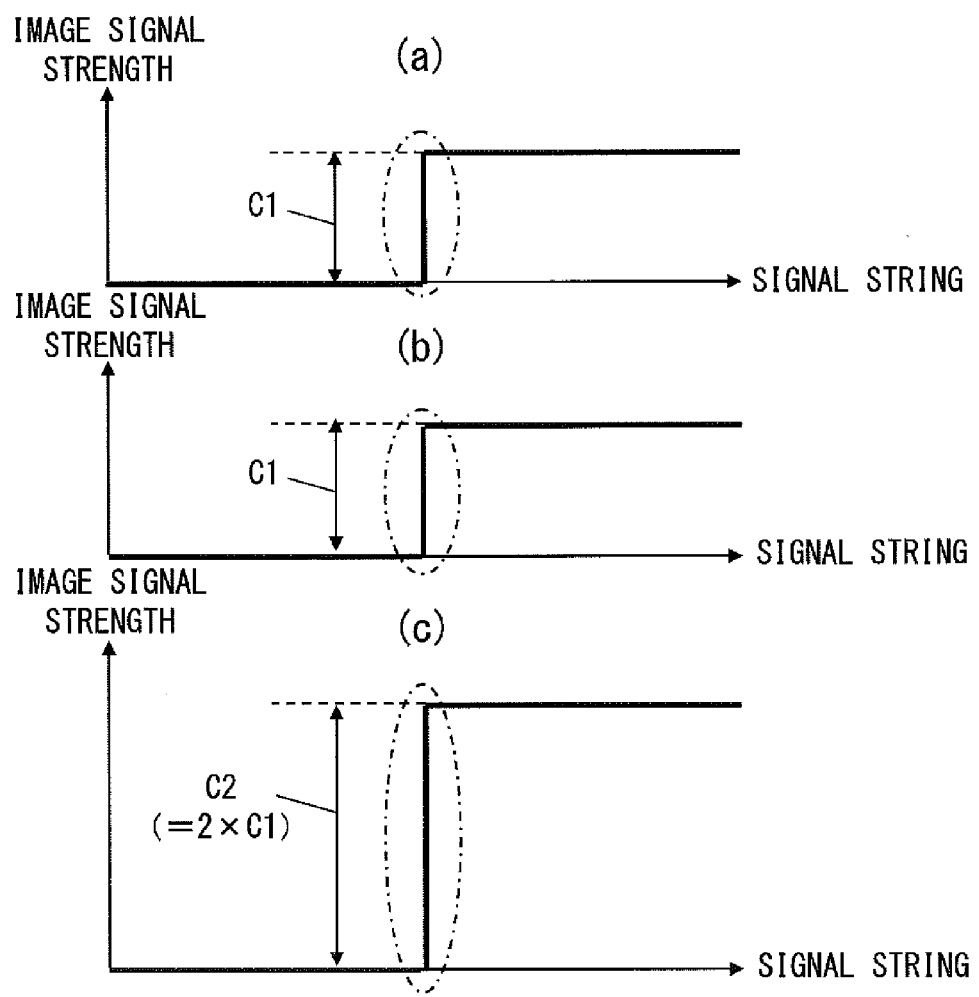
FIG. 29 indicates the image signal strengths a pair of image signal strings generated by forming a pair of images of a step pattern with a step height C1 and the image signal strength of a synthetic image signal string.

FIG. 28(a) and FIG. 28(b) show a pair of image signal strings expressing a pair of images with a step pattern having a step height C1. The pair of image signal strings are shifted relative to each other by a shift amount k1 and thus, the step having the height C1 assumes different positions in the two image signal strings. FIG. 28(c) shows a synthetic image signal string made up with a plurality of synthetic image signals obtained by adding together the pair of image signal strings shown in FIGS. 28(a) and 28(b). A step pattern with two steps each having the step height C1 is expressed with the synthetic image signal string. Assuming that a contrast evaluation value C(k) is calculated for the synthetic image signal string by adding up the absolute values of the signal values indicated in the contrast signal string P(n, k) (Ck=Σ|P(n, k)|), a contrast evaluation value C(k1) for the synthetic image signal string in FIG. 28(c) can be calculated as described below. Namely, the contrast evaluation value C(k1) for the synthetic image signal string in FIG. 28(c) is calculated by adding up the absolute values of differences (first-order differences) indicated in the signals in the synthetic image signal string over a range in which the synthetic image signal string is present, and thus; C(k1)=2×|C1|.

Figure 30:
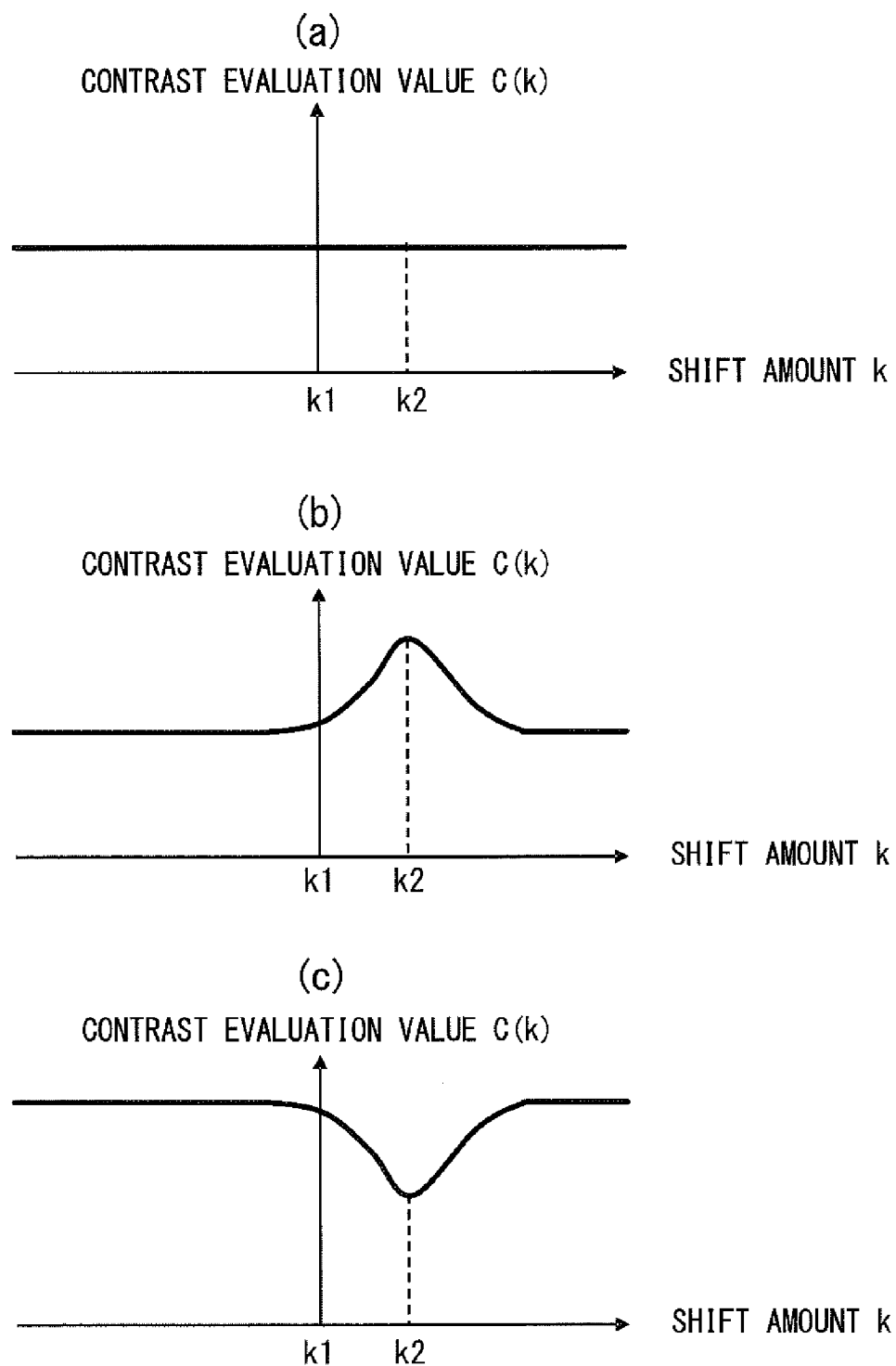
FIG. 30 shows the contrast evaluation value C(k) relative to the shift amount k.

As do FIGS. 28(a) and 28(b), FIG. 29(a) and FIG. 29(b) show a pair of image signal strings expressing a pair of images with a step pattern having a step height C1. The pair of image signal strings are shifted relative to each other by a shift amount k2 and the position of the step with the height C1 in one image signal string and the position of the step with the height C1 in the other image signal string match. FIG. 29(c) shows a synthetic image signal string obtained by adding together the pair of image signal strings shown in FIGS. 29(a) and 29(b). The step pattern expressed with the image synthetic image signal string includes a first-order with a height C2 (=2×C1). If a contrast evaluation value C(k2) for the synthetic image signal string shown in FIG. 29(c) is calculated by directly adding up the absolute values of the differences indicated in the signals in the synthetic image signal string over the range in which the synthetic image signal string is present, C(k2)=|2×C1|=2×|C1|=C(k1). In other words, the contrast evaluation value C(k) calculated in correspondence to varying shift amounts k always remains the same, as indicated in FIG. 30(a). Under these circumstances, no peak or bottom can be detected among the contrast evaluation values calculated by shifting the pair of image signal strings relative to each other and thus, image shift amount detection is not possible.

In the description provided above, the contrast evaluation value C(k) is calculated by adding up the absolute values of the differences indicated by the signals in the synthetic image signal string. The differences indicated by the signals in the synthetic image signal string represent the contrast component in the synthetic image signal string, which, in fact, can be calculated through the first-order difference operation expressed in (19). The contrast component in the synthetic image signal string can normally be extracted through Nth-order difference processing (N is a positive integer) executed for the synthetic image signal string. A phenomenon similar to that described earlier occurs with regard to contrast evaluation values C(k) calculated by directly adding up the absolute values of the contrast component extracted through the Nth-order difference processing executed for the synthetic image signal string.

A mathematical explanation for this phenomenon is as follows. The addition processing executed to generate the synthetic image signal string is linear combination of the pair of image signal strings (the pair of image signal strings are added together). The Nth-order difference processing executed for purposes of extraction of the contrast component in the synthetic image signal string, too, is a linear combination operation, which, in this case, is executed for the synthetic image signal string (an operation whereby each signal value is multiplied by a predetermined coefficient and the resulting products are added together). Namely, the following condition manifests when a contrast evaluation value C(k) is calculated by adding up the absolute values of the contrast component extracted through the Nth-order difference processing executed for the synthetic image signal string in conjunction with an image pattern such as that shown in FIG. 28 and FIG. 29. The contrast evaluation value C(k) will be equal to the sum of contrast evaluation values each corresponding to one of the pair of signal strings, i.e., the value obtained through linear combination of the contrast evaluation values, each corresponding to one of the pair of signal strings. As a result, the contrast evaluation value C(k) will assume a constant value regardless of the shift amount k.

This problem may be solved by first executing nonlinear conversion as expressed in (20) prior to the contrast component summation. Namely, the following condition will manifest if the contrast evaluation value C(k) is calculated by adding up Q(n, k) obtained through square function-based nonlinear conversion of the contrast signal string as expressed in (20) (C(k)=ΣQ (n, k)=Σ|P(n, k)|$^2$). The contrast evaluation value C(k2) calculated for the synthetic image signal string with the steps in the pair of images in alignment with each other as shown in FIG. 29(c) is calculated as; C(k2)=4×C1$^2$. This contrast evaluation value is greater than the contrast evaluation value C(k1)=2×C1$^2$ calculated for the synthetic image signal string with the steps originating from the pair of images not in alignment with each other, as shown in FIG. 28(c). This means that various values are taken for the contrast evaluation value C(k) in correspondence to varying shift amounts k. Since the contrast evaluation value C(k) peaks at a shift amount at which the steps in the pair of images are in alignment with each other and thus the highest level of contrast is achieved in the synthetic image signal string, an image shift amount can be detected based upon this shift amount.

The contrast evaluation value C(k) for the synthetic image signal string shown in FIG. 28(c) corresponding to a step pattern with the step height C1 shown in FIG. 28(a) and FIG. 28(b) is calculated as follows. Namely, the contrast evaluation value C(k) is calculated by adding up the square function y=x$^2$ for the contrast signal string x=P(n, k). When x=C1, y=C1$^2$. The synthetic image signal string in FIG. 28(c) includes two steps with the step height C1, and the contrast evaluation value C(k)=C(k1) in this situation is calculated as: C(k1)=2y=2C1$^2$.

The contrast evaluation value C(k) for the synthetic image signal string shown in FIG. 29(c) corresponding to a step pattern with the step height C1 shown in FIG. 28(a) and FIG. 28(b) is calculated in a similar manner. Namely, the contrast evaluation value C(k) is calculated by adding up the square function y=x$^2$ for the contrast signal string x=P(n,k). When x=2C1, y=4C1$^2$. The synthetic image signal string in FIG. 29(c) includes a first-order with the step height 2C1, and the contrast evaluation value C(k)=C(k2) in this situation is calculated as: C(k2)=y=4C1$^2$.

As described above, C(k2)=y=4C1$^2$ is greater than C(k1)=2y=2C1$^2$, proving that the contrast evaluation value C(k) changes in correspondence to the shift amount k. When the synthetic image signal string expresses a signal pattern that manifests gentler changes compared to the perfect step patterns shown in FIGS. 28(a), 28(b), 29(a) and 29(b), a curve such as that shown in FIG. 30(b), representing the contrast evaluation value C(k) taking an extreme value (the contrast evaluation value C(k) peaks in this case) at the shift amount k=k2 is obtained.

Figure 27:
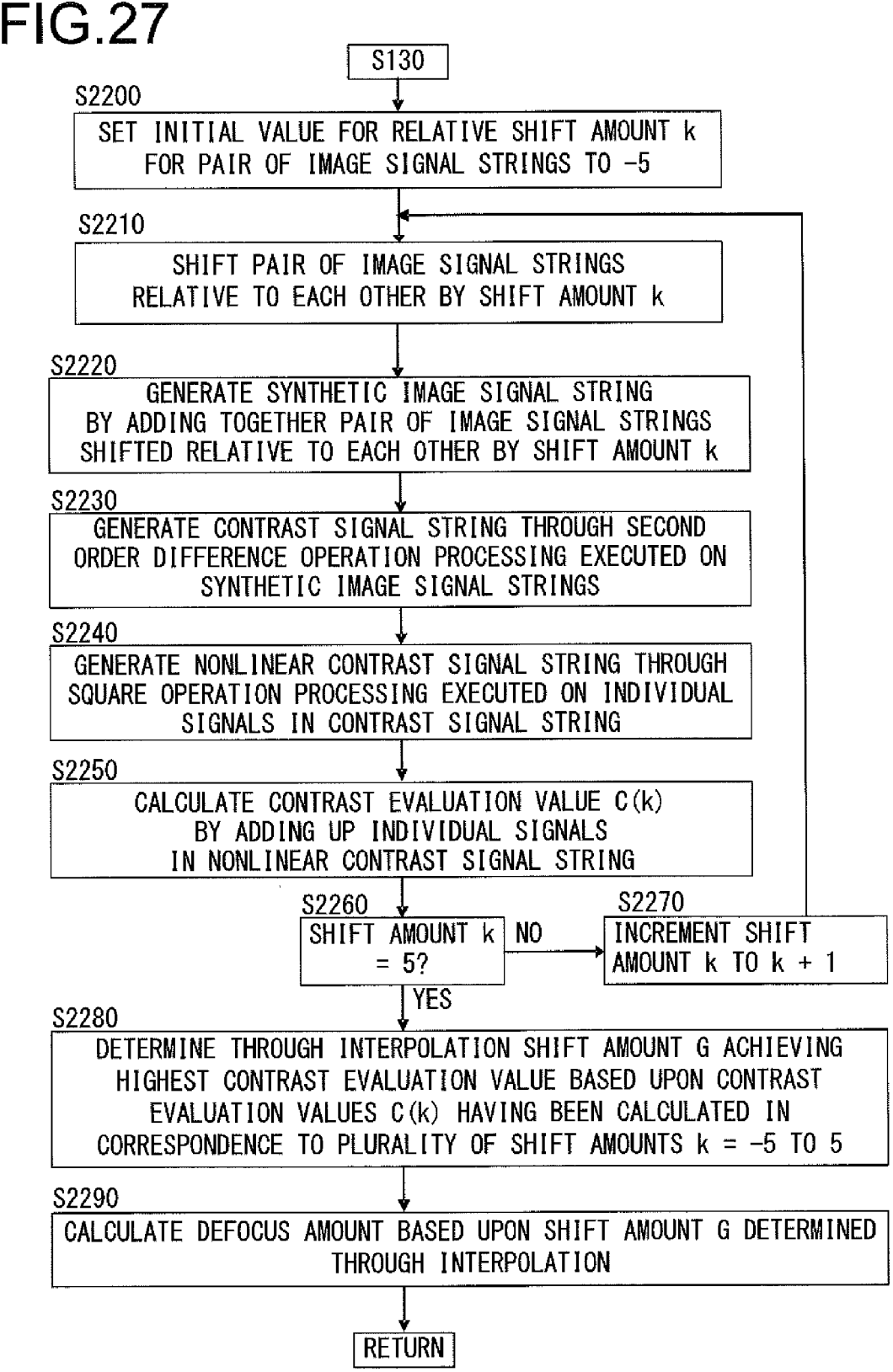
FIG. 27 presents a detailed flowchart of the image shift detection operation processing executed based upon contrast evaluation of a pair of image signal strings.

In step S2250 in FIG. 27, the contrast evaluation value C(k) is calculated by adding up the values indicated by the individual signals making up the nonlinear contrast signal string Q(n, k) as expressed in (21). Σ in expression (21) indicates summation related to n.

$$C(k)=\Sigma Q(n,k) \quad (21)$$

In step S2260, a decision is made as to whether or not the shift amount k has become equal to 5, and if it is decided that the shift amount k has not become equal to 5, the shift amount k is incremented for update. Subsequently, the processing returns to step S2210 and another contrast evaluation value C(k) is calculated through the processing in step S2210 through step S2250 executed in conjunction with the updated shift amount k.

If it is decided in step S2260 that the shift amount k has become equal to 5, the contrast evaluation value C(k) will have been calculated in correspondence to all the shift amounts k=−5 through 5. In this situation, the processing proceeds to step S2280. In this step, in which a shift amount G (in decimal fraction units), at which the maximum contrast evaluation value is achieved, is determined based upon the contrast evaluation values C(k) having been discretely calculated in correspondence to the shift amounts k=−5 through 5 set in integral units through interpolation by hypothesizing that the shift amount changes continuously.

Figure 31:
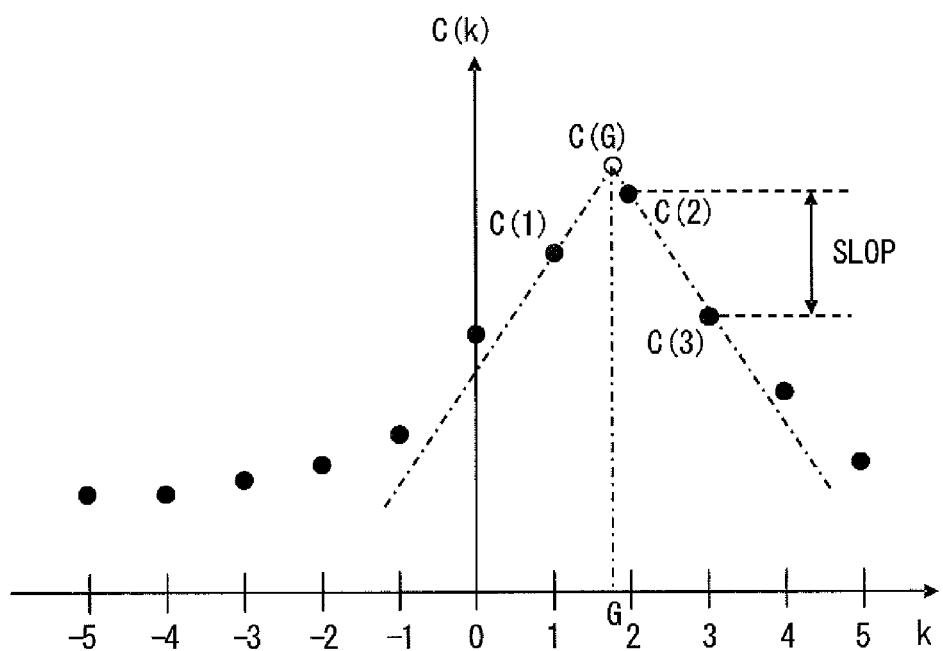
FIG. 31 illustrates an interpolation method (3-point interpolation) that may be adopted for the shift amount G.

FIG. 31 illustrates the interpolation method (3-point interpolation) adopted when calculating the shift amount G, with the shift amount k (−5, −4, . . . , 4, 5) indicated along the horizontal axis and the contrast evaluation values indicated along the vertical axis. The filled circles ● each indicate a contrast evaluation value C(k) calculated in correspondence to an integral shift amount k, and in the example presented in FIG. 31, the contrast evaluation value C(2) at the shift amount k=2 achieves the largest value. The contrast evaluation value C(1) at the shift amount k=1 immediately preceding the shift amount k=2 and the contrast evaluation value C(3) at the shift amount k=3 immediately succeeding the shift amount k=2 have a relationship expressed as; C(1)>C(3). The shift amount G (in decimal fraction units) is determined through interpolation as a shift amount corresponding to a coordinate point at which the straight line passing through the contrast evaluation values C(2) and C(3) and the straight line passing through the contrast evaluation values C(1), which inclines along a direction opposite from the inclination direction of the straight line passing through the contrast evaluation values C(2) and C(3), intersect each other. At the shift amount G, the largest contrast evaluation value C(G) is achieved in conjunction with a hypothetical continuously-changing shift amount (indicated with an unfilled circle ○ in the example presented in FIG. 31).

The concept described in reference to FIG. 31 may be generalized as follows. The largest contrast evaluation value C(kj) is achieved at an integral shift amount kj, and contrast evaluation values C(kj−1) and C(kj+1) are calculated in correspondence to shift amounts kj−1 and kj+1 respectively. The shift amount G, at which the largest contrast evaluation value C(G) is achieved in conjunction with a hypothetical continuously-changing shift amount, can be calculated through the three-point interpolation method, as expressed in (22) through (25) below.

$$G=kj-D/\text{SLOP} \quad (22)$$

$$C(G)=C(kj)+|D| \quad (23)$$

$$D=\{C(kj-1)-C(kj+1)\}/2 \quad (24)$$

$$\text{SLOP}=\text{MAX}\{|C(kj+1)-C(kj)|,|C(kj-1)-C(kj)|\} \quad (25)$$

The reliability of the shift amount G calculated as expressed in (22) is judged based upon criteria such as; the contrast evaluation value C(G) calculated as expressed in (23) does not exceed a predetermined threshold value and/or SLOP calculated as expressed in (25) does not exceed a predetermined threshold value. When no peak is detected among the contrast evaluation values in FIG. 31, focus detection is determined to be not possible.

If the shift amount G having been calculated is judged to be reliable, the shift amount G is converted to an image shift amount (second image shift amount) shft2 as expressed in (26) below. The detection pitch PY in expression (26) indicates the sampling pitch with which data are sampled via focus detection pixels of a single type, i.e., twice the image-capturing pixel pitch.

$$\text{shft2} = PY \times G \tag{26}$$

The image shift amount shft2 is then multiplied by a predetermined conversion coefficient Kd and the image shift amount shft2 is thus converted to a defocus amount def.

$$\text{def} = Kd \times \text{shft2} \tag{27}$$

The conversion coefficient Kd in expression (27) is a conversion coefficient determined in correspondence to the proportional relation of the focus detection pupil distance to the distance between the gravitational centers of the pair of focus detection pupils 95 and 96, and its value changes in correspondence to the aperture F-number at the optical system.

The image shift detection operation processing executed based upon contrast evaluation has been described in detail. The digital camera 201 equipped with the focus detection device achieved in this variation includes an image sensor 212 and a body control device 214.

In step S2210, the body control device 214 executes image shift processing so as to shift the pair of image signal strings $A_1$ through $A_M$ and $B_1$ through $B_M$ relative to each other.

In step S2220, the body control device 214 executes image synthesis processing through which a synthetic image signal string F(n, k) is generated by adding the pair of image signal strings $A_1$ through $A_M$ and $B_1$ through $B_M$ to each other.

In step S2230, the body control device 214 executes contrast extraction processing through which a contrast signal string P(n, k) is generated by extracting a plurality of contrast components from the synthetic image signal string F(n, k).

In step S2240, the body control device 214 executes nonlinear conversion processing through which the contrast signal string P(n, k) is converted to a nonlinear contrast signal string Q(n, k).

In step S2250, the body control device 214 executes contrast evaluation processing through which the contrast evaluation value C(k) is calculated for the synthetic image signal string F(n, k).

In step S2280, the body control device 214 executes image shift amount detection processing through which the shift amount G corresponding to the extreme value C(G) among the plurality of contrast evaluation values C(k) is detected as an image shift amount shft2.

In step S2290, the body control device 214 executes defocus amount calculation processing through which defocus amount def for the interchangeable lens 202 is calculated.

By detecting the image shift amount based upon the contrast evaluation values as described above, accurate image shift amount detection is enabled even when the identicalness of the pair of images is compromised due to an optical aberration. In addition, in the contrast evaluation value calculation, the contrast component in the synthetic image signal strings undergoes nonlinear conversion. As a result, an image shift amount can be detected with a high level of reliability even in conjunction with a step image pattern such as that shown in FIG. 28 and FIG. 29.

The pair of image signal strings $A_1$ through $A_M$ and $B_1$ through $B_M$ generated in the digital camera 201 are obtained by discretely sampling a pair of subject images 67 and 68 with the detection pitch PY, i.e., the sampling pitch with which data are sampled via focus detection pixels of a given type. The plurality of shift amounts k take discrete values that are separated from one another in units of the detection pitch PY.

Based upon the contrast evaluation value C(kj), which takes an extreme value among the contrast evaluation values C(k), and two contrast evaluation values C(kj−1) and C(kj+1), the body control device 214 detects an image shift amount Sf with finer accuracy in units equal to or less than the detection pitch PY. Through these measures, even higher extent of accuracy is assured in the image shift amount detection. It is to be noted that the two contrast evaluation values C(kj−1) and C(kj+1) are the contrast evaluation values calculated at two shift amounts kj−1 and kj+1, which are respectively decremented and incremented by the detection pitch P1 relative to the shift amount kj corresponding to the contrast evaluation value C(G).

(2) In step S2230 in FIG. 27, the synthetic image signal string F(n, k) undergoes the first-order difference processing executed as expressed in (19). As explained earlier, the linear combination operation processing for generating the contrast signal string P(n, k) by extracting a high-frequency contrast component from the synthetic image signal string F(n, k) may be executed as Nth-order difference operation processing for a positive integer N. For instance, this processing may be executed as second-order difference processing, as expressed in (28) below.

$$P(n,k) = -F(n-1,k) + 2 \times F(n,k) - F(n+1,k) \tag{28}$$

As long as the difference intervals are uniform, it is more desirable to execute the second-order difference processing, rather than the first-order difference processing, since the high-frequency component can be extracted with better efficiency through the second-order difference processing.

Figure 32:
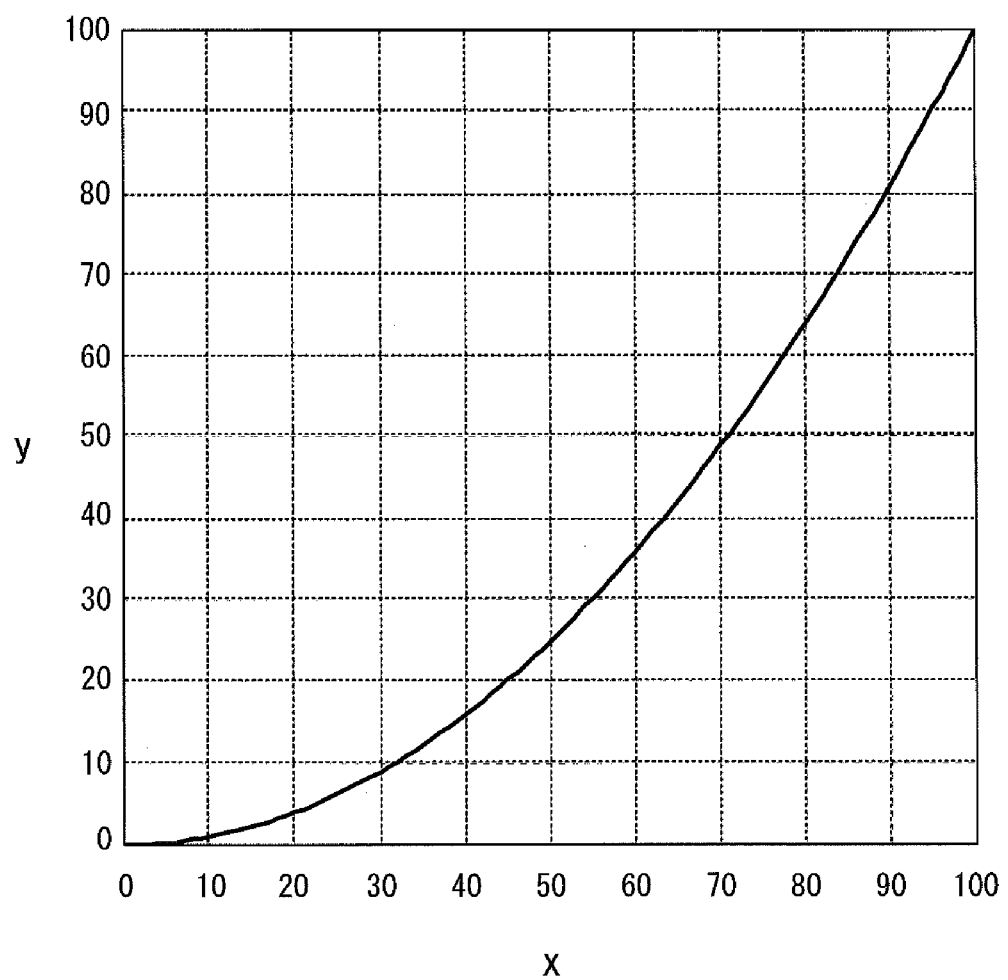
FIG. 32 presents an example of a nonlinear function H(x).

(3) The nonlinear function H(x) used in step S2240 in FIG. 27 is a simple square function ($y = H(x) = x^2$). In practical application, it may be more convenient to match the output range of the output y relative to the input range of the input x (e.g., when restrictions are imposed on the number of operating bits at the CPU). Under such circumstances, the nonlinear function H(x) may be adjusted as needed. For instance, assuming the input range of the input x is 0 through 100 and the output range of the output y is 0 through 100, a nonlinear function H(x) such as that expressed in (29) below, represented by the graph in FIG. 32, may be used.

$$y = H(x) = x^2/100 \tag{29}$$

(4) The following explanation will be given by assuming that the input range of the input x bears a positive sign and that the nonlinear function H(x) is a function with the output range of the output y bearing a positive sign.

Examples of the nonlinear function H(x) are not limited to the square functions described above, and a number of variations are conceivable for the nonlinear function H(x). In order to assure stable contrast evaluation (characteristics whereby a higher or lower contrast evaluation value is achieved at higher contrast remain unchanged irrespective of whether the contrast component value is large or small), values representing the contrast component having undergone the nonlinear conversion executed with the nonlinear function H(x) must sustain a constant relationship at all times, regardless of the values taken for the contrast component prior to the nonlinear conversion. This concept may be rephrased as follows; the nonlinear function H(x) allows the relationship among various values taken for the input x within the input range set for the input x to be retained as is or inversely retained at all times in the corresponding output values y.

Namely, for given inputs x1 and x2 (x1<x2), H(x1)<H(x2) or H(x1)>H(x2) is always true but H(x1)=H(x2) is never true in the nonlinear function H(x). This means that the nonlinear function H(x) is either a monotonically increasing function or a monotonically decreasing function over the input range of the input x. This condition may be rephrased as follows. A first derivative function h(x) of the nonlinear function H(x) is either h(x)>0 or h(x)<0 over the input range of the input x. Namely, h(x)≠0 is true for any x.

In order to likewise assure stable contrast evaluation, it is desirable that the relationship between values taken for the input x within the input range be retained or inversely retained at all times in the corresponding values for the first derivative function h(x) of the nonlinear function H(x). More specifically, for given inputs x1 and x2 (x1<x2), h(x1)<h(x2) or h(x1)>h(x2) is always true but h(x1)=h(x2) is never true in the first derivative function h(x). This means that the first derivative function h(x) is either a monotonically increasing function or a monotonically decreasing function over the input range of the input x. This condition may be rephrased as follows. A second derivative function r(x) of the nonlinear function H(x) is either r(x)>0 or r(x)<0 over the input range of the input x. Namely, r(x)≠0 is true for any x.

With regard to the nonlinear function H(x) expressed in (29), first derivative function h(x)=x/50>0 (x=0 to 100) and the second derivative function r(x)=1/50>0 (x=0 to 100). Thus, the conditions that the nonlinear function H(x) is a monotonically increasing function (first derivative function h(x)>0) and that the first derivative function h(x) is a monotonically increasing function (second derivative function r(x)>0 are satisfied. The graph representing the contrast evaluation value C(k) obtained in conjunction with a nonlinear function H(x) satisfying the conditions that the nonlinear function H(x) is a monotonically increasing function (first derivative function h(x)>0) and that the first derivative function h(x) is a monotonically increasing function (second derivative function r(x)>0), indicates characteristics (convex characteristics) with a peak (extreme value) at the shift amount at which the highest contrast is achieved in the synthetic image signal string as shown in FIG. 30(b).

The graph representing the contrast evaluation value C(k) obtained in conjunction with the nonlinear function H(x) satisfying the conditions that a nonlinear function H(x) is a monotonically decreasing function (first derivative function h(x)<0) and that the first derivative function h(x) is a monotonically increasing function (second derivative function r(x)>0) indicates characteristics (concave characteristics) with a bottom (extreme value) at the shift amount at which the highest contrast is achieved in the synthetic image signal string as shown in FIG. 30(c).

Figure 37:
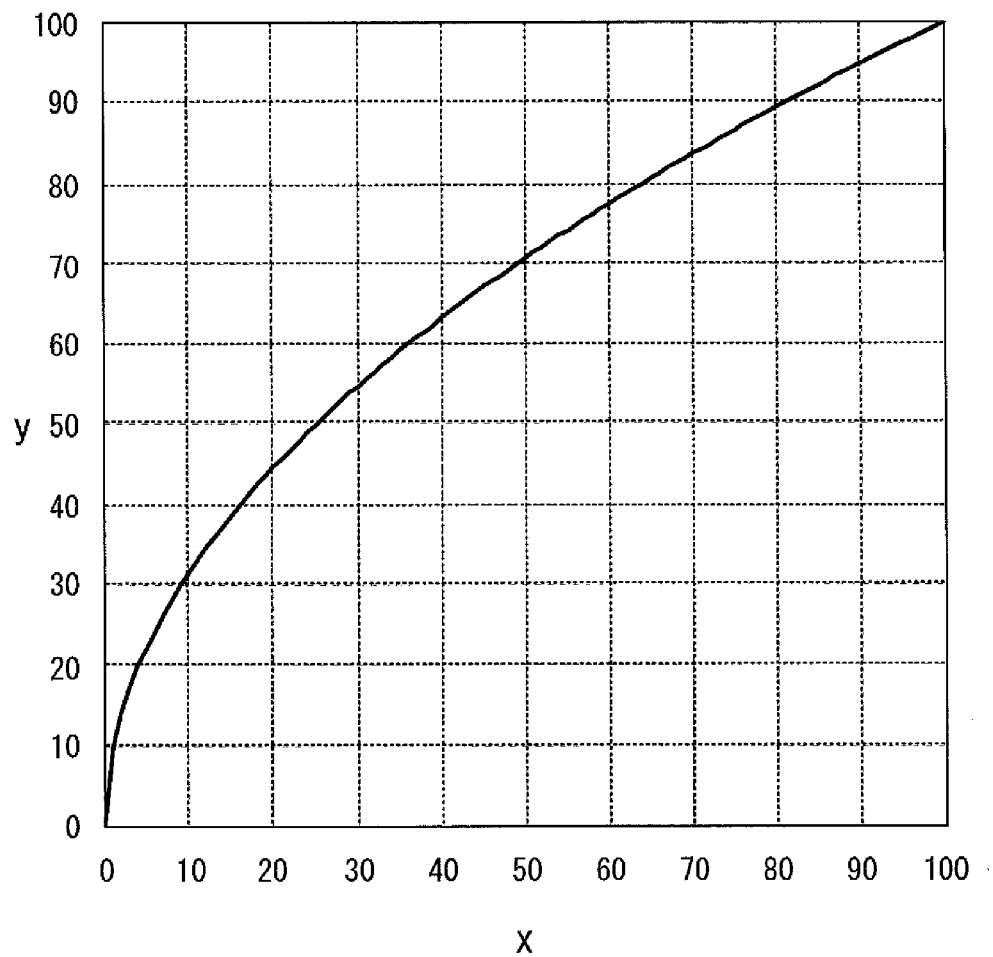
FIG. 37 presents an example of a nonlinear function H(x).

An example of nonlinear conversion executed with, for instance, a nonlinear function (first derivative function h(x) >0 and a second derivative function r(x)<0) such as that shown in FIG. 37 for a synthetic image signal string that includes a step, as shown in FIGS. 28(a), 28(b), 29(a) and 29(b), will be explained next. When the synthetic image signal string includes two steps, as shown in FIG. 28(c) with the step height taking a value of 30 in the step pattern, the value calculated for y in correspondence to x=30 is approximately 55, as indicated in FIG. 37. In this situation, the contrast evaluation value C(k1) is calculated to be approximately 110 by multiplying the value y by the number of steps i.e., 2. When the synthetic image signal string includes a first-order with the step height thereof taking on a value of 60, as shown in FIG. 29(c), the contrast evaluation value C(k2) is calculated to be approximately 77, i.e., the value taken for y when x=60, which is twice the value of the step height in the step pattern. Since C(k1)>C(k2), the graph representing the contrast evaluation value C(k) demonstrates concave characteristics.

The graph representing the contrast evaluation value C(k) obtained in conjunction with a nonlinear function H(x) satisfying the conditions that the nonlinear function H(x) is a monotonically increasing function (first derivative function h(x)>0) and that the first derivative function h(x) is a monotonically decreasing function (second derivative function r(x)<0) and the graph representing the contrast evaluation value C(k) obtained in conjunction with a nonlinear function H(x) satisfying the conditions that the nonlinear function H(x) is a monotonically decreasing function (first derivative function h(x)<0) and that the first derivative function h(x) is a monotonically decreasing function (second derivative function r(x)<0), each indicate characteristics (concave characteristics) with a bottom (extreme value) at the shift amount at which the highest contrast is achieved in the synthetic image signal string as shown in FIG. 30(c).

The relationships between the conditions explained above and the contrast evaluation value characteristics are summarized in Table 1. Even when the graph representing the contrast evaluation value C(k) demonstrates concave characteristics, a shift amount G (in decimal fraction units) achieving the smallest contrast evaluation value in conjunction with hypothetical continuously-changing shift amount can be determines through 3-point interpolation. When the graph of the contrast evaluation value C(k) takes on concave characteristics, the highest image quality evaluation value is achieved in correspondence to the smallest contrast evaluation value C(k), whereas when the graph of the contrast evaluation value C(k) takes on convex characteristics, the highest image quality evaluation value is achieved in correspondence to the largest contrast evaluation value C(k). The displacement amount at which the contrast evaluation value calculated for the synthetic subject image takes an extreme value, i.e., either the maximum value or the minimum value, is defined as the image shift amount achieving the highest image quality evaluation value.

TABLE 1

| contrast evaluation value | nonlinear function | first derivative function |
|---|---|---|
| convex characteristics | monotonic increase | monotonic increase |
| concave characteristics | monotonic decrease | monotonic increase |
| | monotonic increase | monotonic decrease |
| | monotonic decrease | monotonic decrease |

Figure 33:
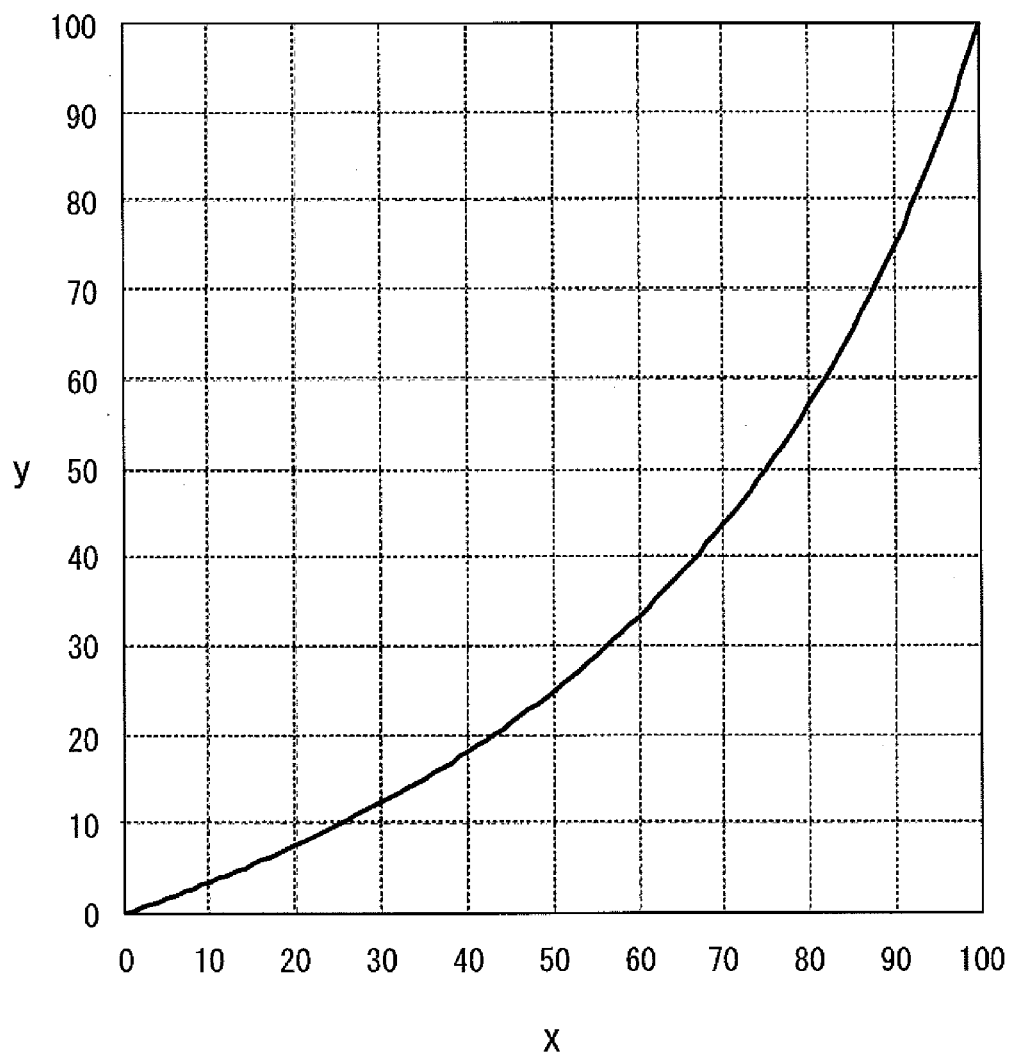
FIG. 33 presents an example of a nonlinear function H(x).
Figure 34:
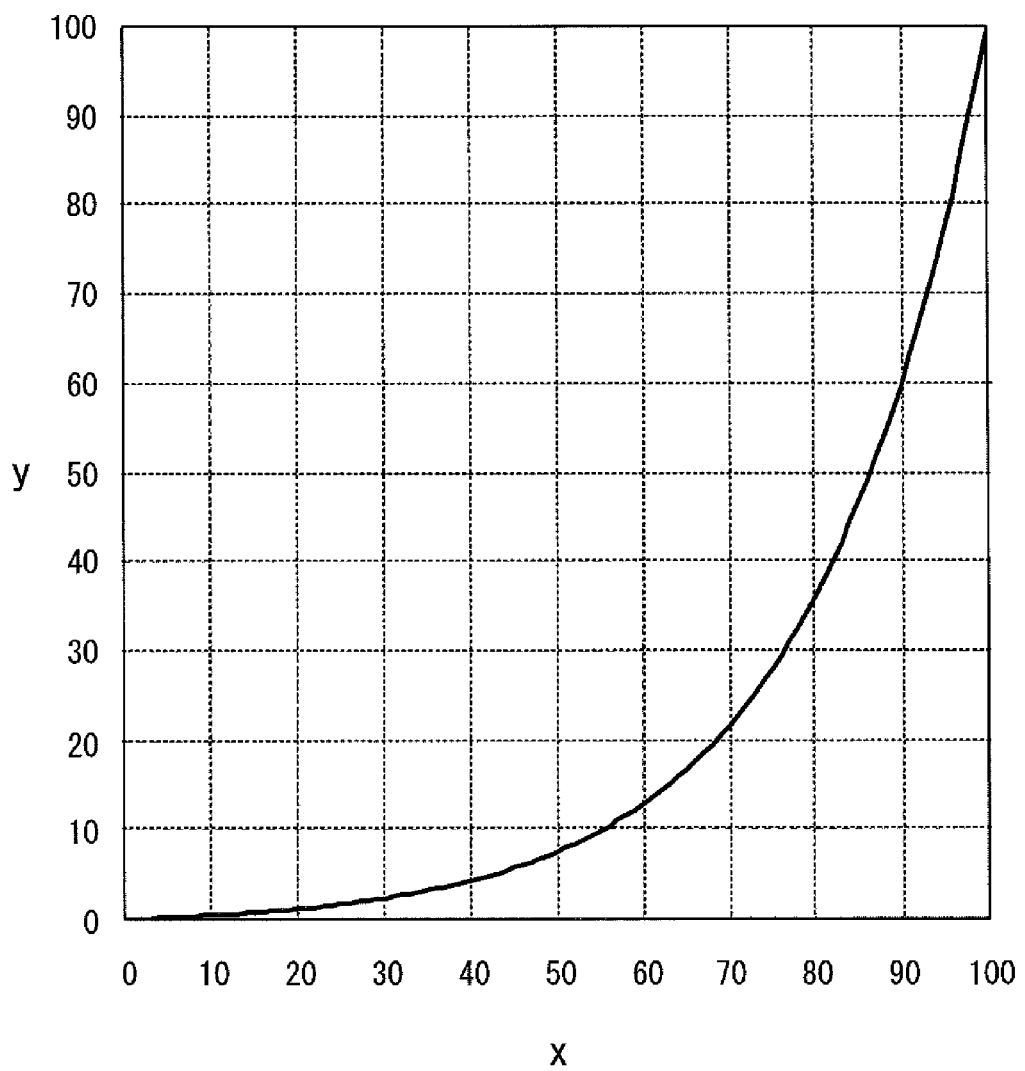
FIG. 34 presents an example of a nonlinear function H(x).
Figure 35:
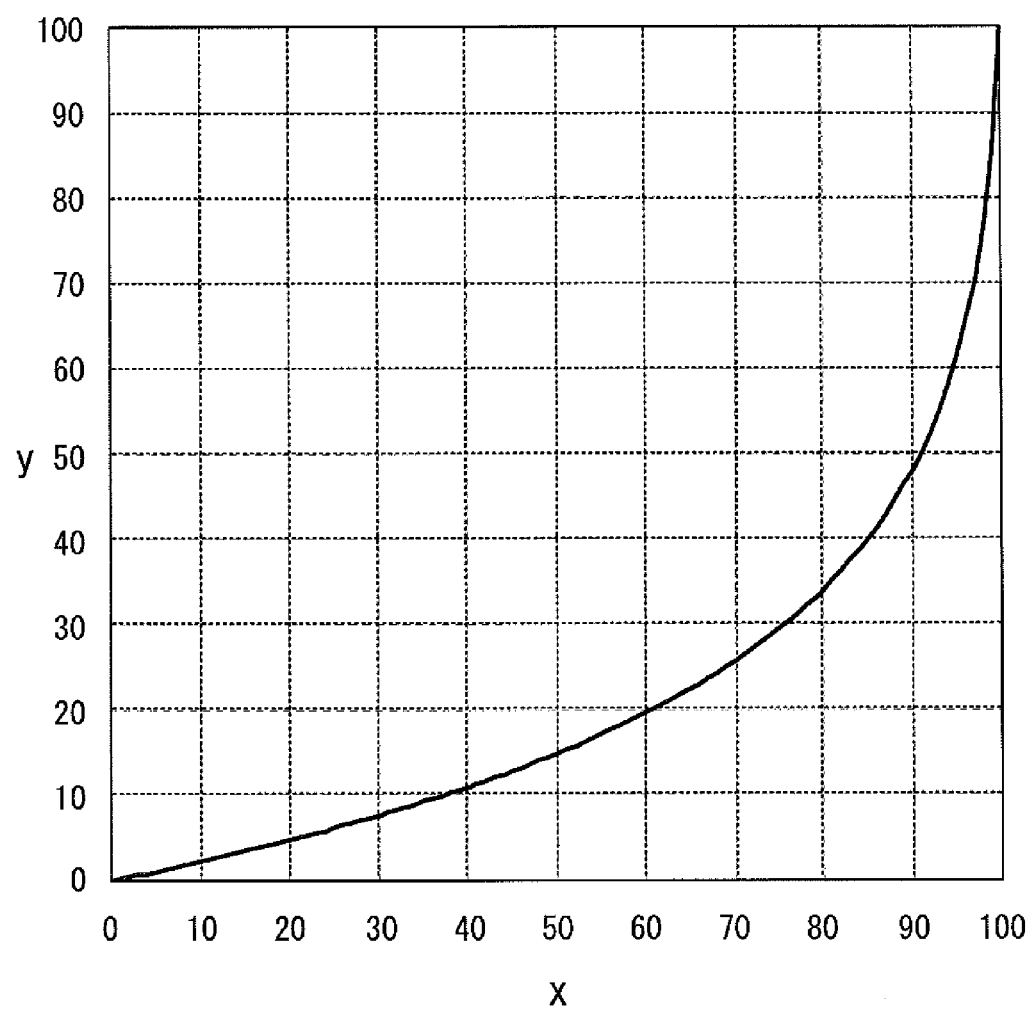
FIG. 35 presents an example of a nonlinear function H(x).
Figure 36:
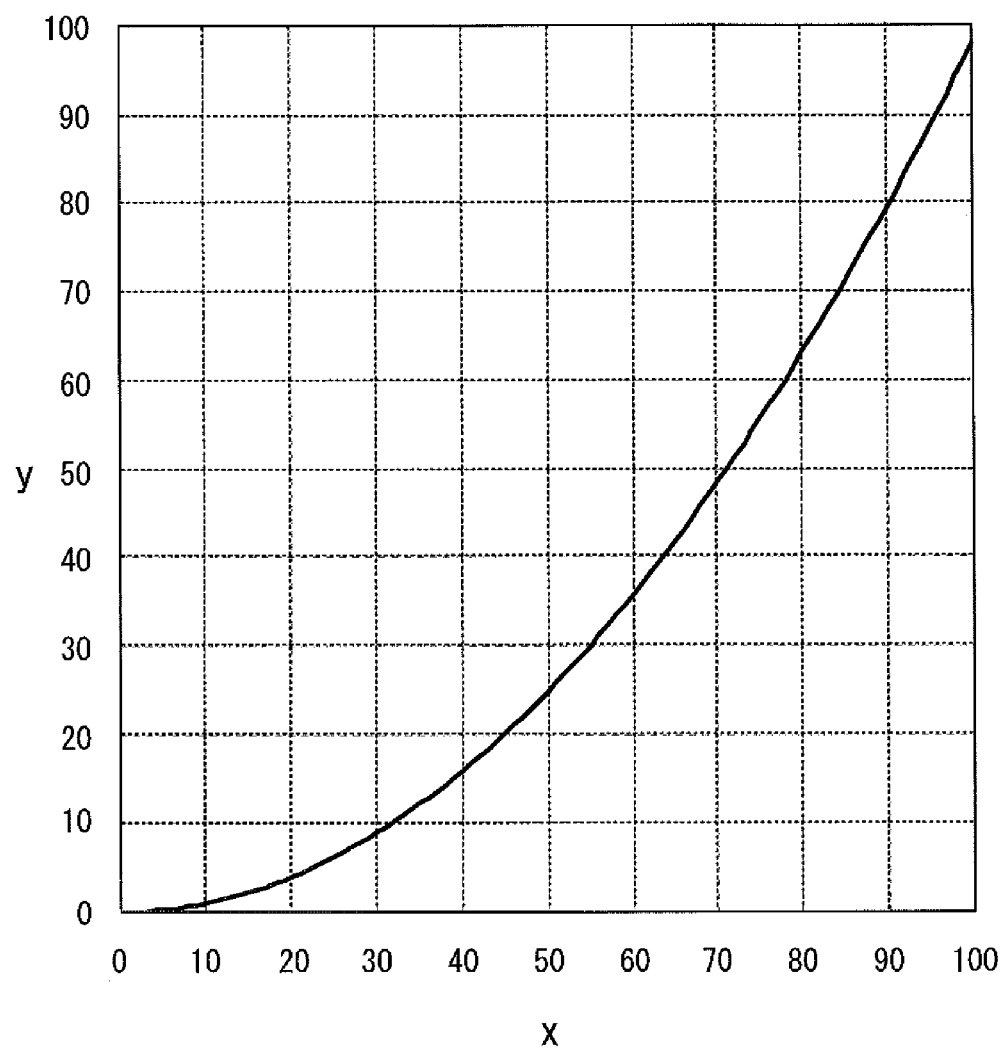
FIG. 36 presents an example of a nonlinear function H(x).

Examples of nonlinear functions H(x) satisfying the conditions that the nonlinear function H(x) is a monotonically increasing function (first derivative function h(x)>0 and that the first derivative function h(x) is a monotonically increasing function (second derivative function r(x)>0) include those expressed in (30) (see FIG. 33), expressed in (31) (see FIG. 34), expressed in (32) (see FIG. 35) and expressed in (33) (see FIG. 36). EXP( ) in expression (31) is an exponential function with Napier's constant e, and LOG( ) in expression (32) is a common logarithm with a base of 10.

$$y=H(x)=750/(15-x/10)-50 \quad (30)$$

$$y=H(x)=100\times(\text{EXP}(95+x/20)-\text{EXP}(95))/\text{EXP}(100) \quad (31)$$

$$y=H(x)=100-50\times\text{LOG}(100-99\times x/100) \quad (32)$$

$$y=H(x)=800\times(1-\text{COS}(x/200)) \quad (33)$$

Examples of nonlinear functions H(x) satisfying the conditions that the nonlinear function H(x) is a monotonically increasing function (first derivative function h(x)>0) and that the first derivative function h(x) is a monotonically decreasing function (second derivative function r(x)<0) include that expressed in (34) (see FIG. 37). SQRT( )) in expression (34) is a root (square root) function.

$$y=H(x)=10\times\text{SQRT}(x) \quad (34)$$

Figure 38:
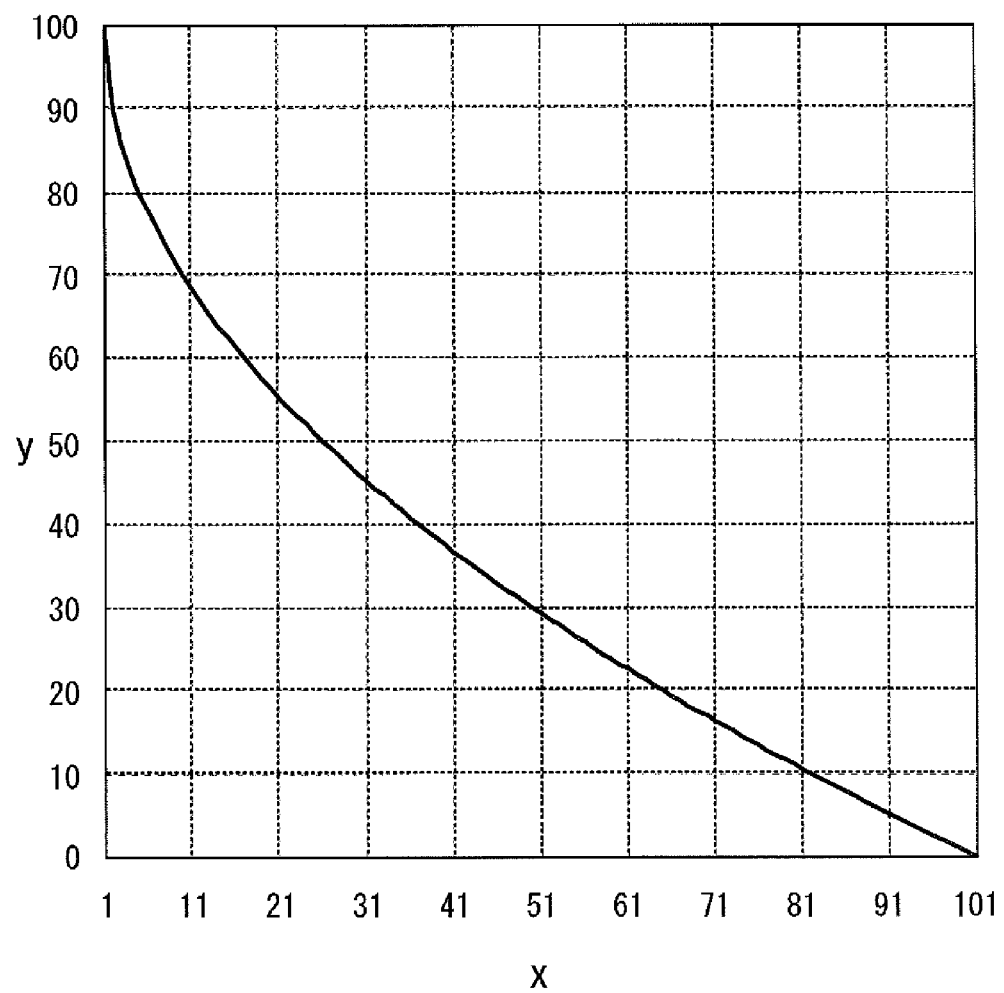
FIG. 38 presents an example of a nonlinear function H(x).

Examples of nonlinear functions H(x) satisfying the conditions that the nonlinear function H(x) is a monotonically decreasing function (first derivative function h(x)<0) and that the first derivative function h(x) is a monotonically increasing function (second derivative function r(x)>0) include that expressed in (35) (see FIG. 38).

$$y=H(x)=100-10\times\text{SQRT}(x) \quad (35)$$

Figure 39:
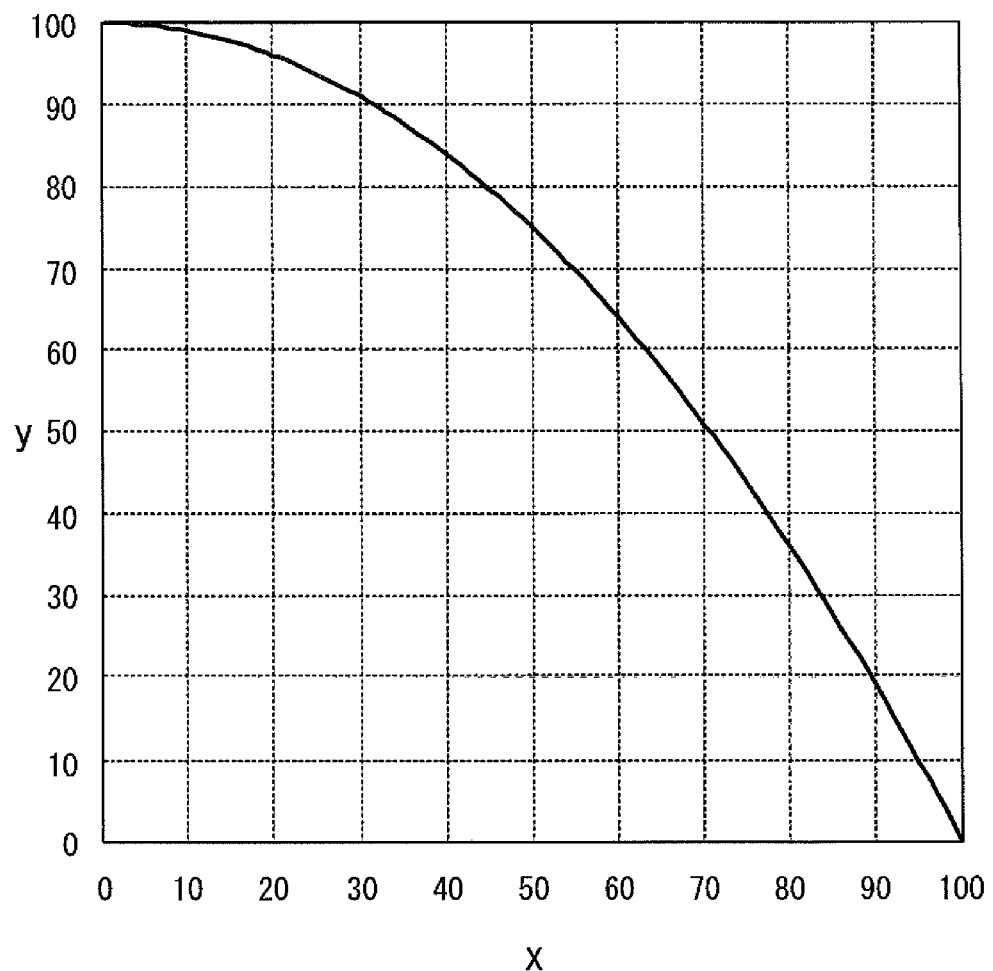
FIG. 39 presents an example of a nonlinear function H(x).

Examples of nonlinear functions H(x) satisfying conditions that the nonlinear function H(x) is a monotonically decreasing function (first derivative function h(x)<0) and that the first derivative function h(x) is a monotonically decreasing function (second derivative function r(x)<0) include that expressed in (36) (see FIG. 39).

$$y=H(x)=100-x^2/100 \quad (36)$$

The nonlinear functions and their first derivatives are both monotonically increasing functions over the range of values that can be taken for the absolute values of a plurality of contrast component values. Thus, stable contrast evaluation is assured and ultimately, the image shift amount can be determined with a high degree of accuracy.

(5) The processing executed in order to calculate the contrast evaluation value C(k) has been described as processing executed in the separate steps (i) through (v) below corresponding to step S2210 through step S2250 in FIG. 27, so as to ensure that the essential concepts of variations (1) through (4) will be easily understood.

(i) The pair of image signal strings $A_1$ through $A_M$ and $B_1$ through $B_M$, are shifted relative to each other by the shift amount k.

(ii) A synthetic image signal string F(n, k) is generated by adding together the pair of image signal strings $A_1$ through $A_M$ and $B_1$ through $B_M$, having been shifted relative to each other by the shift amount k, as expressed in (8).

(iii) First-order difference processing is executed as expressed in (19) for the synthetic image signal string F(n, k) so as to generate a contrast signal string P(n, k) with high-frequency contrast components extracted from the synthetic image signal string F(n, k).

(iv) The contrast signal string P(n, k) undergoes nonlinear conversion executed by using a nonlinear function H(x) which is a quadratic function (a square function H(x)=$x^2$ in the example explained earlier) as expressed in (20) and thus, a nonlinear contrast signal string Q(n, k) is generated.

(v) The contrast evaluation value C(k) is calculated by adding up the signal values indicated in the nonlinear contrast signal string Q(n, k) as expressed in (21).

However, it is not strictly necessary in the actual process of calculating the contrast evaluation value C(k) to explicitly generate the synthetic image signal string F(n, k), the contrast signal string P(n, k) and the nonlinear contrast signal string Q(n, k), which are interim results occurring in the arithmetic operation. For instance, the contrast signal string P(n, k) may be directly calculated without explicitly generating the synthetic image signal string F(n, k), as expressed in (37) below.

$$P(n,k)=(A_n+B_{n+k})-(A_{n-1}+B_{n-1+k}) \quad (37)$$

In addition, the nonlinear contrast signal string Q(n, k) may be directly calculated without explicitly generating the contrast signal string P(n, k), as expressed in (38) below.

$$Q(n,k)=((A_n+B_{n+k})-(A_{n-1}+B_{n-1+k}))^2 \quad (38)$$

As a further alternative, the contrast evaluation value C(k) may be directly calculated based upon the pair of image signal strings without explicitly generating any of the interim signal strings, as expressed in (39) below.

$$C(k)=\Sigma((A_n+B_{n+k})-(A_{n-1}+B_{n-1+k}))^2 \quad (39)$$

Namely, it is not an essential requirement of the present invention that the synthetic image signal string F(n, k), the contrast signal string P(n, k) and the nonlinear contrast signal string Q(n, k) be explicitly generated. Rather, the essential element characterizing the present invention is the processing through which the contrast evaluation value C(k) is calculated by adding up nonlinear contrast signal values resulting from nonlinear conversion of the contrast component included in the synthetic image information generated based upon a pair of image signal strings that are shifted relative to each other and added together.

(6) A pair of focus detection pixels 315 and 316 in the embodiments and variations described above each include a photoelectric conversion unit and a pair of focus detection light fluxes 75 and 76 are thus individually received at the focus detection pixels 315 and 316. However, the present invention may be adopted in conjunction with focus detection pixels each having a pair of photoelectric conversion units so that the pair of focus detection light fluxes 75 and 76 are individually received at the pair of photoelectric conversion units.

(7) While an explanation has been given in reference to the embodiments and variations thereof on an example in which the focus detection operation is executed through split-pupil phase detection via micro lenses, the present invention is not limited to this focus detection method and may instead be used in focus detection adopting the image reforming split-pupil phase detection method of the known art.

In the image reforming phase detection method, a subject image formed on a primary image plane is reformed via a pair of separator lenses, onto a pair of image sensors as a pair of subject images formed with a pair of focus detection light fluxes having passed through a pair of focus detection pupils. Based upon the outputs from the pair of image sensors, an image shift amount indicating the extent of image shift manifested by the pair of subject images is detected. This means that if the optical characteristic of the photographic optical system is not good, the level of identicalness of the signal patterns (shapes) for the pair of subject images is compromised, resulting in lowered degree of coincidence between the pair of subject image signal strings. In other words, a problem similar to that of the split-pupil phase detection through micro lenses occurs. This issue may also be effectively addressed by adopting the high-accuracy second image shift detection operation processing so as to achieve accurate focus adjustment. In the second embodiment and variations thereof, the first image shift detection operation processing, executed on a relatively small operational scale and thus completed in shorter time, is executed if the optical characteristic at the photographic optical system is good.

(8) The image-capturing apparatus equipped with the focus detection device according to the present invention is not limited to the digital camera 201, with the interchangeable lens 202 mounted at the camera body 203 described above. For instance, the present invention may instead be adopted in, for instance, a digital camera with an integrated lens or in a video camera. Furthermore, it may also be adopted in a compact camera module built into a mobile telephone or the like, a surveillance camera, a visual recognition device in robotics, an onboard camera or the like.

(9) The present invention may be adopted in a device other than a focus detection device that detects the defocus amount at the photographic optical system through the TTL method, i.e., through the split-pupil phase detection method. The present invention may also be adopted in, for instance, a range-finding device adopting a natural light phase detection method, which includes a separate pair of range-finding optical systems, in addition to the photographic optical system. A pair of images formed via the pair of range-finding optical systems are discretely sampled by a pair of image sensors with pre-determined spatial pitches. By adopting the present invention in conjunction with the pair of image signal strings thus generated, the extent of image shift manifested by the pair of image signal strings can be detected and then, the subject distance can be calculated based upon the image shift amount. The range-finding device adopting the present invention as described above is capable of very accurate image shift detection even when the aberration characteristics of the pair of range-finding optical systems do not exactly match. Ultimately, the need to match the aberration characteristics of the pair of range-finding optical systems with a high level of rigor is eliminated, which, in turn, facilitates the manufacturing process and makes it possible to reduce the manufacturing costs.

(10) The image shift detection for a pair of images according to the present invention may be adopted in devices other than the focus detection device and the range-finding device described above. Image shift detection according to the present invention may be adopted in, for instance, an image-capturing apparatus that includes a photographic optical system and an image sensor that spatially samples an image formed through the photographic optical system in two dimensions, and generates image signal strings over predetermined frame intervals. By two-dimensionally executing the image shift detection according to the present invention on two image signal strings (a pair of image signal strings) from different frames, the image shift amount indicating the extent of image shift manifested by the two image signal strings can be detected. This image shift amount may be recognized as a vibration amount indicating the amount of vibration at the imaging apparatus or as a displacement (motion vector) of the subject image, occurring from one frame to another.

(11) The present invention may be further adopted in conjunction with two image signal strings (a pair of image signal strings) generated completely independently of each other. For instance, the present invention may be adopted in a template matching operation executed to detect a specific pattern by comparing an image signal string and a reference image signal string obtained through measurement so as to detect the position of the specific pattern in the reference image signal string or whether or not the specific pattern is present in the reference image signal string.

An image shift amount detection device used in an example of such an application includes an image sensor that generates a pair of image signal strings by discretely sampling a pair of images over predetermined spatial pitches.

The image shift amount detection device further includes an image shift processing unit that shifts the pair of image signal strings relative to each other at a plurality of shift amounts.

The image shift amount detection device includes an image synthesis processing unit that generates a synthetic image signal string made up with a plurality of synthetic image signals in correspondence to each shift amount among the plurality of shift amounts by adding together the pair of image signal strings shifted by the image shift processing unit relative to each other.

The image shift amount detection device includes a contrast extraction processing unit that generates a contrast signal string made up with a plurality of contrast components in correspondence to each shift amount by extracting the plurality of contrast components from the synthetic image signal string through a linear combination operation executed for the plurality of synthetic image signals in the synthetic image string.

The image shift amount detection device includes a nonlinear conversion processing unit that converts the contrast signal string to a nonlinear contrast signal string through nonlinear conversion executed based upon a nonlinear function on the plurality of contrast components.

The image shift amount detection device includes a contrast evaluation processing unit that calculates a contrast evaluation value for the synthetic image signal string in correspondence to each shift amount based upon the nonlinear contrast signal string.

The image shift amount detection device includes an image shift amount detection processing unit that detects, as an image shift amount indicating the extent of relative image shift manifested by the pair of images, a shift amount corresponding to an extreme value among a plurality of contrast evaluation values calculated in correspondence to the plurality of shift amounts.

The image shift amount detection device configured as described above is capable of high accuracy image shift amount detection.

The disclosures of the following priority applications are herein incorporated by reference:

Japanese Patent Application No. 2012-105849 filed May 7, 2012

Japanese Patent Application No. 2012-105850 filed May 7, 2012

Japanese Patent Application No. 2013-037614 filed Feb. 27, 2013

REFERENCE SIGNS LIST 10 micro lens
11, 15, 16 photoelectric conversion unit
41, 42 upper portion
43, 44 lower portion
45, 46, 47, 48 edge
51, 55, 56 point image distribution
65, 66, 67, 68 subject image
71, 75, 76 light flux
90 exit pupil
91 optical axis
95, 96 focus detection pupil
97 area 98 predetermined focal plane
99 plane
100 photographic image plane
101, 102 focus detection area
201 digital camera
202 interchangeable lens
203 camera body
204 mount unit
206 lens control device
208 zooming lens
209 lens
210 focusing lens
211 aperture
212 image sensor
213 electrical contact point
214 body control device
215 liquid crystal display element drive circuit
216 liquid crystal display element
217 eyepiece lens
219 memory card
221 A/D conversion device
310 image-capturing pixel
315, 316 focus detection pixel
1510, 1610, 1710 solid line
1720 shaded area

The invention claimed is:

1. A focus detection device, comprising:
an image sensor that generates a first signal string and a second signal string in correspondence to a pair of light fluxes passing through an exit pupil of an optical system; and
a defocus amount calculation unit that calculates a defocus amount by shifting the first signal string and the second signal string relative to each other, and then adding together a first signal in the first signal string and a second signal in the second signal string after the first signal string and the second signal string have been shifted, the first signal and the second signal corresponding to each other.

2. A focus detection device according to claim 1, wherein:
the defocus amount calculation unit detects an image shift amount indicating an extent of relative image shift between a pair of images formed with the pair of light fluxes and calculates the defocus amount based upon the image shift amount.

3. A focus detection device according to claim 1, wherein:
the image sensor includes a plurality of first photoelectric conversion units and a plurality of second photoelectric conversion units;
each of the plurality of first photoelectric conversion units receives one light flux of the pair of light fluxes and output the first signal;
each of the plurality of second photoelectric conversion units receives another light flux of the pair of light fluxes and output the second signal;
the first signal string is made up with a plurality of first signals each of which corresponds to the first signal; and
the second signal string is made up with a plurality of second signals each of which corresponds to the second signal.

4. A focus detection device according to claim 3, wherein:
the defocus amount calculation unit generates a plurality of first synthetic signals each by adding together the first signal in the first signal string and the second signal in the second signal string for each of the plurality of first signals and each of the plurality of second signals, the first signal and the second signal corresponding to each other before shifting the first signal string and the second signal string relative to each other and generating a plurality of second synthetic signals each by adding together the first signal in the first signal string and the second signal in the second signal string for each of the plurality of first signals and each of the plurality of second signals, the first signal and the second signal corresponding to each other, detects the image shift amount based upon the plurality of first synthetic signals and the plurality of second synthetic signals and calculates the defocus amount based upon the image shift amount.

5. A focus detection device according to claim 3, wherein:
the defocus amount calculation unit includes an image shift amount detection unit that detects the image shift amount by generating a plurality of synthetic signals each by adding together the first signal in the first signal string and the second signal in the second signal string, the first signal and the second signal corresponding to each other, each time the first signal string and the second signal string are shifted relative to each other by a predetermined extent; and
the defocus amount calculation unit calculates the defocus amount based upon the image shift amount detected by the image shift amount detection unit.

6. A focus detection device according to claim 5, wherein:
the image shift amount detection unit calculates an evaluation value based upon the plurality of synthetic signals each time the first signal string and the second signal string are shifted by the predetermined extent and detects, as the image shift amount, a shift amount that indicates a shift of the first signal string and the second signal string relative to each other, corresponding to a largest value among evaluation values, each of which is the evaluation value.

7. A focus detection device according to claim 6, wherein:
the evaluation value is calculated based upon a difference value indicating a difference between the plurality of synthetic signals.

8. A focus detection device according to claim 7, wherein:
the evaluation value is calculated based upon the difference value obtained as a first-order difference value representing a first-order difference between the plurality of synthetic signals.

9. A focus detection device according to claim 8, wherein:
the first-order difference value indicates a difference between two synthetic signals achieving a specific sequential difference therebetween, both included in a synthetic signal string formed with the plurality of synthetic signals.

10. A focus detection device according to claim 7, wherein:
the evaluation value is calculated based upon the difference value obtained as a difference between a largest value and a smallest value among signal values indicated in the plurality of synthetic signals.

11. A focus detection device according to claim 7, wherein:
the evaluation value is calculated based upon the difference value obtained as a second-order difference value representing a second-order difference between the plurality of synthetic signals.

12. A focus detection device according to claim 11, wherein:
the second-order difference value is a sum of a difference between a given synthetic signal included in a synthetic signal string formed with the plurality of synthetic signals and another synthetic signal, achieving a specific sequential difference relative to the given synthetic signal along a descending direction, and a difference between the given synthetic signal and another synthetic signal, achieving the specific sequential difference relative to the given synthetic signal along an ascending direction.

13. A focus detection device according to claim 7, wherein:
the evaluation value is obtained by integrating MTF of the plurality of synthetic signals over a predetermined frequency band.

14. A focus detection device according to claim 5, wherein:
the defocus amount calculation unit further includes a contrast extraction unit that generates a contrast signal string formed with a plurality of contrast components by extracting the plurality of contrast components from a synthetic signal string formed with the plurality of synthetic signals through a linear combination operation executed for the plurality of synthetic signals, each time the first signal string and the second signal string are shifted relative to each other by the predetermined extent;
each time the first signal string and the second signal strings are shifted by the predetermined extent, the image shift amount detection unit calculates the evaluation value based upon a nonlinear contrast signal string obtained by converting the contrast signal string through nonlinear conversion executed for the plurality of contrast components based upon a nonlinear function; and
the image shift amount detection unit detects, as the image shift amount, a shift amount corresponding to an extreme value among a plurality of contrast evaluation values, one of which is obtained by calculating the evaluation value each time the first signal string and the second signal string are shifted by the predetermined extent.

15. A focus detection device according to claim 14, wherein:
the nonlinear function is a monotonic function over a range of values that can be taken for absolute values of the plurality of contrast components.

16. A focus detection device according to claim 15, wherein:
a first derivative function of the nonlinear function is a monotonic function over the range of values that can be taken for the absolute values of the plurality of contrast components.

17. A focus detection device according to claim 16, wherein:
the nonlinear function is a quadratic function.

18. A focus detection device according to claim 14, wherein:
the linear combination operation is an Nth-order difference operation for a positive integer N.

19. A focus detection device according to claim 14, wherein:
the image shift amount detection unit calculates the evaluation value by adding up signals making up the nonlinear contrast signal string.

20. A focus detection device according to claim 14, wherein:
the first signal string and the second signal string are each a signal string obtained by discretely sampling one of the pair of images with a predetermined spatial pitch;
a plurality of shift amounts, each achieved as the first signal string and the second signal string are shifted by the predetermined extent, take discrete values set apart from one another in units equivalent to the predetermined spatial pitch; and
the image shift amount detection unit detects the image shift amount with accuracy equal to or smaller than the predetermined spatial pitch, based upon the contrast evaluation value indicating the extreme value among the plurality of contrast evaluation values, the shift amount corresponding to the contrast evaluation value and two contrast evaluation values at two shift amounts determined by incrementing and decrementing the shift amount by an extent equivalent to the predetermined spatial pitch.

21. A focus detection device according to claim 14, wherein:
the defocus amount calculation unit further includes:
another detection unit that calculates, through a correlation operation, a correlation value indicating a degree of coincidence between the first signal string and the second signal string each time the first signal string and the second signal string are shifted relative to each other by the predetermined extent and detects, as a first image shift amount indicating an extent of relative image shift between the pair of images, a shift amount indicating a relative shift of the first signal string and the second signal string at which the degree of coincidence between the first signal string and the second signal string is greatest, based upon the correlation value; and
a selection unit that selects one of the other detection unit and the image shift amount detection unit; and
when the other detection unit is selected by the selection unit, the defocus amount calculation unit calculates the defocus amount based upon the first image shift amount detected by the other detection unit, whereas when the image shift amount detection unit is selected by the selection unit, the defocus amount calculation unit calculates the defocus amount based upon a second image shift amount, which is the image shift amount detected by the image shift amount detection unit.

22. A focus detection device according to claim 21, wherein:
the selection unit selects one of the other detection unit and the image shift amount detection unit in correspondence to a detected focusing condition of the optical system.

23. A focus detection device according to claim 22, wherein:
the detected focusing condition is represented by an absolute value of the defocus amount; and
when the absolute value of the defocus amount exceeds a predetermined value, the selection unit selects the other detection unit, and when the absolute value of the defocus amount is equal to or less than the predetermined value, the selection unit selects the image shift amount detection unit.

24. A focus detection device according to claim 21, wherein:
the selection unit selects one of the other detection unit and the image shift amount detection unit in correspondence to an optical characteristic of the optical system.

25. A focus detection device according to claim 24, wherein:
the optical characteristic is indicated by one of; an extent of aberration at the optical system, an aperture F-number at the optical system and an exit pupil distance of the optical system.

26. A focus detection device according to claim 21, wherein:
the selection unit selects one of the other detection unit and the image shift amount detection unit in correspondence to an image height indicating a position at which the first signal string and the second signal string are generated relative to an optical axis.

27. A focus detection device according to claim 21, wherein:
the selection unit selects one of the other detection unit and the image shift amount detection unit in correspondence to required detection accuracy with which the defocus amount needs to be detected.

28. A focus detection device according to claim 21, wherein:
the selection unit selects one of the other detection unit and the image shift amount detection unit in correspondence to an image quality of the pair of images determined based upon the first signal string and the second signal string.

29. A focus detection device according to claim 5, wherein:
the defocus amount calculation unit further includes another detection unit that calculates, through a correlation operation, a correlation value indicating a degree of coincidence between the first signal string and the second signal string each time the first signal string and the second signal string are shifted relative to each other by the predetermined extent, and detects, as a first image shift amount indicating an extent of a relative image shift between the pair of images, a shift amount indicating a relative shift of the first signal string and the second signal string at which the degree of coincidence between the first signal string and the second signal string is greatest, based upon the correlation value; and
the defocus amount calculation unit calculates the defocus amount based upon an average image shift amount obtained through weighted averaging of the first image shift amount detected by the other detection unit and a second image shift amount, which is the image shift amount detected by the image shift amount detection unit.

* * * * *